United States Patent
Melone et al.

(10) Patent No.: US 7,374,187 B2
(45) Date of Patent: May 20, 2008

(54) MOWER SUSPENSION SYSTEM AND METHOD

(75) Inventors: Mark J. Melone, Rome, NY (US);
William Decker, Vernon, NY (US);
Brian Crossway, Waterville, NY (US);
James Marshall, Munnsville, NY (US);
Frank Marshall, Munnsville, NY (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 0 days.

(21) Appl. No.: 11/523,107

(22) Filed: Sep. 19, 2006

(65) Prior Publication Data

US 2007/0012015 A1     Jan. 18, 2007

Related U.S. Application Data

(60) Division of application No. 10/903,456, filed on Jul. 30, 2004, now Pat. No. 7,107,746, which is a continuation-in-part of application No. 10/285,350, filed on Oct. 31, 2002, now Pat. No. 6,857,254, which is a continuation-in-part of application No. 09/879,800, filed on Jun. 12, 2001, now Pat. No. 6,510,678, which is a continuation of application No. 09/384,534, filed on Aug. 27, 1999, now Pat. No. 6,244,025, which is a continuation-in-part of application No. 09/359,537, filed on Jul. 22, 1999, now Pat. No. 6,460,318, which is a continuation-in-part of application No. 09/144,499, filed on Aug. 31, 1998, now Pat. No. 5,946,893, and a continuation-in-part of application No. 09/119,818, filed on Jul. 21, 1998, now Pat. No. 6,170,242, and a continuation-in-part of application No. 08/898,801, filed on Jul. 23, 1997, now Pat. No. 6,062,333.

(60) Provisional application No. 60/063,362, filed on Oct. 28, 1997, provisional application No. 60/053,403, filed on Jul. 22, 1997, provisional application No. 60/022,865, filed on Jul. 26, 1996.

(51) Int. Cl.
*B60G 9/00* (2006.01)
*B60G 23/00* (2006.01)
*B60P 1/02* (2006.01)
*B62D 21/00* (2006.01)

(52) U.S. Cl. .................... 280/124.1; 56/14.7
(58) Field of Classification Search ............. 280/124.1,
280/124.109, 124.11, 124.111, 124.116, 124.123,
280/124.125, 124.128, 124.13, 124.132,
280/124.135, 124.141; 56/14.7
See application file for complete search history.

(56) References Cited

U.S. PATENT DOCUMENTS

| | | | | | |
|---|---|---|---|---|---|
| 3,719,371 | A | * | 3/1973 | Musgrave | 280/124.135 |
| 4,159,128 | A | * | 6/1979 | Blaine | 280/5.521 |
| 5,197,755 | A | * | 3/1993 | Quick | 280/124.141 |
| 5,435,591 | A | * | 7/1995 | Lee | 280/124.139 |
| 5,946,893 | A | * | 9/1999 | Gordon | 56/15.8 |

* cited by examiner

*Primary Examiner*—Árpád Fábián Kovács
(74) *Attorney, Agent, or Firm*—Greenberg Traurig, LLP

(57) ABSTRACT

In some embodiments, the present invention provides a mower including a frame having a front portion and a rear portion, at least one front wheel coupled to the front portion of the frame, and two drive wheels on substantially opposite sides of the rear portion of the frame. Each drive wheel is coupled to the frame by a first link pivotably coupled at one end to the front portion of the frame and at an opposite end to the drive wheel, and a second link pivotably coupled at one end to the rear portion of the frame and at an opposite end to the drive wheel. The mower also includes at least one spring positioned to bias the drive wheels in a downward direction. Each of the drive wheels are movable upward and downward relative to the frame.

20 Claims, 44 Drawing Sheets

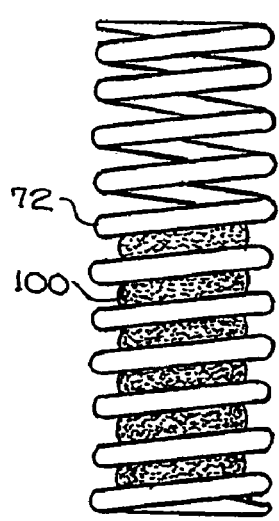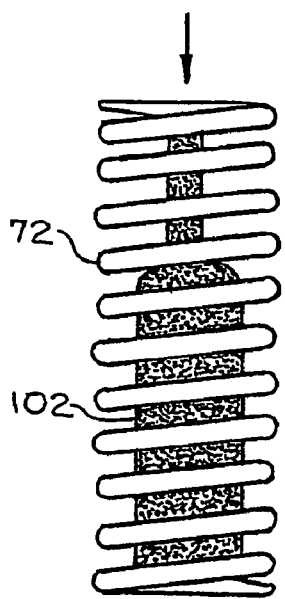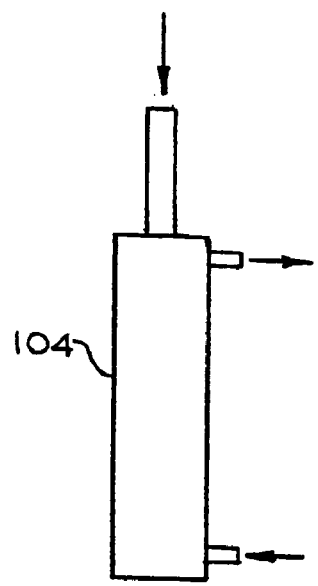
Fig. 13    Fig. 14    Fig. 15
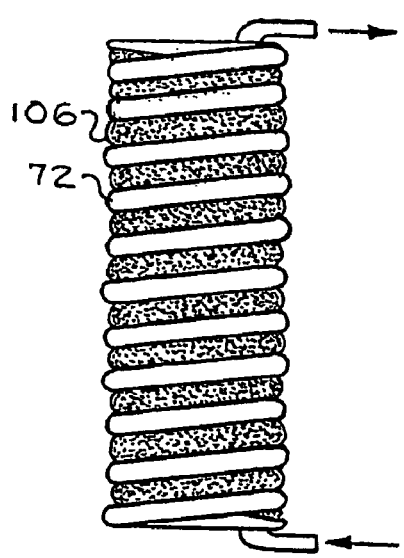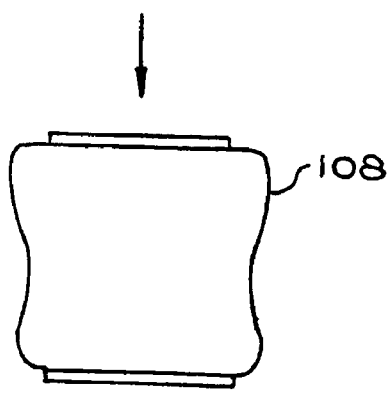
Fig. 16    Fig. 17

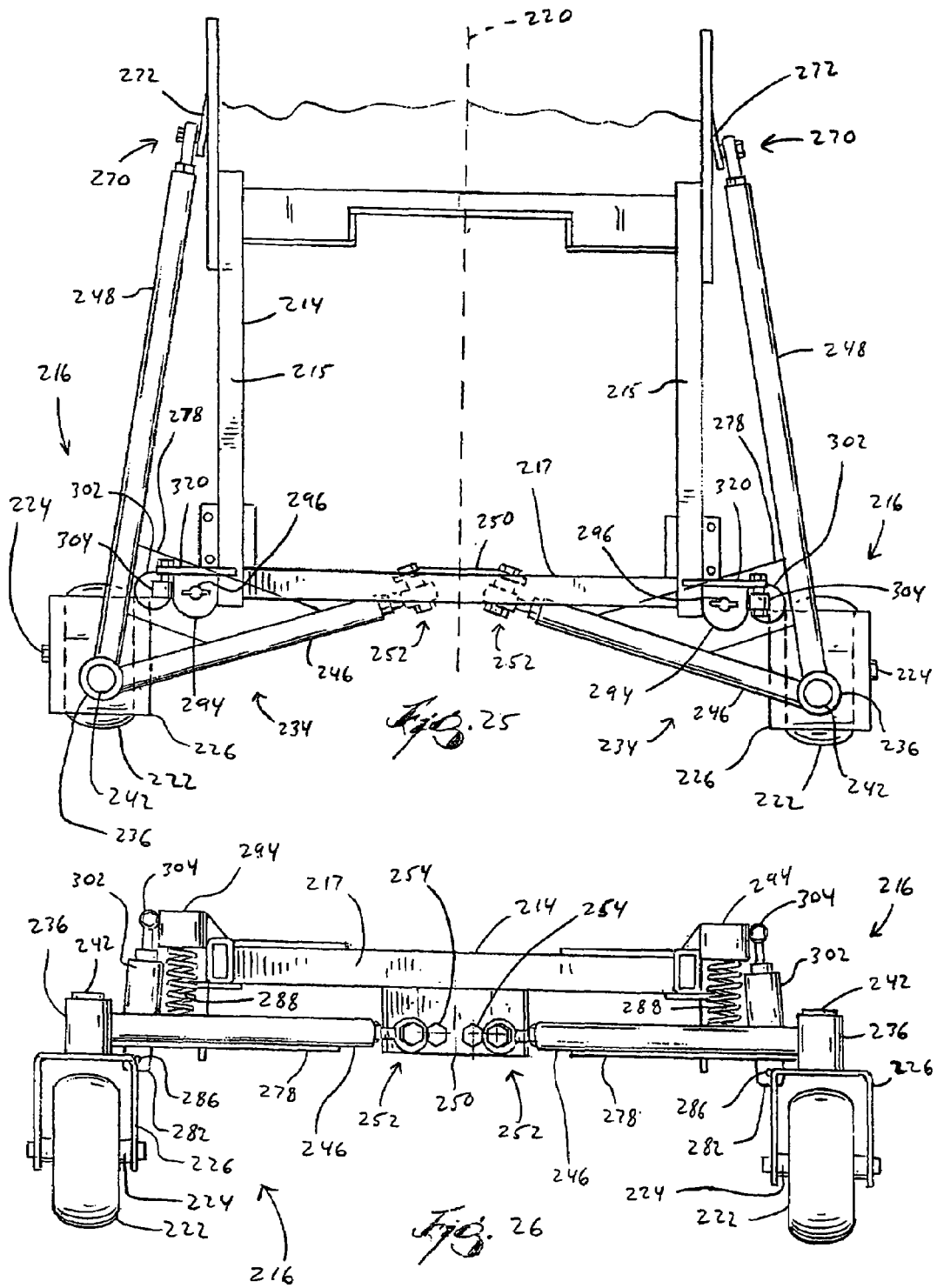

MOWER SUSPENSION SYSTEM AND METHOD

RELATED APPLICATIONS

This is a divisional application of U.S. patent application Ser. No. 10/903,456 filed on Jul. 30, 2004, now U.S. Pat. No. 7,107,746 which is a continuation-in-part of application Ser. No. 10/285,350 filed on Oct. 31, 2002 and issued as U.S. Pat. No. 6,857,254, which is a continuation-in-part patent application of U.S. patent application Ser. No. 09/879,800 filed on Jun. 12, 2001 and issued as U.S. Pat. No. 6,510,678, which is a continuation of U.S. patent application Ser. No. 09/384,534 filed on Aug. 27, 1999 and issued as U.S. Pat. No. 6,244,025, which in turn is a continuation-in-part of U.S. patent application Ser. No. 09/359,537 filed on Jul. 22, 1999 and issued as U.S. Pat. No. 6,460,318, which in turn is a continuation-in-part application of (i) U.S. patent application Ser. No. 09/144,499, filed Aug. 31, 1998 and issued as U.S. Pat. No. 5,946,893, which in turn claims benefit from U.S. Provisional Patent Application Ser. No. 60/063,362 filed on Oct. 28, 1997; (ii) U.S. patent application Ser. No. 09/119,818 filed on Jul. 21, 1998 and issued as U.S. Pat. No. 6,170,242, which in turn claims benefit from U.S. Provisional Patent Application Ser. No. 60/053,403 filed on Jul. 22, 1997 and U.S. Provisional Patent Application Ser. No. 60/063,362, filed on Oct. 28, 1997; and (iii) U.S. patent application Ser. No. 08/898,801, filed on Jul. 23, 1997 and issued as U.S. Pat. No. 6,062,333, which in turn claims benefit from U.S. Provisional Patent Application Ser. No. 60/022,865 filed on Jul. 26, 1996, all of which are incorporated herein by reference.

BACKGROUND OF THE INVENTION

The present invention is described with respect to its use on lawn mowers, particularly self-propelled machines fitted with rotating blades for cutting grass and other vegetation. Numerous mowers exist in the marketplace for grass and vegetation. However, many of these mowers can produce uneven cuts and deliver unwanted stresses from the terrain to the driver and mower, resulting in driver fatigue and discomfort, mower wear and tear, more frequent repairs, and a shorter mower life.

In many typical mowers, the cutter deck is suspended as either a ground-following deck or a floating deck. A ground-following deck typically rides on caster wheels (e.g., a set of two or four caster wheels in many cases) and follows the contours of the ground. A floating deck is often suspended beneath the frame between the front and rear wheels, such as by chains, sets of links and other elements. Other floating decks are suspended in various manners over the ground at a location in front of, behind, or beside the lawn mower frame. The floating deck is raised when skids, wheels, rollers, or other elements attached to the deck contact the lawn surface.

The height of a floating cutter deck from the surface being cut is often defined at least in part by the elevation of the mower's frame. Generally, the intent for such a deck suspension system is to avoid continuing contact with the earth surface. When a cutter deck travels over uneven terrain having a strong grade, the cutter deck can contact the earth surface, and can cause the lawnmower blade(s) therein to scalp the surface being cut.

Cutter decks are generally designed to avoid scalping by rising or floating upwardly. This generally works for certain kinds of earth unevenness, but some scalping still occurs on severe terrain. Even if scalping can be avoided, cutter deck height relative to the earth surface can vary widely. This is also undesirable because it results in an unequal height of the cut grass.

A significant number of lawnmowers have wheels that are rigidly attached to the mower frame. Unfortunately, when a mower having such a suspension encounters uneven terrain, the mower frame can respond with significant upward and downward movement.

With regard to lawnmower front wheels, many conventional lawn mower designs either rigidly connect the front wheels to the frame as just mentioned or employ a single axle to which the front wheels are attached. In some cases, the single axle can pivot about a point between the wheels, thereby generating slightly improved performance. Whether rigidly secured to the frame or connected to a common axle, such front suspension designs either do not eliminate the undesirable upward and downward frame movement described above, or only do so to a very limited extent. For example, if one wheel of such a mower rises in response to a rise in terrain, the single axle would cease to be parallel with the earth surface, generating forces that bring the frame and cutter deck also out of a parallel relationship with the earth surface. The resulting cut of the grass is uneven and unsatisfactory.

In these and other conventional mowers, improved spring suspension systems are employed to reduce the amount of vertical frame motion when one or more wheels encounter unevenness in the earth surface being traversed. These spring systems improve traction of such mowers by maintaining improved contact between the wheels and the surface being traversed. However, these spring suspension systems can cause or allow the frame to roll relative to the cutting surface, such as, for example, when a mower is turned sharply or navigates a steep hillside. When a frame rolls, a floating cutter deck (and in many cases, even a ground-following cutter deck) rolls with the frame, resulting in one side of the cutter deck being closer to the cutting surface than the other. Consequentially, the cut of the grass is uneven and unsatisfactory.

In order to address cutting quality, rider comfort, and suspension wear problems, many conventional lawn mowers employ suspensions having one or more springs. Although such spring suspensions do represent an improvement and can help to address these problems, significant room for improvement still exists. For example, heavy riders or heavy mower accessories (e.g., grass catchers) tend to exert extra stress on the suspension springs, potentially causing the suspension springs to "bottom out" or to provide a limited range of spring motion. In either case, an uncomfortable ride results because the spring has limited or no capacity to absorb shock. As a result, an increased amount of shock is transferred to the mower and operator. The increase in shock can significantly shorten the life of the mower and can be a cause of more frequent mower maintenance and repair. Substituting a stiffer spring for heavy loading situations is an unattractive solution for many reasons, such as an uncomfortable ride in a light loading situation and additional low-level vibrations transmitted to the frame.

In light of the shortcomings and problems of prior art lawn mowers described above, a need exists for a lawn mower having a suspension system that improves floating cutter deck and/or ground-following cutter deck motion, results in better cutting performance and quality, is relatively simple and inexpensive in construction, can limit undesirable frame movement (such as frame roll and large vertical frame movement), provides a more comfortable ride, and can help prevent mower damage from vibration and shock. Each embodiment of the present invention provides one or more of these results.

SUMMARY OF THE INVENTION

Some embodiments of the present invention address one or more of the problems and limitations of the prior art by a unique connection assembly of the front wheels to the lawn mower frame. In some embodiments, the connection assembly for each front wheel includes a first suspension arm connected to the front of the frame and a second suspension arm connected to the side of the frame. The first suspension arm can be connected to the front of the frame at or near the longitudinal center of the frame, while the second suspension arm can be connected to the side of the frame a distance from the front of the frame. Either or both suspension arms can be mounted to the frame via plates secured to the frame. In some embodiments, the suspension arms are pivotably connected to the frame. Either or both suspension arms can be connected directly to a wheel yoke, can be connected to a support plate extending between the suspension arms, or can be connected to the wheel yoke and to a support plate extending between the suspension arms.

In some embodiments, front suspension assemblies are employed that have one or more springs positioned to bias the associated front wheel in a downward direction. The spring(s) can be located between the frame and the support plates (where used), can be located between either or both of the arms and the frame, or in still other manners to generate the same desired force. If desired, each suspension assembly can be provided with a spring, air bag, pneumatic or hydraulic cylinder, or other such device that compensates for heavy loads upon the suspension assemblies (i.e., "load compensation adjusters"). In some embodiments, the load compensation adjusters are adjustable to change the resistance to downward force provided by the associated suspension assemblies.

As described above, many conventional lawn mowers suffer from scalping and uneven cutting problems when the lawn mowers traverse uneven surfaces. Some embodiments of the present invention substantially reduce scalping and uneven cutting by suspending each of the front wheels independently from the front frame of the lawn mower with the structure described above. Upon wheel contact with uneven ground such as a steep upward or downward grade, the front wheels are therefore able to move generally vertically without greatly altering the relationship of the frame with respect to the surface traversed, or at least with reduced movement of the frame. In this manner, roll and pitch of the frame can be significantly reduced, resulting in a higher-quality cut and an improved ride.

By employing a two-arm spring suspension assembly connected as described above, the inventors have discovered that far less damaging vibration, shock, and impact received by the front wheels are transmitted to the frame and to the operator. By reducing the transmission of such vibration, shock, and impact shock to the frame, the life of the lawn mower is considerably extended and the need for maintenance and repair is decreased.

In some embodiments of the present invention, the cutter deck is connected to the front and/or rear suspensions, and therefore move with vertical movement of the front and/or rear suspensions. In this manner, the cutter deck can follow the terrain traversed by the mower by following the vertical movement of the mower wheels.

In these and other embodiments, the front and/or rear suspension systems can be independent, and can be connected to a beam, subframe, or other structure that is pivotably coupled to the mower frame, thereby transmitting upward and downward force to the independent suspensions as well as to the pivoting beam, subframe, or other structure. Regardless of whether the cutter deck is also connected to these independent suspensions, this arrangement can result in improved suspension and cutter deck movement.

Due to decreased vibration, shock, and impact transmitted by various embodiments of the present invention, a lawn mower provided with a suspension according to some embodiments of the present invention can be operated at quicker speeds, resulting in increased lawn mower efficiency and decreased time needed to cut a surface. Also, the relatively simple design of some wheel suspensions according the present invention enables the suspension to be included in lawn mowers with little impact upon manufacturing and sales costs.

In some embodiments, the present invention provides a mower including a frame having a front portion and a rear portion, at least one front wheel coupled to the front portion of the frame, and two drive wheels on substantially opposite sides of the rear portion of the frame. Each drive wheel is coupled to the frame by a first link pivotably coupled at one end to the front portion of the frame and at an opposite end to the drive wheel, and a second link pivotably coupled at one end to the rear portion of the frame and at an opposite end to the drive wheel. The mower also includes at least one spring positioned to bias the drive wheels in a downward direction. Each of the drive wheels are movable upward and downward relative to the frame.

In other embodiments, the present invention provides a mower including a frame having a front portion, a rear portion, and at least one longitudinal beam located in the front portion of the frame. The beam is substantially parallel with a longitudinal axis passing from the front portion to the rear portion of the frame. The mower also includes first and second wheels positioned on opposite sides of the front portion of the frame and spaced to define a track width of the mower. The first and second wheels are pivotably coupled to the at least one longitudinal beam about a first longitudinal pivot axis and a second longitudinal pivot axis, respectively, for upward and downward movement independent of each other. At least one of the first and second longitudinal pivot axes is laterally spaced from the longitudinal axis between about 0% and about 20% of the track width.

In yet other embodiments, the present invention provides a mower including a frame having a front portion, a rear portion, and at least one longitudinal beam located in the front portion of the frame. The beam is substantially parallel with a longitudinal axis passing from the front portion to the rear portion of the frame. The mower also includes first and second wheels positioned on opposite sides of the front portion of the frame and spaced to define a track width of the mower. The first and second wheels are pivotably coupled to the at least one longitudinal beam about a first longitudinal pivot axis and a second longitudinal pivot axis, respectively, for upward and downward movement independent of each other. At least one of the first and second longitudinal pivot axes is laterally spaced from the longitudinal axis between about 0% and about 20% of the track width. The mower also includes first and second drive wheels on substantially opposite sides of the rear portion of the frame. Each drive wheel is coupled to the frame by a first link pivotably coupled at one end to the front portion of the frame and at an opposite end to the drive wheel, and a second link pivotably coupled at one end to the rear portion of the frame and at an opposite end to the drive wheel. The mower further includes at least one spring positioned to bias the drive wheels in a downward direction. Each of the drive wheels is movable upward and downward relative to the frame. The mower also includes a cutter deck coupled to the first and second front wheels and to the first and second drive wheels. The cutter deck is movable upward and downward responsive to upward and downward movement of the first and second front wheels relative to the frame and to upward and downward movement of the first and second drive wheels relative to the frame.

In some embodiments, the present invention provides a method of assembling a mower. The method includes providing a frame having a first end, a second end, and opposite sides, the frame defining a longitudinal axis from the first end to the second end. The method also includes positioning at least one wheel toward the first end of the frame, positioning at least two additional wheels on the opposite sides of the frame, respectively, toward the second end of the frame, pivotably coupling each of the at least two additional wheels to a portion of the frame disposed closer to the first end of the frame than the second end with a first link, and pivotably coupling each of the at least two additional wheels to a portion of the frame disposed closer to the second end of the frame than the first end with a second link.

In other embodiments, the present invention provides a method of assembling a mower. The method includes providing a frame having a first end, a second end, and opposite sides, the frame defining a longitudinal axis from the first end to the second end. The method also includes providing toward the first end of the frame at least one longitudinal beam substantially parallel with the longitudinal axis, positioning a first wheel and a second wheel on opposite sides of the frame, respectively, toward the first end of the frame to define a track width between the first and second wheels, and pivotably coupling the first and second wheels to the at least one longitudinal beam about a first longitudinal pivot axis and a second longitudinal pivot axis, respectively, for upward and downward movement independent of each other. At least one of the first and second longitudinal pivot axes is laterally spaced from the longitudinal axis between about 0% and about 20% of the track width.

In yet other embodiments, the present invention provides a method of decreasing longitudinal and lateral movement of a cutter deck of a mower. The method includes providing a frame having a first end, a second end, and opposite sides, the frame defining a longitudinal axis from the first end to the second end. The method also includes positioning a first wheel and a second wheel on the opposite sides of the frame, respectively, toward the first end of the frame to define a track width of the mower between the first and second wheels. The method further includes pivotably coupling the first and second wheels about a first longitudinal pivot axis and a second longitudinal pivot axis, respectively, for upward and downward movement independent of each other. At least one of the first and second longitudinal pivot axes is laterally spaced from the longitudinal axis between about 0% and about 20% of the track width. The method further includes positioning a third wheel and a fourth wheel on the opposite sides of the frame, respectively, toward the second end of the frame. The third and fourth wheels are longitudinally spaced from the first and second wheels to define a wheelbase length of the mower. The method also includes pivotably coupling the third and fourth wheels about a first lateral pivot axis and a second lateral pivot axis, respectively, located between the first and third wheels. At least one of the first and second lateral pivot axes is longitudinally spaced from the third and fourth wheels between about 50% and about 90% of the wheelbase length. The method further includes positioning the cutter deck beneath the frame. The cutter deck has a first end facing the first end of the frame and a second end facing the second end of the frame. The method also includes coupling opposite sides of the first end of the cutter deck with the first and second wheels, respectively. The first end of the cutter deck is responsive to upward and downward movement of the first and second wheels. The method further includes coupling opposite sides of the second end of the cutter deck with the third and fourth wheels, respectively. The second end of the cutter deck is responsive to upward and downward movement of the third and fourth wheels.

Other features and advantages of the present invention will become apparent to those skilled in the art upon review of the following detailed description, claims, and drawings.

BRIEF DESCRIPTION OF THE DRAWINGS

In the drawings, wherein like reference numerals indicate like parts:

FIG. 13 is an elevation view of the load compensation adjuster of FIG. 12;

FIG. 14 is an elevation view of a shock absorber embodiment of the load compensation adjuster of the present invention;

FIG. 15 is an elevation view of an air shock embodiment of the load compensation adjuster of the present invention;

FIG. 16 is an elevation view of an airbag embodiment of the load compensation adjuster of the present invention;

FIG. 17 is an elevation view of an airbag embodiment of the load compensation adjuster of the present invention;

FIG. 25 is a top plan view of the mower frame and front wheel independent suspension assemblies shown in FIGS. 21-24;

FIG. 26 is a front view of the mower frame and front wheel independent suspension assemblies shown in FIGS. 21-24;

Figure 1:
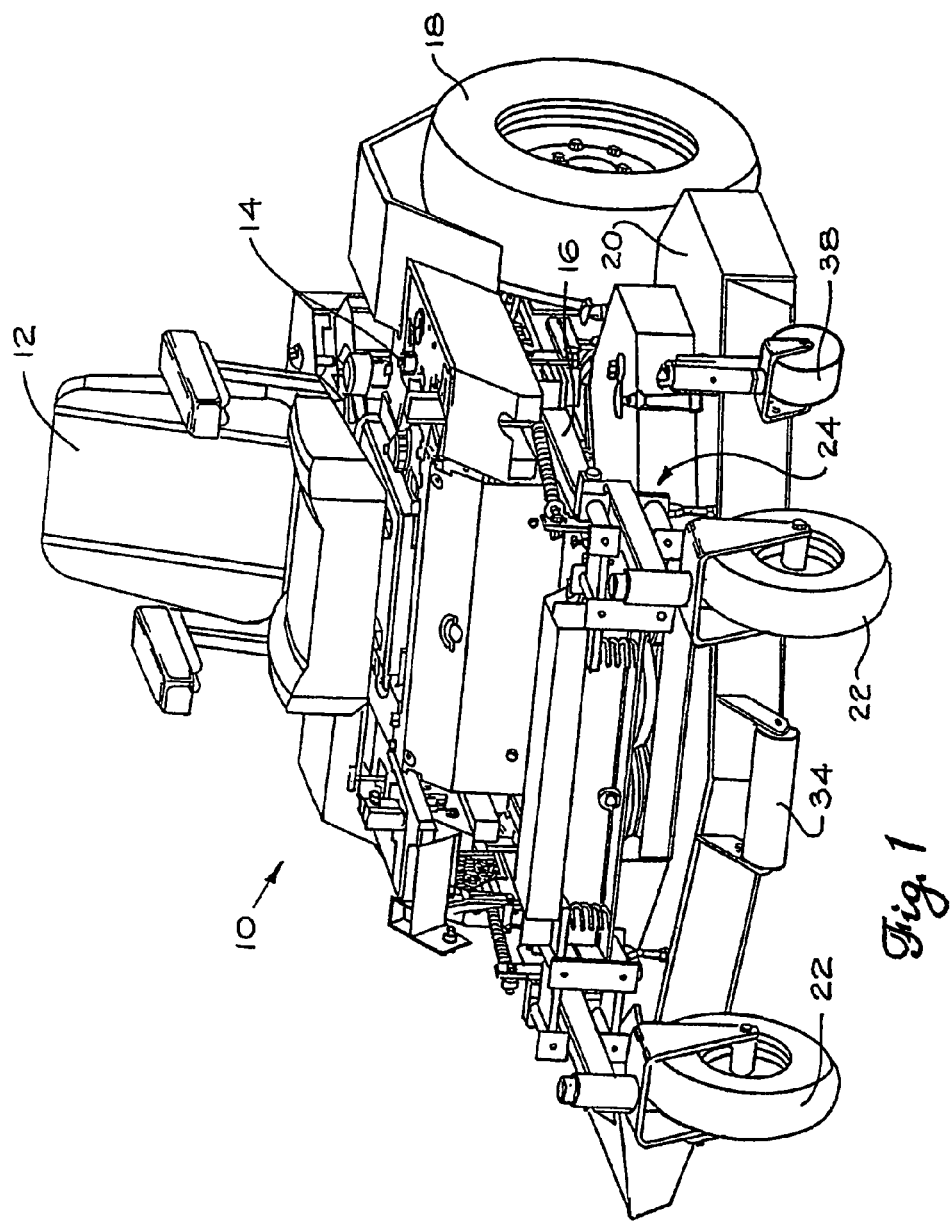
FIG. 1 is a perspective view of a lawn mower having a front suspension system according to an embodiment of the present invention.

Before any features of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION

Figure 2:
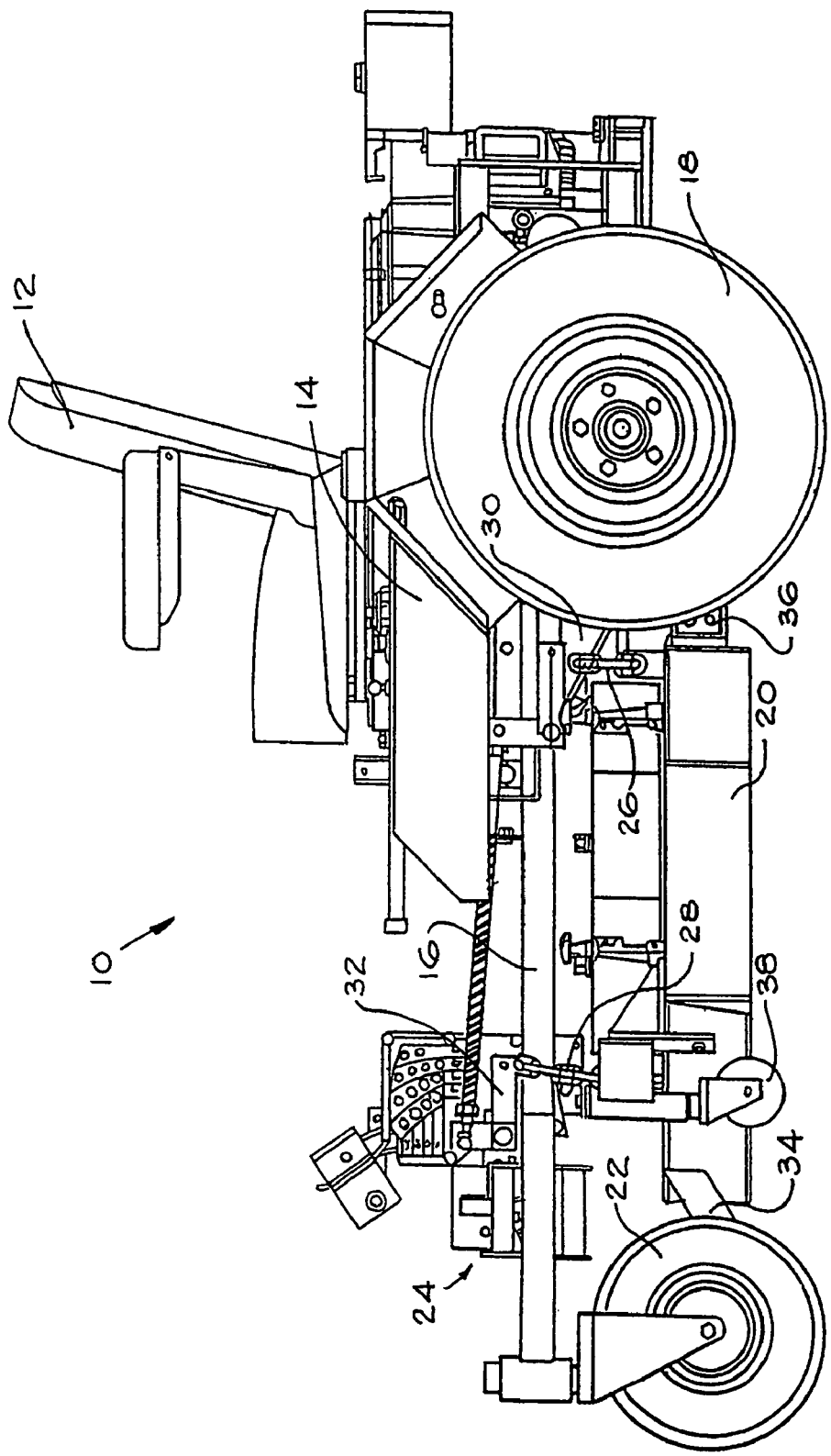
FIG. 2 is a side elevation view of the lawn mower of FIG. 1.

Referring to FIGS. 1-2, a lawn mower 10 includes a seat 12 connected to a chassis 14. Chassis 14 in turn rests on a main frame 16. Two rear wheels 18 are connected to main frame 16 by the independent suspension (not shown) as described in co-pending U.S. patent application Ser. No. 09/119,818. Two front wheels 22 are connected to main frame 16 via a front suspension system, shown generally at 24. A floating cutter deck 20 is preferably suspended beneath main frame 16 by rear suspension chains 26 and front suspension chains 28. Each rear suspension chain 26 is preferably connected to a rear wheel bracket 30 which is "wheel-side" of the rear independent suspension system. Each front suspension chain is preferably connected to a deck height adjustment mount 32 which is part of front suspension section 24. Suspending cutter deck 20 from the "wheel-side" of the front and rear independent suspensions ensures that cutter deck 20 moves vertically up and down in response to the vertical motion of front wheels 22 and rear wheels 18, which in turn are responsive to the terrain being mowed. Scalping and uneven cuts of the grass are thus prevented.

Although the mower of the present invention can be equipped with either a ground-following cutter deck or a floating cutter deck, using a floating cutter deck with a mower having independent suspension requires additional considerations. Rolling of a lawn mower chassis is induced under certain situations. Among them are: (a) when the mower changes direction while traveling forward and centrifugal force acts laterally at the center of gravity of the machine; (b) when the mower traverses a slope and the gravitational force vector shifts direction relative to the plane of the mower wheel tread, and (c) when the mower travels over a surface undulation, lifting or lowering one or both wheels on one side, thereby rotating the mower chassis in space.

Conventional mowers typically use wheels that are rigidly connected to the chassis. In these mowers, the chassis cannot roll relative to the wheels; therefore, there is no rolling of types (a) and (b). Other conventional mowers have a pivoting front or rear axle at one end, with an opposing end axle rigidly attached to the chassis. In these mowers, the rigidly attached axle limits the chassis roll which the pivoting axle otherwise permits to the extent the chassis is sufficiently rigid. The mower of the present invention, preferably having both front and rear independent wheel suspension systems, beneficially minimizes any rolling of the machine when a wheel passes over certain small bumps and depressions—type (c) rolling. Nonetheless, larger bumps and depressions can induce rolling.

Figure 9:
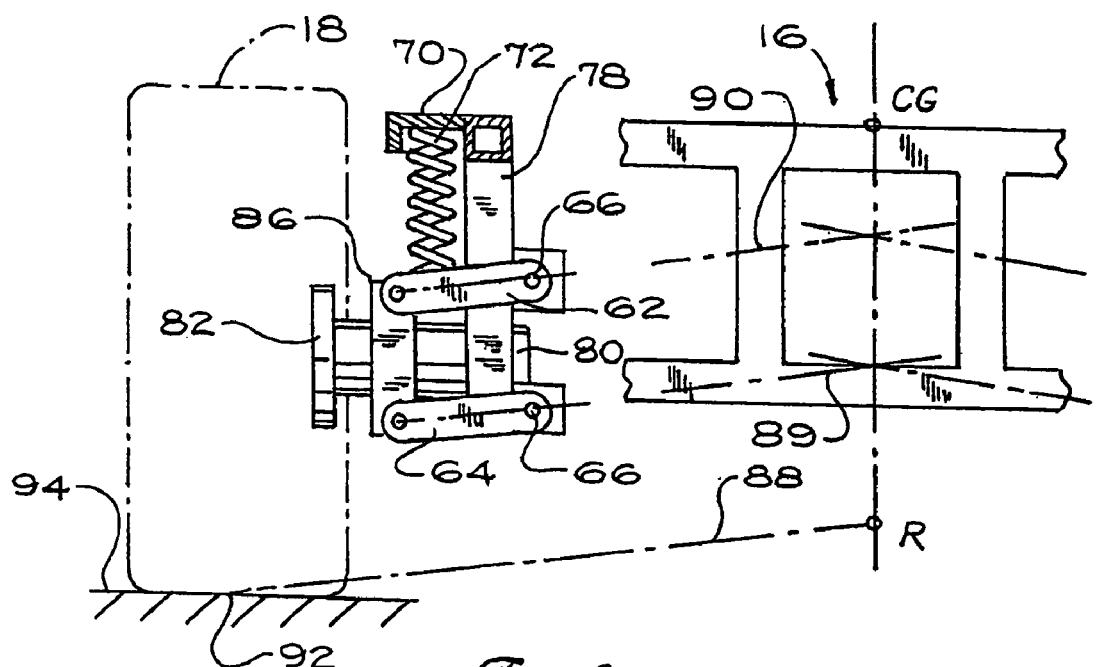
FIG. 9 is a partial rear elevation view of a portion of the rear suspension system illustrated in FIG. 6.

As will be explained below, the suspension configuration of FIG. 9 is prone to rolling of types (a) and (b). If cutter deck 20 of mower 10 is suspended from the chassis, rolling may adversely affect the essential mower function, that is, cutting grass to an even height. In particular, when the chassis rolls and one side moves closer to the earth surface, a cutter deck suspended from the chassis also moves closer to the surface. Therefore, the preferable embodiment of the present invention couples the motion of the cutter deck to the motion of a sprung wheel rather than directly to the chassis, thereby reducing the change in cutter deck height relative to the mowed surface when the chassis rolls.

Due to the large cutting width preferred in commercial mowers and the distance between the front wheels 22, rocks or other uneven terrain features that are avoided by front wheels 22 can damage cutter deck 20. Cutter deck 20 therefore preferably includes a front roller 34, a rear roller 36 (partially hidden by rear wheel 18 in FIG. 2), and front caster wheels 38 that protect cutter deck 20 from damage.

Figure 3:
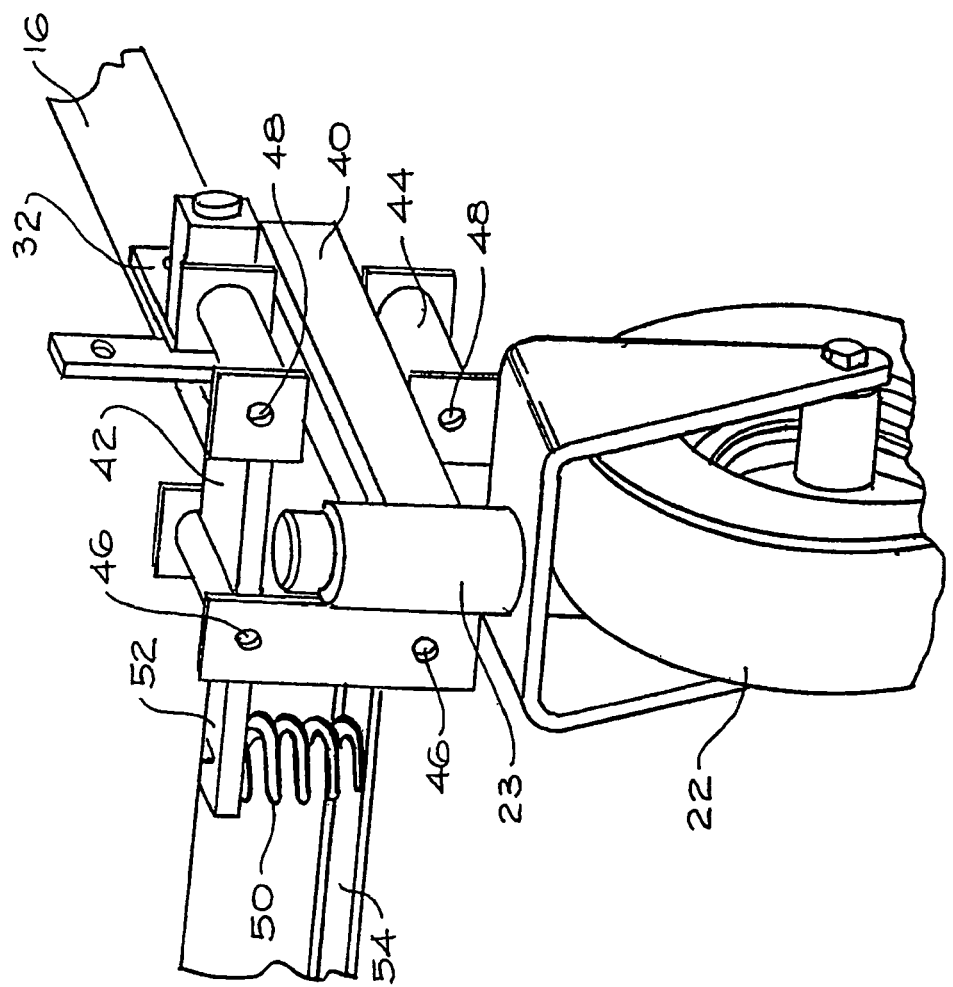
FIG. 3 is a sectional perspective view of the front suspension system of the lawn mower illustrated in FIGS. 1 and 2.
Figure 4:
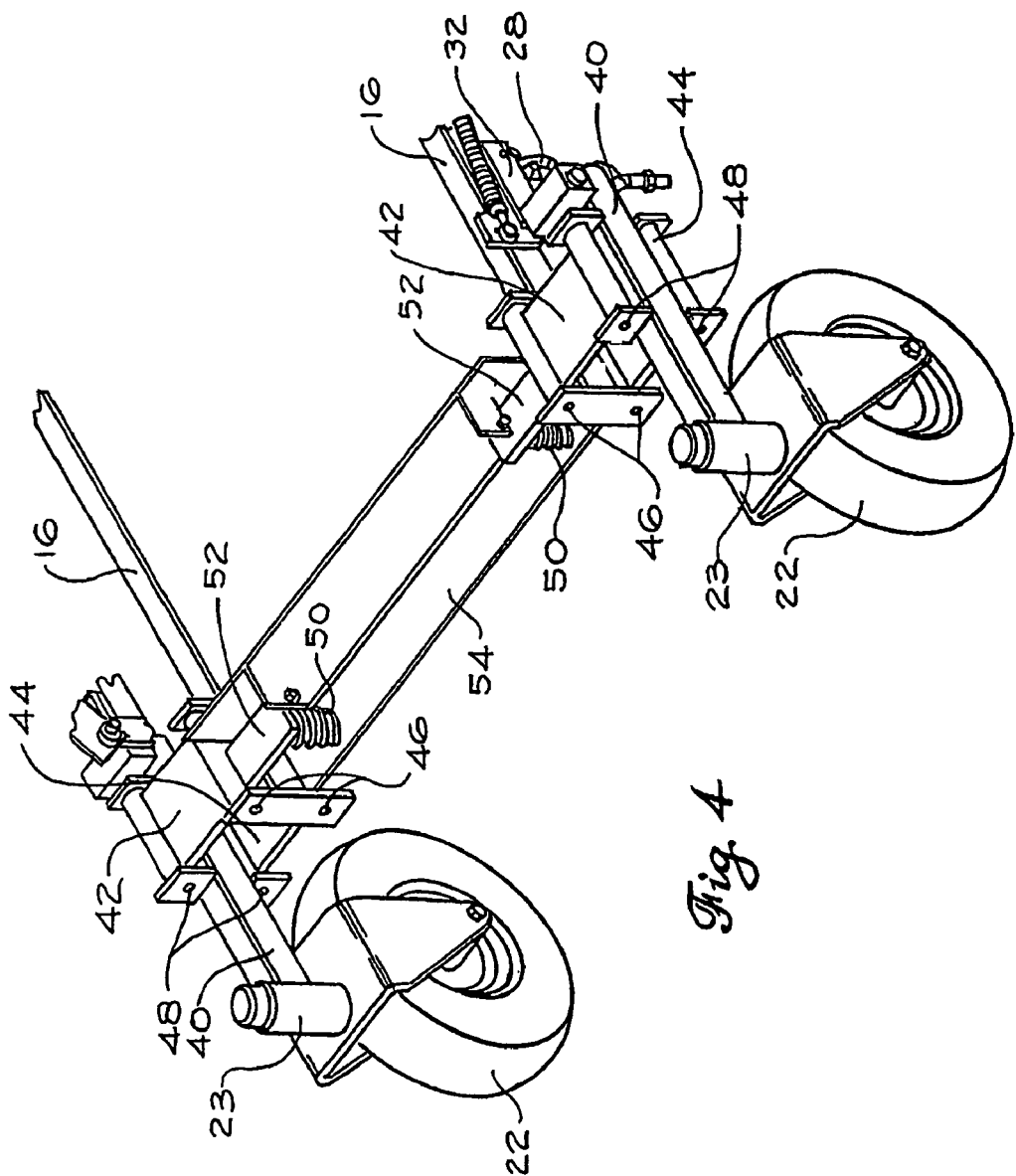
FIG. 4 is a sectional perspective view of the front suspension system of the lawn mower illustrated in FIGS. 1-3.
Figure 5:
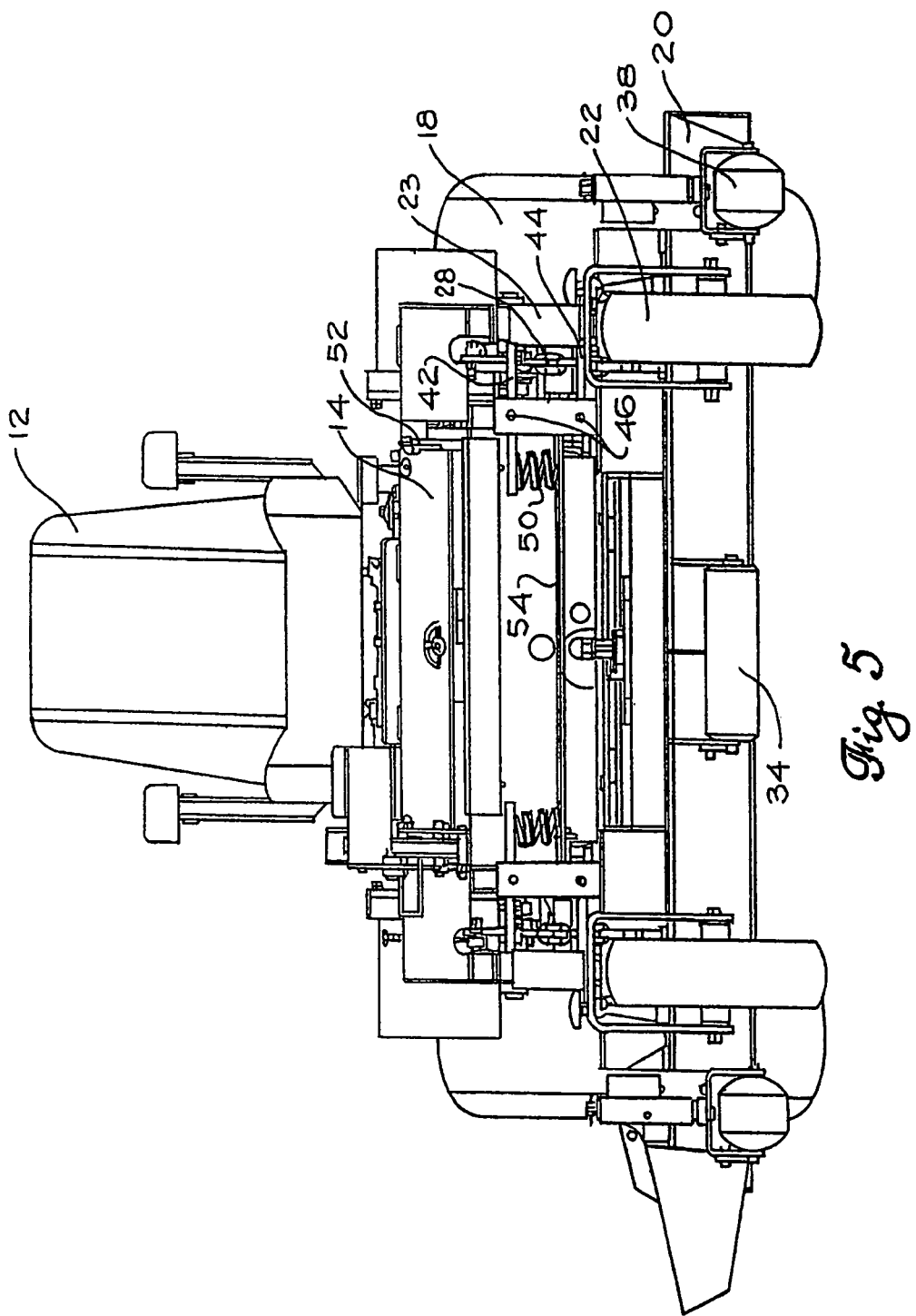
FIG. 5 is a front elevation view of the lawn mower of FIG. 1.
Figure 6:
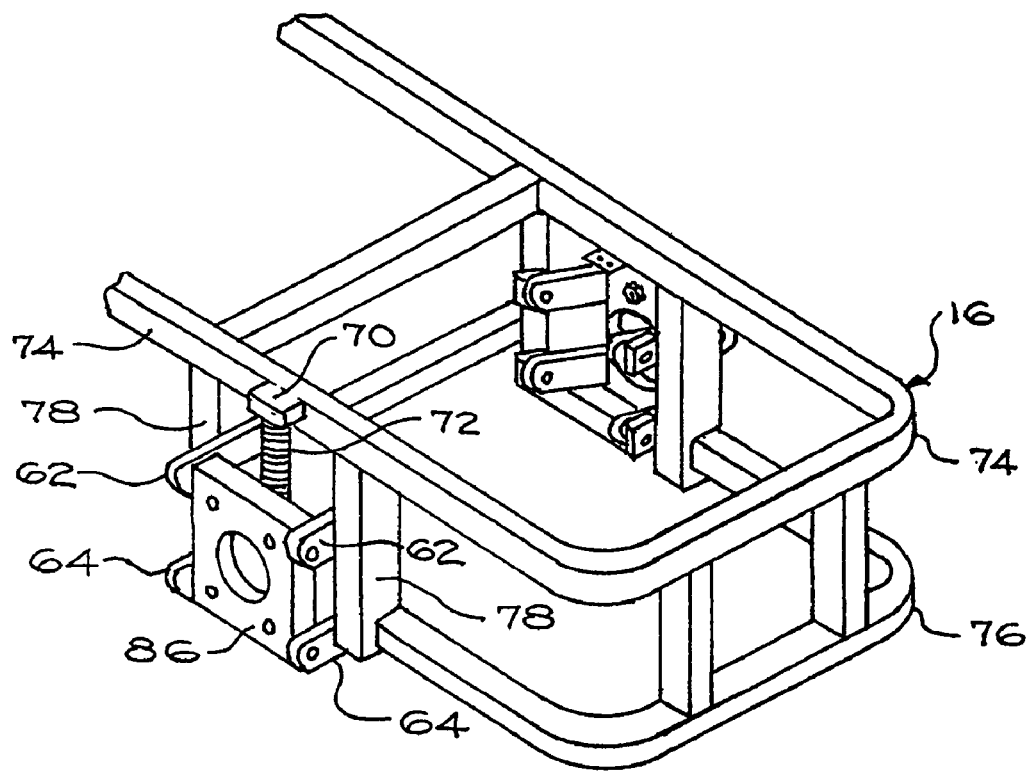
FIG. 6 is a partial perspective view of a rear suspension system according to an embodiment of the present invention.
Figure 7:
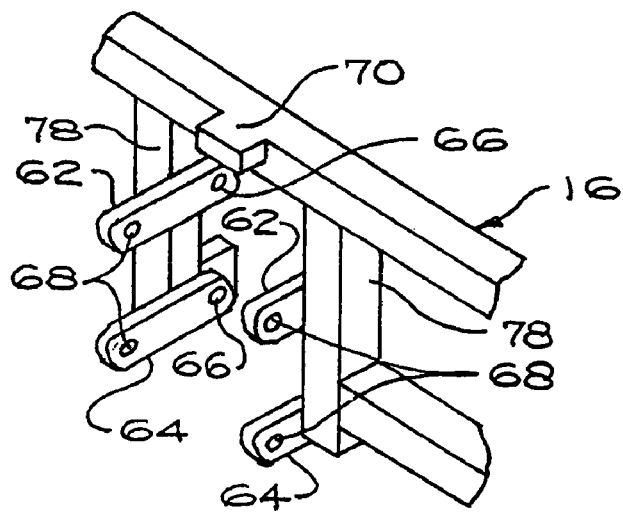
FIG. 7 is a partial perspective view of a portion of the rear suspension system of FIG. 6.

Referring to FIGS. 3-5, front suspension system 24 includes a longitudinal suspension strut 40 that is connected to main frame 16 via an upper suspension strut 42 and a lower suspension strut 44. Front wheel 22 is connected to longitudinal strut 40 via a trunnion 23. Upper and lower suspension struts 42, 44 pivotably connect to main frame 16 at a plurality of main frame pivot points 46 and pivotably connect to longitudinal suspension strut 40 at a plurality of front suspension pivot points 48. A spring 50 is fixed between a spring bracket 52 of upper suspension strut 42 and a front transverse member 54 of main frame 16 so that upward movement of suspension system 24 compresses spring 50 between spring bracket 52 and front transverse member 54. Upper and lower suspension struts 42, 44 are preferably of equal length so that the suspension travel does not change the perpendicularity of front wheel 22 to the ground.

As front wheels 22 move vertically up and down in response to the terrain, the front of cutter deck 20, being connected to longitudinal suspension strut 40 via adjustment mount 32, moves vertically up and down in response to the vertical motion of front wheels 22. Main frame 16 is isolated from the vertical motion of front wheels 22 by front suspension system 24.

Figure 8:
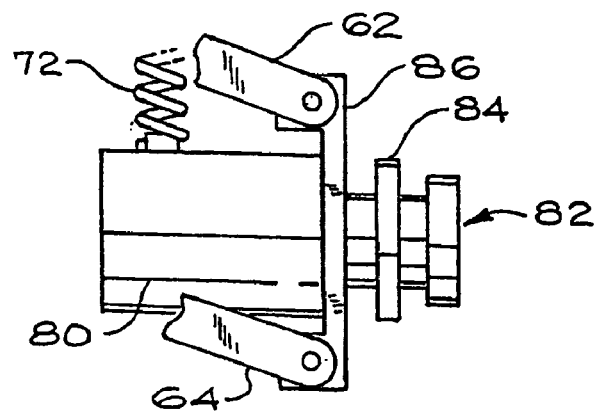
FIG. 8 is a partial side elevation view of a portion of the rear suspension system illustrated in FIGS. 6 and 7.

Referring to FIGS. 6-9, a rear suspension system for mower 10 includes a motor mount 86 connected to main frame 16 via upper links 62 and lower links 64. Two struts 78 join an upper frame member 74 of main frame 16 to a lower frame member 76 of main frame 16. Upper and lower links 62, 64 are connected to struts 78 at main frame pivot points 66 and to motor mount 86 at rear suspension pivot points 68. Upper and lower links 62, 64 are shown in this embodiment as being of equal length. A spring 72 is captured between a spring bracket 70 of upper frame member 74 and a motor 80. FIG. 8 additionally shows an optional disk 84 on a wheel hub 82 that is used with disk brakes instead of the more conventional band-drum brakes typically used on prior art lawn mowers.

Referring specifically to FIG. 9, a roll center is an imaginary point about which a mower with movable suspension elements tends to roll when subjected to lateral forces. A roll axis of the mower runs through the front and rear roll centers. The location of a roll center R for the rear wheel suspension system is determined by examining the intersection of an upper link phantom line 90 and a lower link phantom line 89. Line 90 runs through the pivot points for upper link 62 while line 89 runs through the pivot points for lower link 64. A ground contact phantom line 88 runs from a ground contact point 92, representing the contact between rear wheel 18 and ground 94, to the intersection of lines 90 and 89. In the embodiment described above, where upper and lower links 62, 64 are of equal length, lines 90 and 89 intersect at infinity. Line 88 therefore intersects lines 90 and 89 at infinity; line 88 is thus parallel to lines 90 and 89. The intersection of line 88 with a vertical plane passing through a center of gravity (mass) of the mower is the location of roll center R.

In this embodiment, roll center R is substantially lower in elevation than the center of gravity CG of the mower. The location of roll center R can be moved vertically by changing the lengths and angles of the link assemblies. With roll center R significantly below center of gravity CG, the mower tends to sway or rock to the side when turning. Sway bars (not shown), also known as anti-sway or anti-roll bars, are optionally added to this equal-link-length suspension to inhibit swaying during turning. Such bars are typically torsion bars or other elastic structure which, when one wheel moves closer to the chassis, resist such motion with a force, the reaction to which is applied to the opposite wheel. Notwithstanding the tendency to roll, the FIG. 9 suspension provides a better vehicle ride and absorption of bumps compared to an unequal link-length suspension. The FIG. 9 suspension also minimizes lateral motion when the mower load changes, such as when an operator mounts or dismounts the mower, removes a grass-catcher bag, or when there are changes in the mower's vertical momentum due to uneven terrain.

Figure 10:
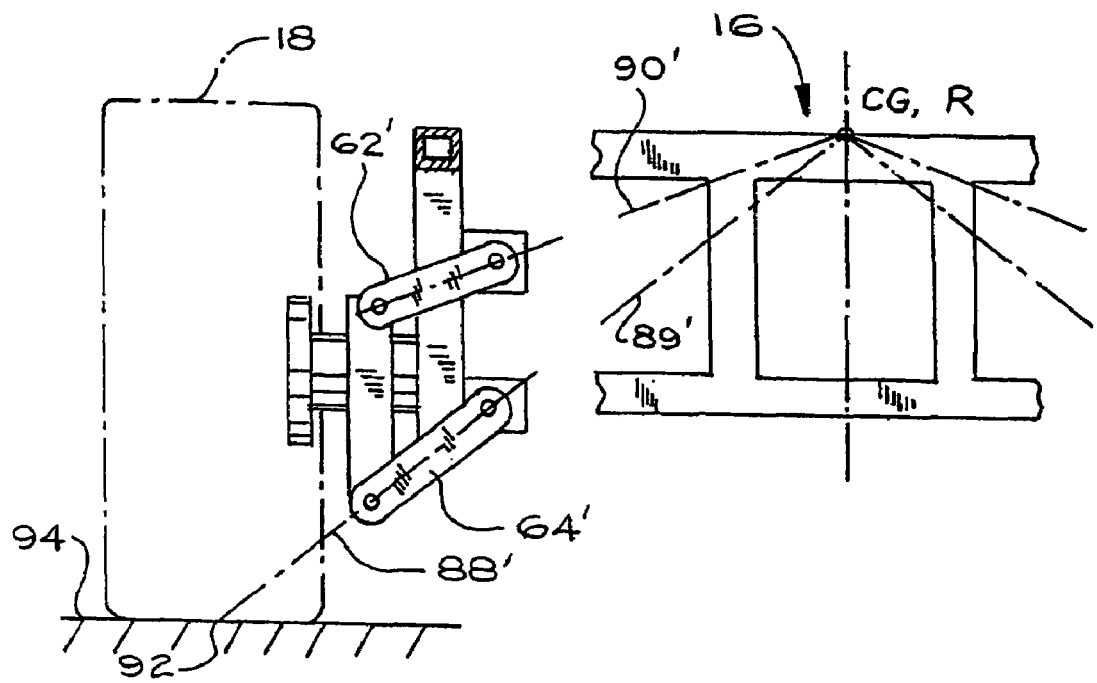
FIG. 10 is a partial rear elevation view of a portion of a rear suspension system according to another embodiment of the present invention.

Referring to FIG. 10, an embodiment is shown with unequal link lengths. An upper link 62' is shorter than a lower link 64', with the lengths of links 62', 64' preferably determined such that the roll center R and the center of gravity CG substantially coincide. As shown in the figure, phantom lines 90' and 89' intersect at R, so ground contact line 88' intersects the vertical plane passing through the center of gravity CG at the center of gravity CG. This configuration minimizes the roll tendency of the mower during turning.

Figure 11:
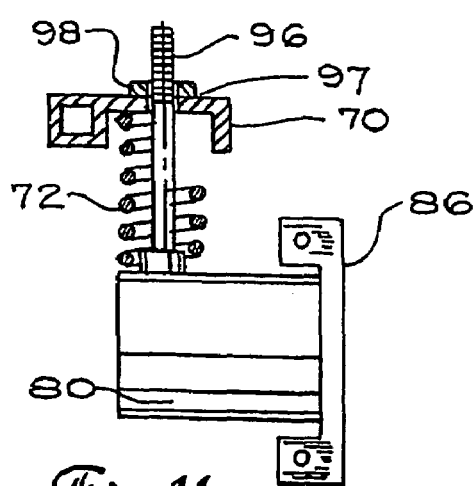
FIG. 11 is a partial sectional view of a pre-compressed spring used the rear suspension system according to yet another embodiment of the present invention.

Referring to FIG. 11, a way of pre-compressing spring 72 is shown. Pre-compression is desirable to lessen the movement of the mower chassis when the mower operator mounts and dismounts the mower. Pre-compression is preferably accomplished by pivotably attaching a threaded guide rod 96 to motor 80. Rod 96 extends through a hole 97 in spring bracket 70 with a nut 98 on the threaded end of rod 96. Nut 98 is preferably adjustable so that the amount of pre-compression can be changed when required.

Figure 12:
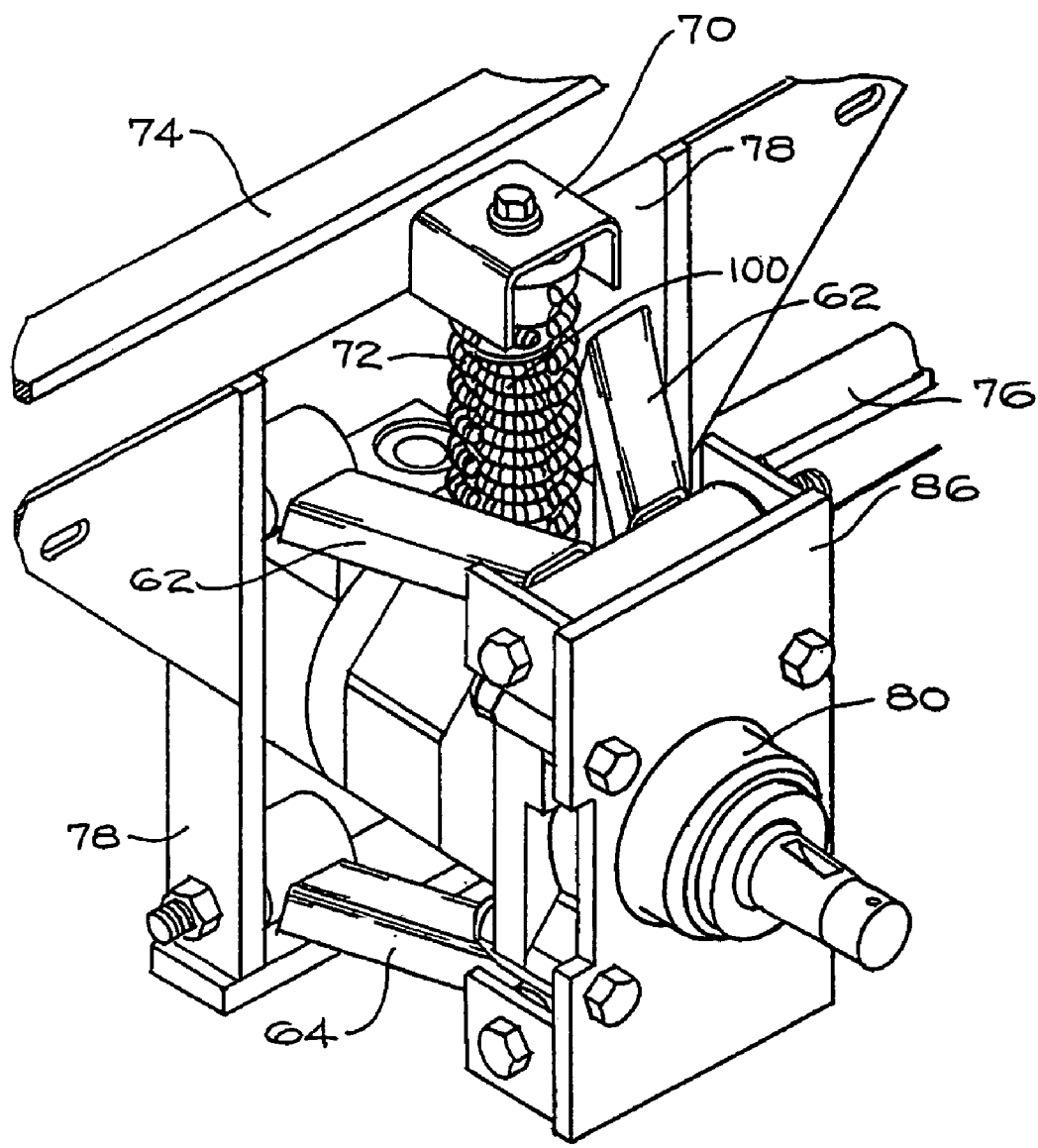
FIG. 12 is a cutaway view of a load compensation adjuster according to an embodiment of the invention, shown installed in the rear suspension system of FIGS. 6-9.

Referring to FIGS. 12-13, a load compensation adjuster such as overload spring 100 is installed inside spring 72. If suspension spring 72 is a closed, ground end, compression spring with a right hand helix, overload spring 100 is preferably a closed, ground end, compression spring with a left-hand helix. Overload spring 100 fits inside spring 72 and is approximately one inch shorter in length than spring 72. The shorter length of overload spring 100 allows spring 72 to operate at its existing rate, but when spring 72 is compressed more than one inch, overload spring 100 begins to help carry the extra weight. Overload spring 100 is preferably wound with coils in the opposite direction from spring 72. The characteristics of the preferred embodiment of overload spring 100 is detailed in Table 1.

| Spring type | compression spring, closed and grounded end |
|---|---|
| Material | chrome silicon |
| Wire Diameter | 0.2340 in. |
| Mean Diameter | 1.0160 in. |
| Inside diameter | 0.7820 in. |
| Outside Diameter | 1.2500 in. |
| Total Coils | 15.6984 in. |
| Pitch | 0.3308 in. |
| Pitch Angle | 5.9177 deg. |
| Weight | 0.6120 lbs. |
| Free Length | 5.0000 in. |
| Solid Height | 3.6734 in. |
| Load Rate (lbs./in.) @ 0 lbs. | 5.00 in. (free length) |
| @150 lbs. | 4.50 in. |
| @300 lbs. | 4.00 in. |
| @398 lbs. | 3.67 in. (solid height) |

Referring to FIG. 14, load compensation adjustment is achieved using an alternative embodiment such as a shock absorber 102 inside spring 72 in place of overload spring 100. This arrangement is commonly referred to as a coil-over suspension.

Referring to FIG. 15, load compensation adjustment is achieved using an alternative embodiment such as an air shock 104 instead of shock absorber 102, although not depicted inside spring 72 in the figure. Using air shock 104 allows adjustment of the spring tension by raising or lowering the air pressure, thereby determining the spring load or tension.

Referring to FIG. 16, load compensation adjustment is achieved by using an alternative embodiment such as an airbag 106 to replace overload spring 100 inside spring 72. Airbag 106 can be inflated or deflated for the desired suspension, either by the user or pre-inflated at the factory.

Referring to FIG. 17, an alternative embodiment for load compensation adjustment includes an airbag 108 which could replace the spring within a spring combination by acting as a variable compression spring. As the air in airbag 108 becomes compressed, the force required to compress it further increases.

Figure 18:
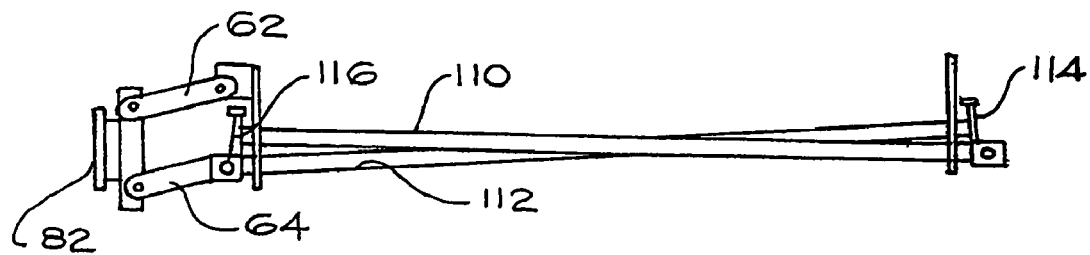
FIG. 18 is a partial view of a front or rear suspension system according to an embodiment of the present invention.

Referring to FIG. 18, a torsion bar suspension is shown connected to wheel hub 82 at the left rear wheel location for mower 10. A first torsion bar 112 is hooked to lower link 64 at one end, while another end attaches to an adjuster 114, which permits adjustment of the tension of torsion bar 112. In similar fashion, a second torsion bar 110 is hooked to the lower link 64 on the right side of mower 10, with the other end of torsion bar 110 being attached to an adjuster 116 which is connected to lower link 64 on the left side of mower 10. The right side wheel hub and upper and lower links are not shown in FIG. 18. The torsion bars 110, 112 replace the springs 72 to provide the rear wheel suspension. Load compensation is done with adjusters 114, 116. Although the torsion suspension is shown for the rear wheels, it can be used on the front wheels as well. For the front suspension system shown in FIG. 4, front transverse member 54 and springs 50 are replaced by the torsion bars in the manner just described with respect to the rear suspension system.

Figure 19:
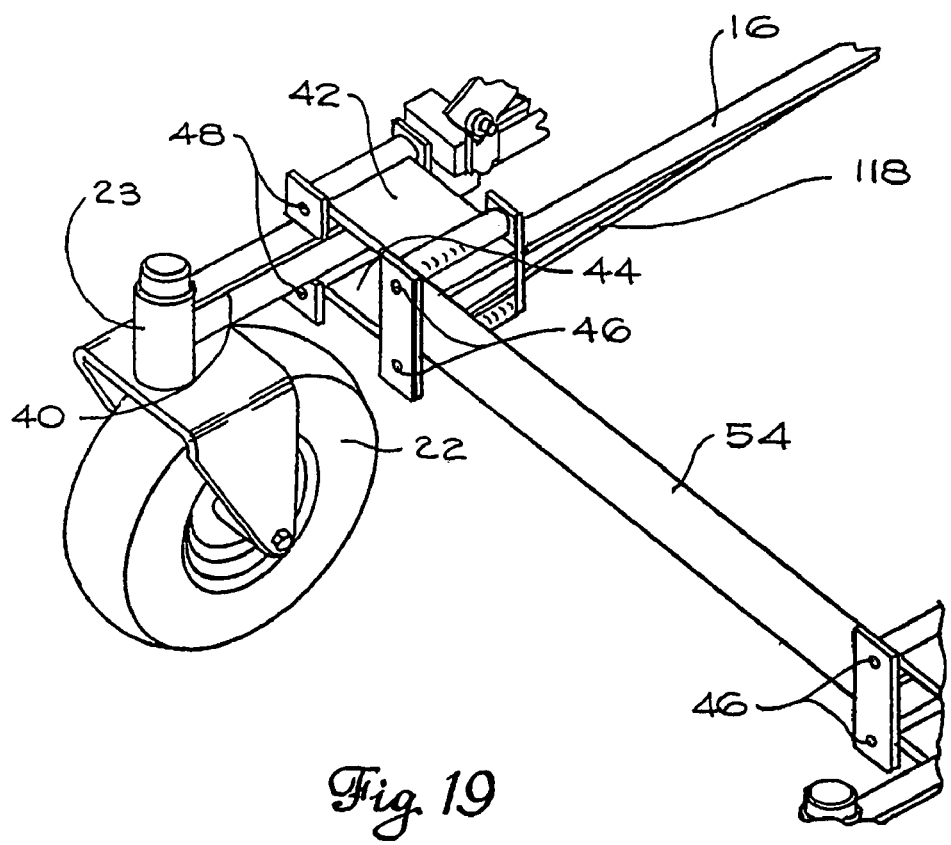
FIG. 19 is a partial view of a front or rear suspension system according to another embodiment of the present invention.

Referring to FIG. 19, an alternative embodiment of the front suspension system includes a torsion bar 118 attached to lower suspension strut 44 near the lower main frame pivot point 46. Torsion bar 118 is approximately 1.5 to 2.5 feet (45 to 76 cm) long and extends lengthwise to attach to main frame 16. A similar arrangement provides the front suspension for the other front wheel.

Figure 20:
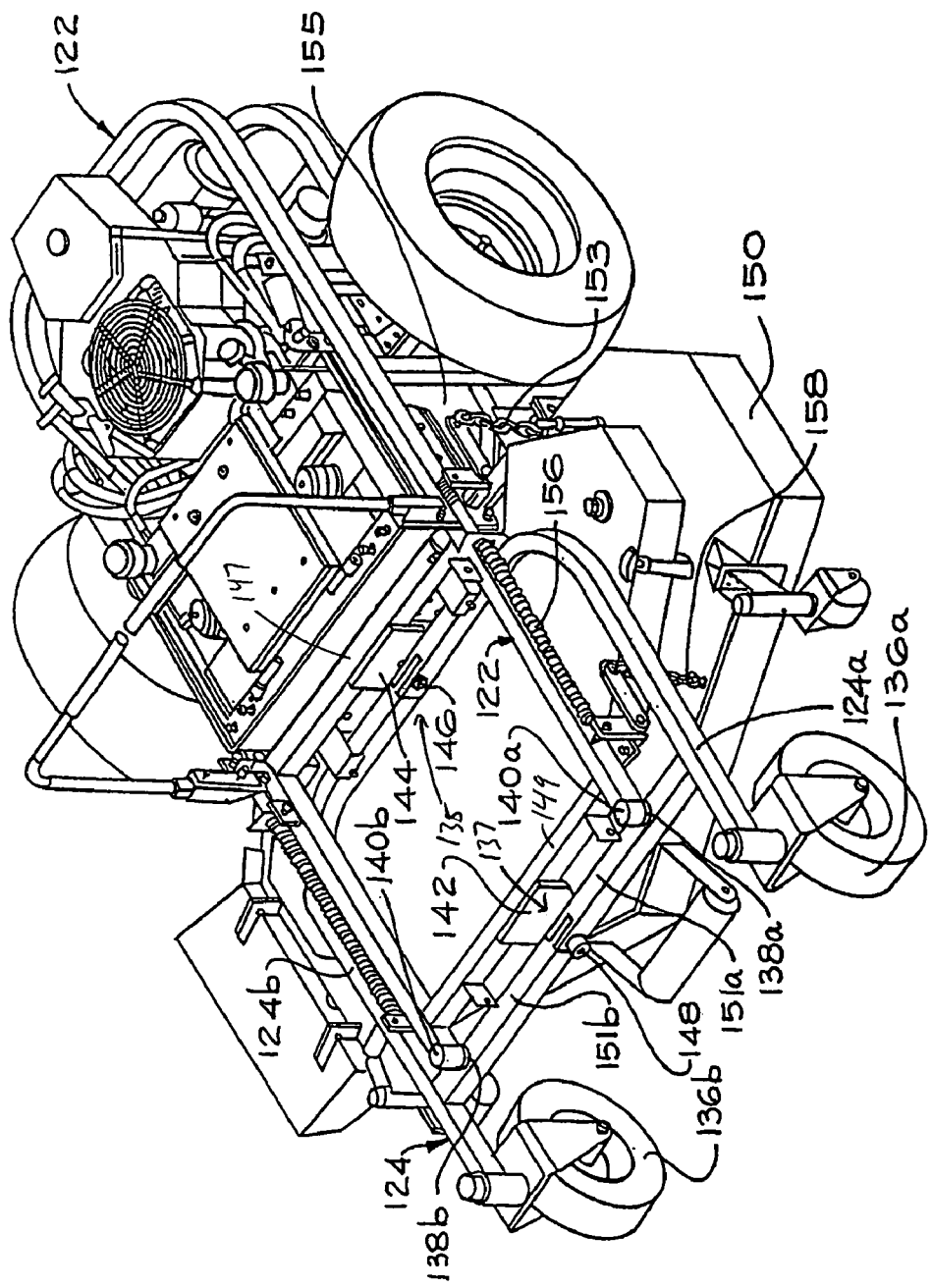
FIG. 20 is a perspective view of a mower having a front suspension system according to yet another embodiment of the present invention.

Referring to FIG. 20, in another embodiment of the present invention, a main frame 122 is connected to a pivoting subframe 124 that incorporates a front suspension system. Pivoting subframe 124 includes a left half subframe 124a which is hingeably connected to a right half subframe 124b. Two hinges, such as a front clevis joint 135 and a rear clevis joint 137, connect left and right half subframes 124a, 124b to each other. A front pivot pin 146 acts as the clevis pin for front clevis joint 135 while a rear pivot pin 148 acts as the clevis pin for rear clevis joint 137. Front pivot pin 146 is connected to a front transverse member 147 of main frame 122 via a front pivot plate 144, while rear pivot pin 148 is connected to a rear transverse member 149 of main frame 122 via a rear pivot plate 142.

A left spring pocket 140a, connected to an extension of main frame 122, houses a left spring 138a that abuts a front transverse portion 151a of left half subframe 124a, while a right spring pocket 140b, connected to an extension of main frame 122, houses a right spring 138b that abuts a front transverse portion 151b of right half subframe 124b. Thus, when a left caster wheel 136a rolls into a dip, left half subframe 124a moves with it, not affecting right half subframe 124b or main frame 122. Similarly, when a right caster wheel 136b rolls into a dip, right half subframe 124b moves with it, not affecting left half subframe 124a or main frame 122. Thus, three of the four mower wheels are on the ground at any given time, resulting in a stable, smooth ride with little or no scalping caused by the cutter deck.

In the embodiment illustrated in FIG. 20, rear suspension chains 153 for a cutter deck 150 are attached to rear wheel brackets 155 via a cutter deck lift assembly 156, while front suspension chains 158 for cutter deck 150 are attached via cutter deck lift assembly 156 to main frame 122. The weight distribution in a lawn mower of this type is approximately 75% in the rear and 25% in the front. Thus, whereas the rear of the cutter deck is preferably connected to the rear wheel brackets instead of the main frame to avoid scalping during sharp turns or over rough terrain, the front of the cutter deck is preferably connected directly to the main frame in this embodiment.

Figure 21:
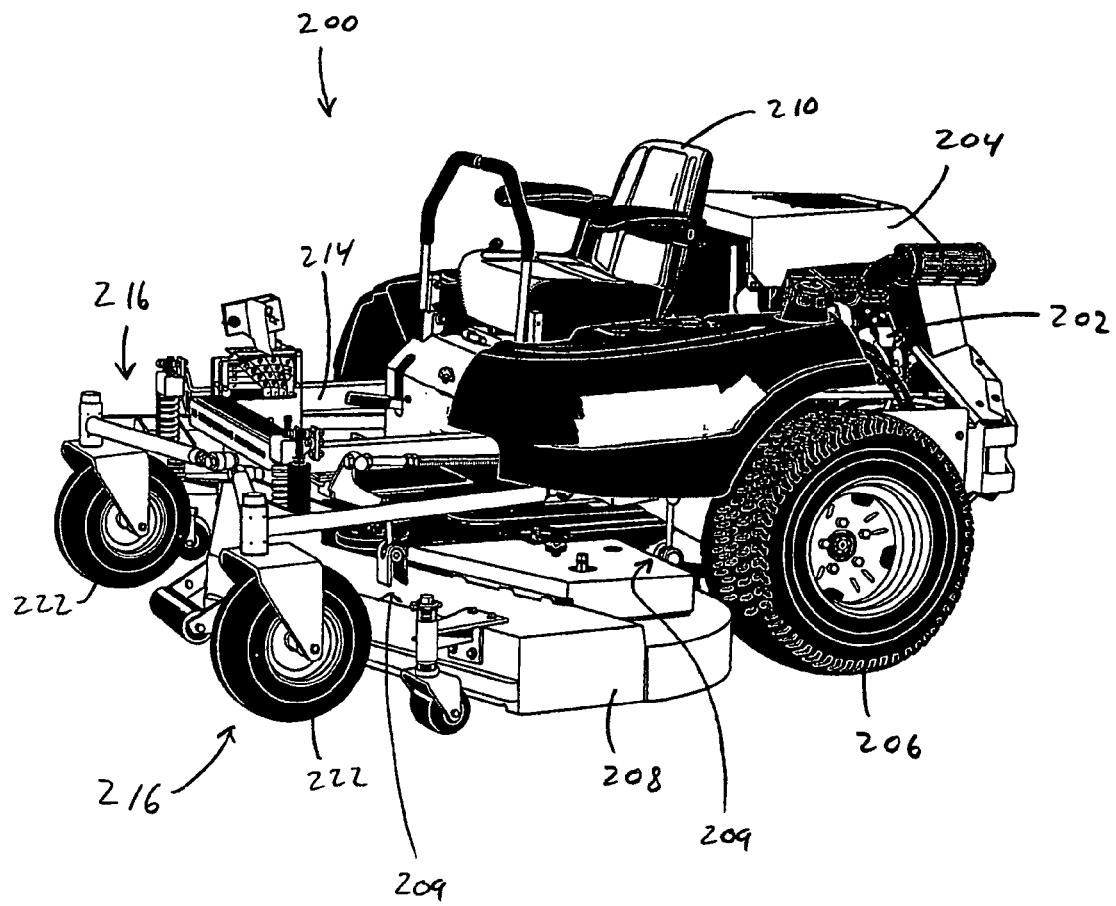
FIG. 21 is a perspective view of a mower having a front suspension system according to another embodiment present invention.

FIGS. 21-26 illustrate another embodiment of the present invention. The lawn mower 200 illustrated in FIGS. 21-26 includes a motor 202, a motor cover 204, a chassis 212, a front frame 214, a pair of front wheels 222, a pair of rear wheels 206 (only one of which is visible in FIG. 21), a cutter deck 208, a seat 210, and a pair of front wheel independent suspension assemblies 216. The particular type of lawn mower 200 illustrated in FIG. 21 is presented by way of example only. In this regard, the suspension systems of the present invention can be employed on any type of riding or non-riding lawn mower.

In the type of lawn mower illustrated in FIG. 21, the motor 202 is mounted to the chassis 212 and is covered by the motor cover 204. Also, the chassis 212 is mounted to the front frame 214, which can be a separate frame connected to a rear frame (not shown) in any conventional manner or can define a front portion of a single frame of the lawn mower 200. In some embodiments, the lawn mower 200 simply has a single frame 214 upon which the motor 202 is mounted (whether by a chassis 212 or otherwise).

Figure 24:
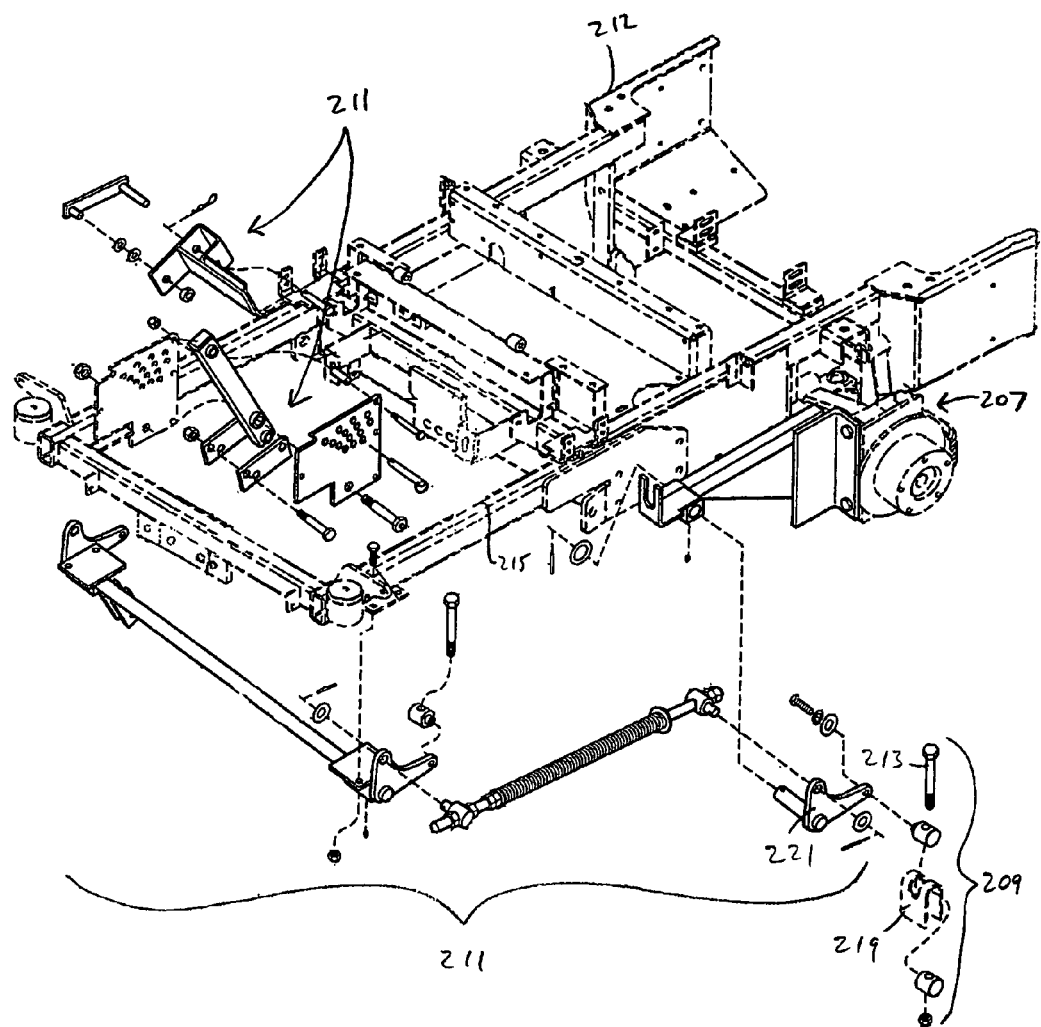
FIG. 24 is an exploded perspective view of the mower deck lift assembly shown in FIG. 21.

With reference to FIGS. 21 and 24, the rear wheels 206 of the lawn mower 200 can be mounted to the chassis 212 by a pair of rear wheel independent suspension assemblies 207, although the rear wheels 206 can instead be rigidly mounted to the mower front frame 214, can be connected to an axle that is pivotable with respect to the front frame 214, or can be attached to the front frame 214 in any other manner. Examples of rear wheel independent suspensions 207 are provided in U.S. Pat. No. 6,244,025, the disclosure of which is incorporated herein by reference insofar as it relates to rear wheel independent suspension systems.

The cutter deck 208 of the lawn mower 200 can be in any location with respect to the front and rear wheels 222, 206 and with respect to the front frame 214. However, in the embodiment illustrated in FIG. 21, the cutter deck 208 is positioned between the front and rear wheels 222, 206. The cutter deck 208 contains at least one cutter (not shown) for cutting grass or other vegetation on a surface, and in some embodiments can be raised and lowered with respect to the ground.

The cutter deck 208 can be a floating or ground-following cutter deck. The cutter deck 208 according to the present invention can be directly or indirectly connected to the frame of the lawn mower 200 in a number of different manners, some of which provide different types of cutter deck movement and cutter deck performance. For example, the cutter deck 208 can be suspended entirely from the frame of the lawn mower 200, can be suspended at the front and rear from front and rear independent suspension systems, can be suspended from the front by front independent suspension systems while being suspended from the rear by the frame of the lawn mower 200, or can be suspended from the rear by rear independent suspension systems while being suspended from the front by the frame of the lawn mower 200. Examples of the latter three types of cutter deck suspensions are provided in the embodiments of the present invention illustrated in FIGS. 27-30, 31-34, and 21-26, respectively.

The floating cutter deck 208 illustrated in FIG. 21 is presented by way of example only. In this embodiment, the cutter deck 208 is connected to and suspended from the front frame 214. Connection to the rear independent suspension assemblies 207 permits the cutter deck 208 to follow upward and downward movement of the rear wheels 206 in response to changing terrain elevation, thereby maintaining the cutter deck 208 in a more stable relationship with respect to the ground even as the lawn mower 200 traverses uneven terrain.

With continued reference to the embodiment of the present invention illustrated in FIGS. 21-26, the front end of the cutter deck 208 is not responsive to upward and downward movement of the front wheels 222. However, the rear end of the cutter deck 208 follows the upward and downward movement of the rear wheels 206 by virtue of the cutter deck's connection to the rear independent suspension assemblies 207. Such connection can be established in a number of different manners, such as the bolts 213 coupled at one end to respective brackets 219 on the rear end of the cutter deck 208 and to respective crank arms 221 pivotably coupled to the rear independent suspension assemblies 207. In other embodiments, the cutter deck 208 can be coupled to the rear independent suspension assemblies 207 in any other manner desired, such as by securing chains, cables, links, straps, bars, or other elements to the cutter deck 208 and to the rear independent suspension assemblies 207. Further examples of manners in which the rear of the cutter deck 208 can be directly or indirectly connected to the rear independent suspension assemblies 207 are provided below with regard to front independent suspension assemblies in FIGS. 27-30.

In the embodiment of the present invention illustrated in FIGS. 27-30, the mower 400 suspends the cutter deck 408 at one end from one or more front independent suspension assemblies 416, and at another end from one or more rear independent suspension assemblies 407. The cutter deck 408 can be connected to the front suspension assemblies 416 for suspension therefrom in a number of different manners, such as by securing chains, cables, links, straps, bars, or other elements to the cutter deck 408 and to the suspension assemblies 416. Such elements can be connected to the suspension assemblies by bolts, screws, hooks, pins, or other fasteners, by inter-engaging elements, and in some cases by permanent connections such as welding, brazing, and the like. As will be described in greater detail below, the elements employed to suspend the cutter deck 408 from the suspension assemblies 416 can be connected directly to the suspension assemblies or can be connected thereto via a deck lifting device (such as that shown in FIGS. 27 and 30). In this regard, the elements employed to suspend the cutter deck 408 from the suspension assemblies 416 can be connected to one or movable or immobile levers, bars, or other elements connected to the suspension assemblies 416. The elements employed to suspend the cutter deck 408 from the suspension assemblies 416 can be connected to the cutter deck 408 in any manner desired, including the manners of connection described above with reference to connections to the suspension assemblies 416.

Figure 27:
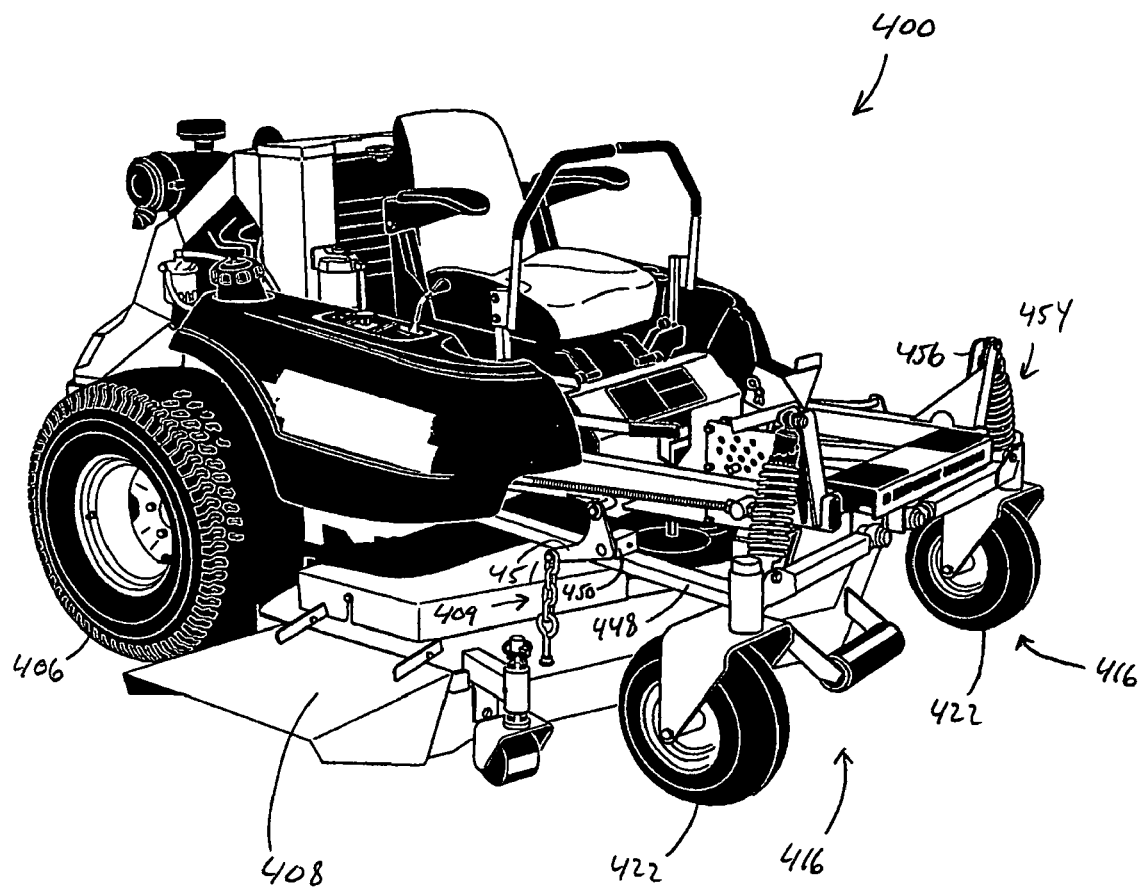
FIG. 27 is a perspective view of a mower having a front suspension system according to another embodiment of the present invention.
Figure 28:
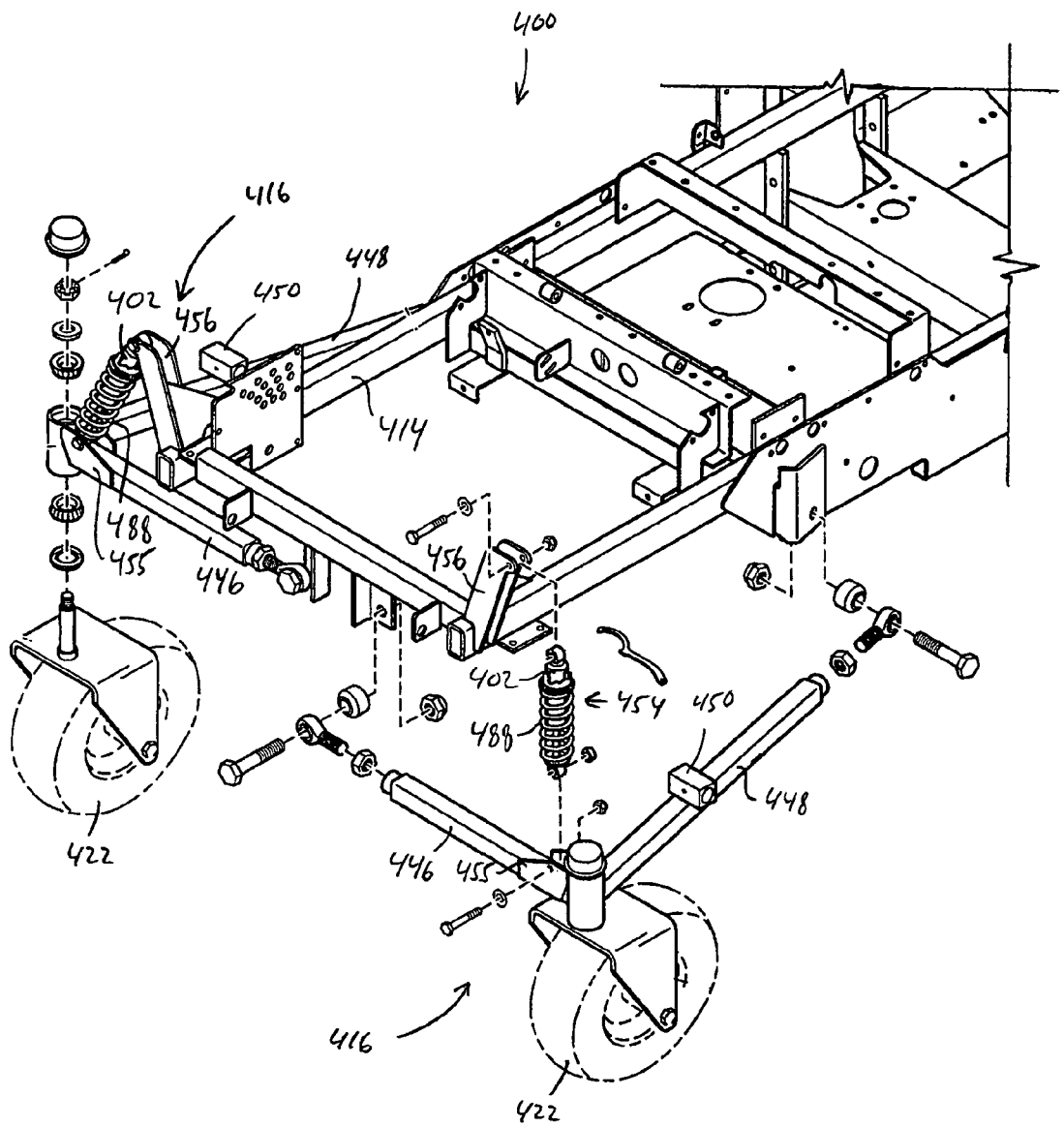
FIG. 28 is an exploded perspective view of the mower frame and front wheel independent suspension assemblies shown in FIG. 27.
Figure 29:
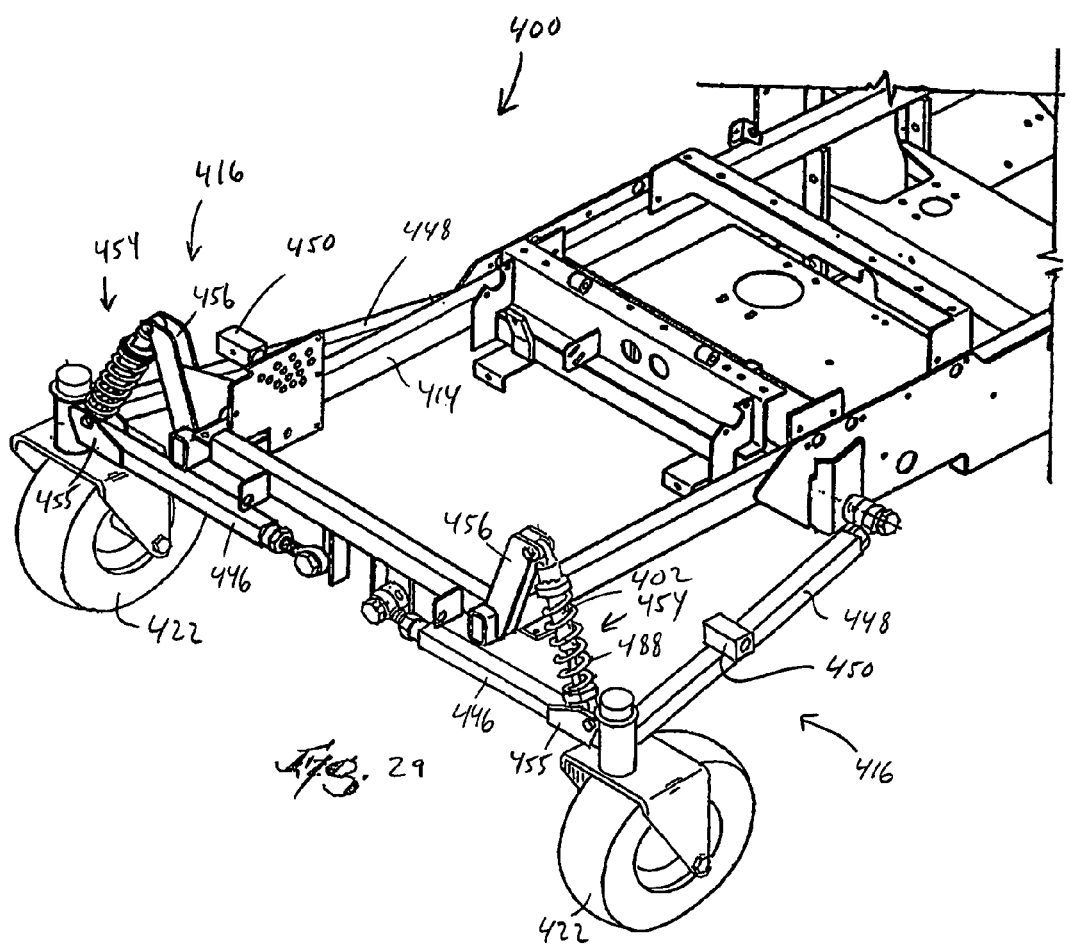
FIG. 29 is an assembled perspective view of the mower frame and front wheel independent suspension assemblies shown in FIGS. 27 and 28.
Figure 30:
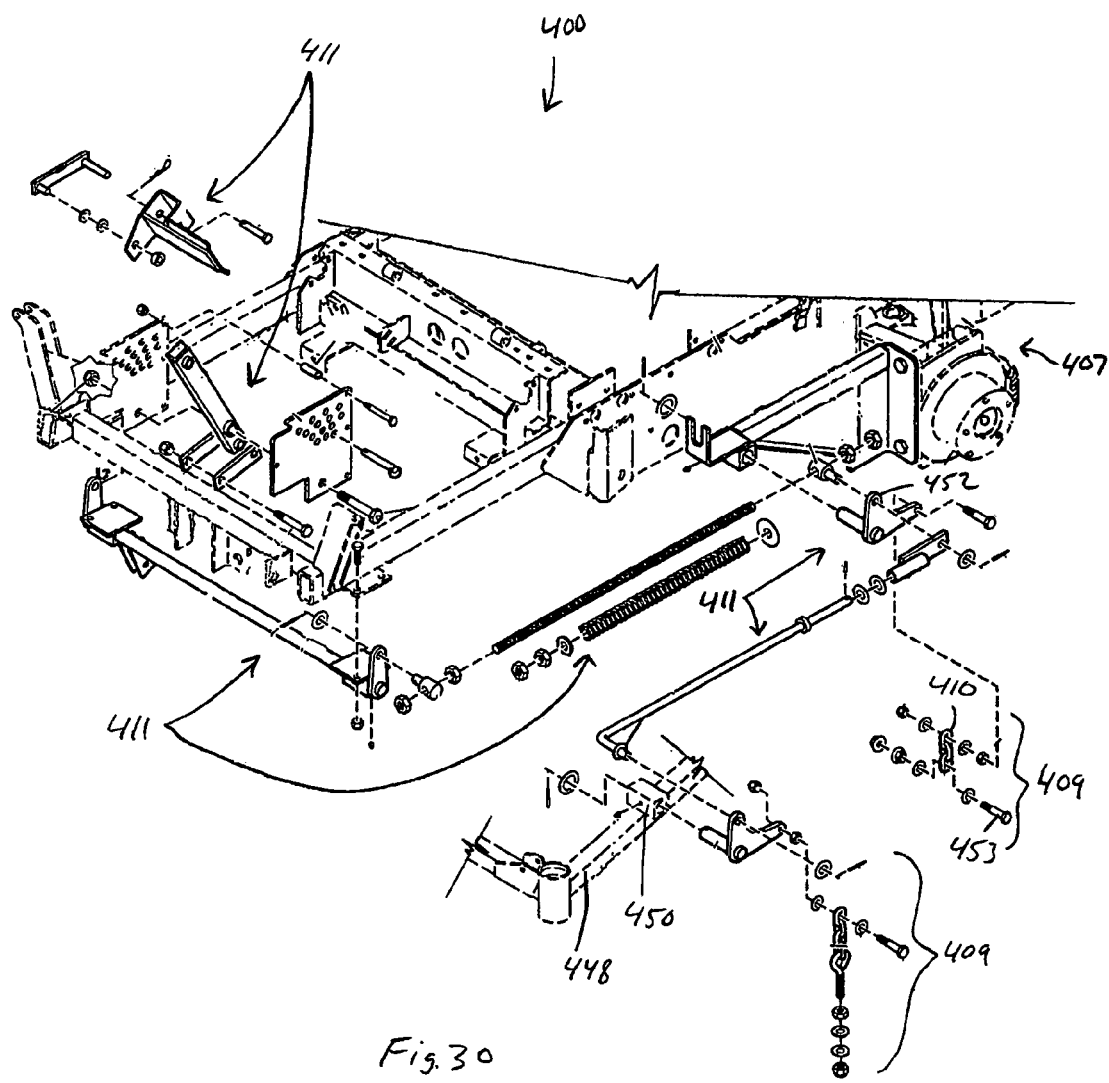
FIG. 30 is an exploded perspective view of the mower deck lift assembly shown in FIG. 27.
Figure 31:
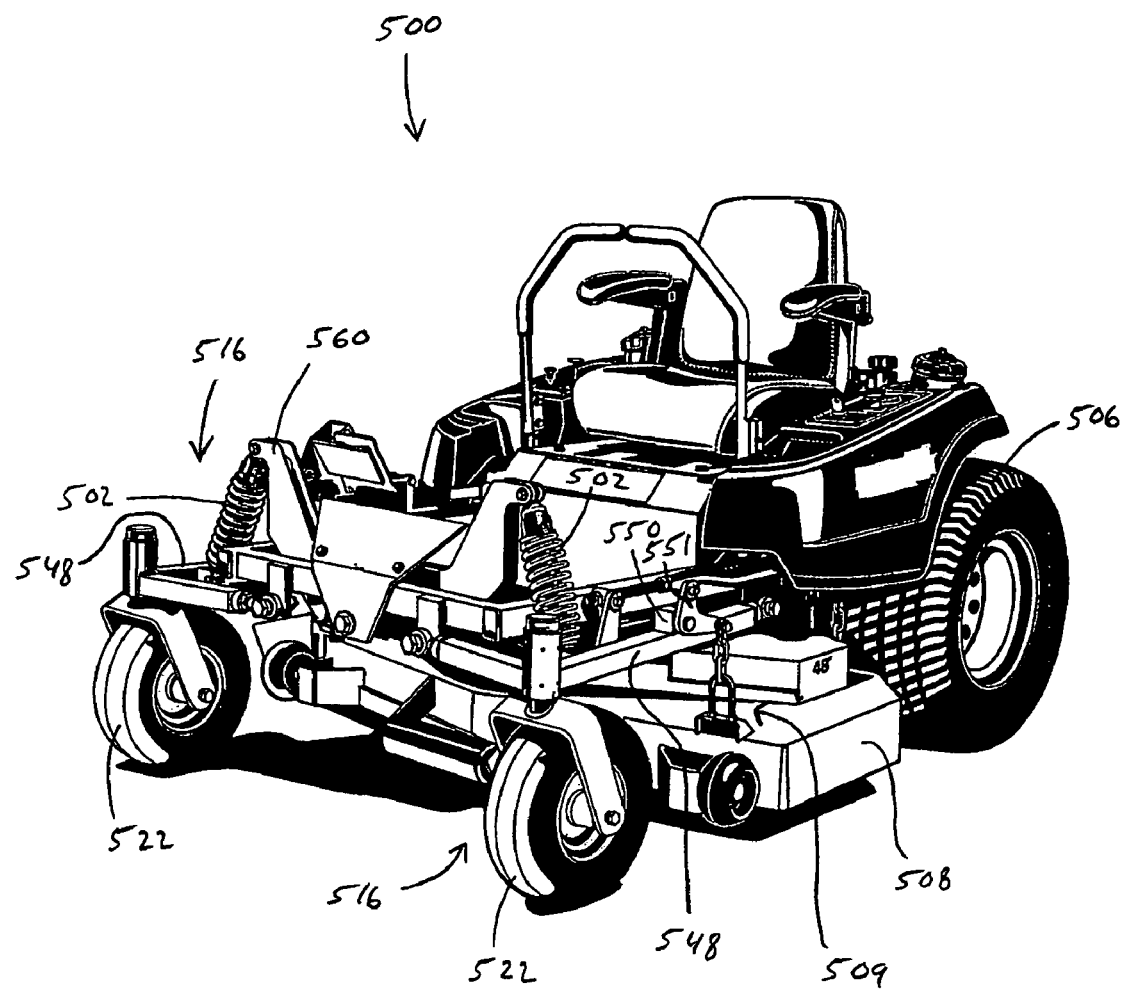
FIG. 31 is a perspective view of a mower having a front suspension system according to another embodiment of the present invention.
Figure 32:
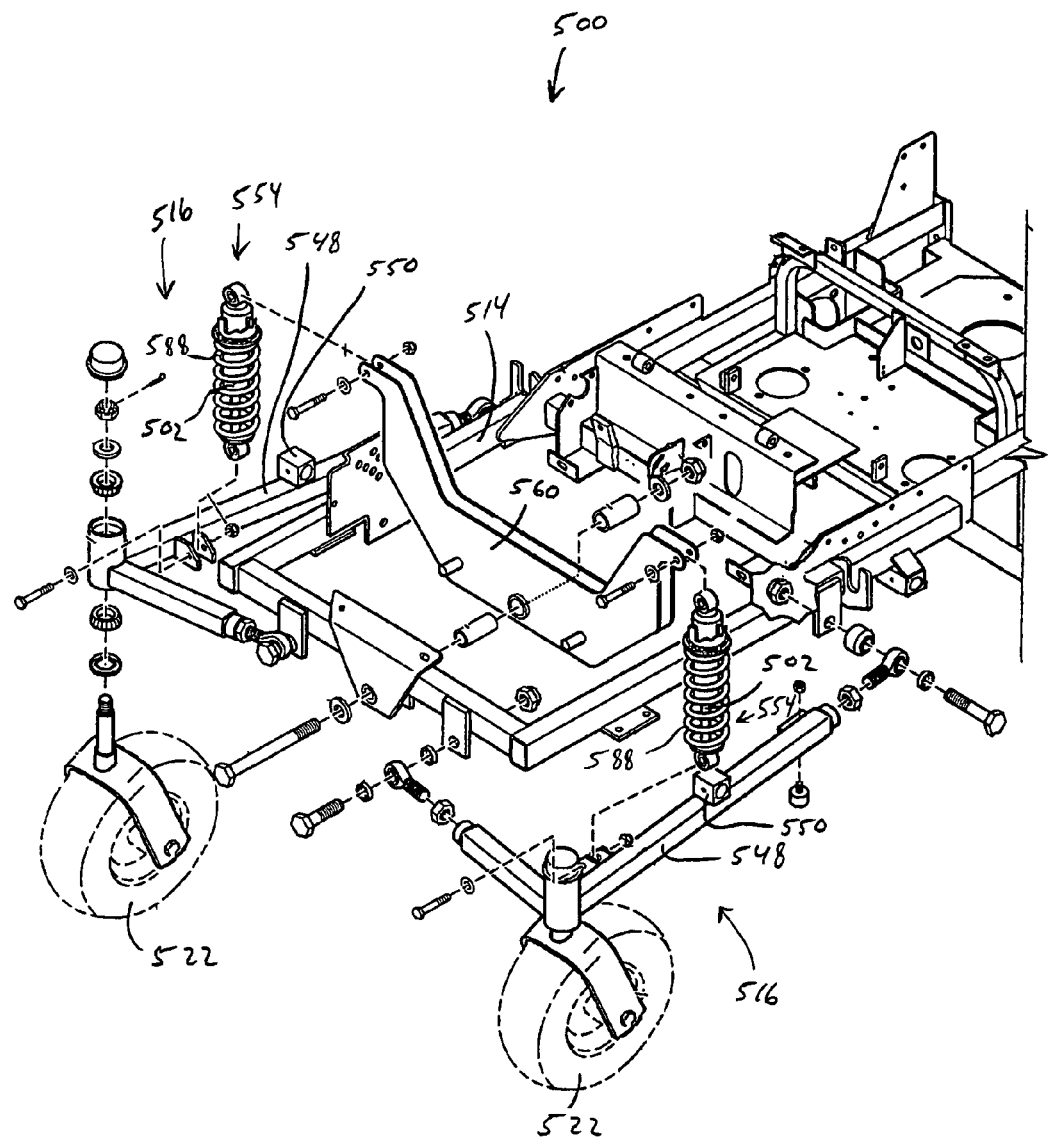
FIG. 32 is an exploded perspective view of the mower frame and front wheel independent suspension assemblies shown in FIG. 30.
Figure 33:
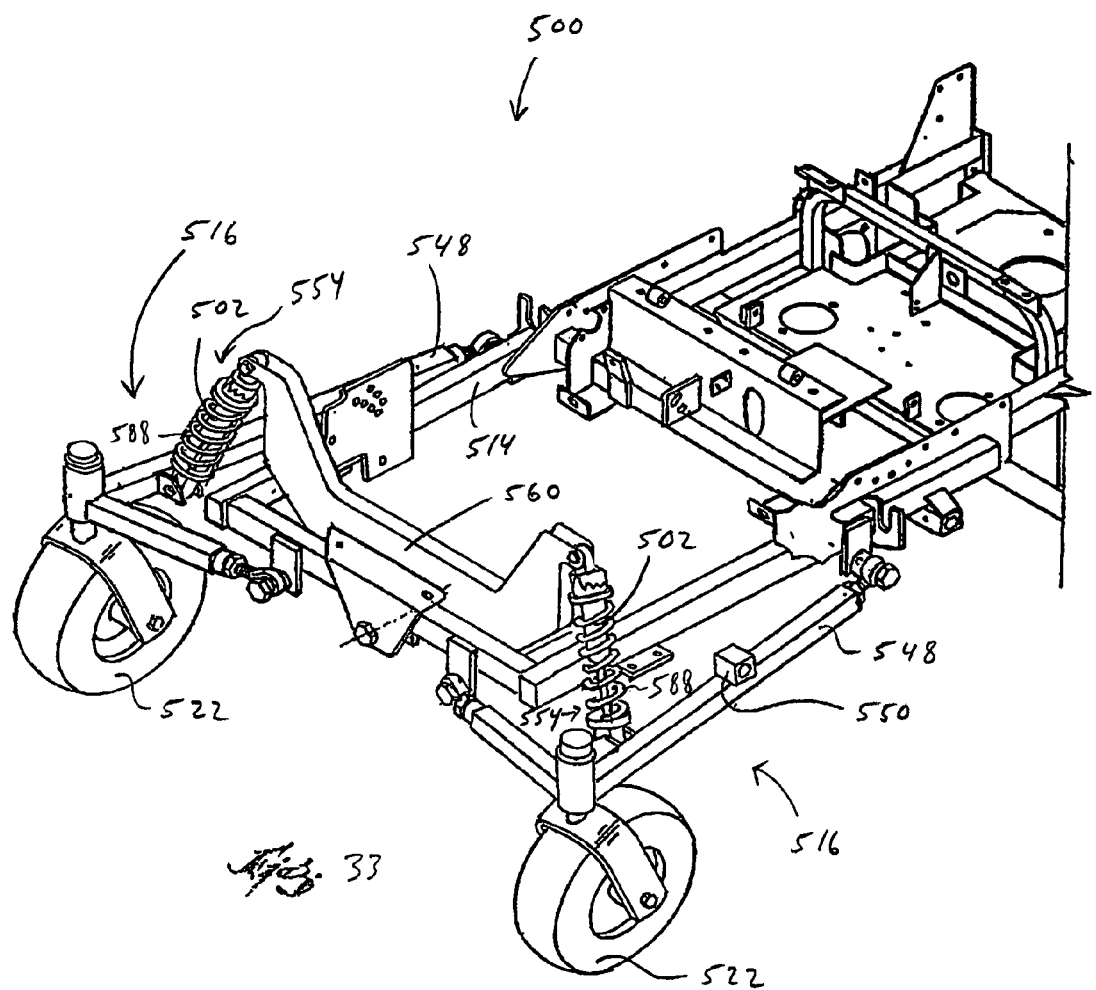
FIG. 33 is an assembled perspective view of the mower frame and front wheel independent suspension assemblies shown in FIGS. 31 and 32.
Figure 34:
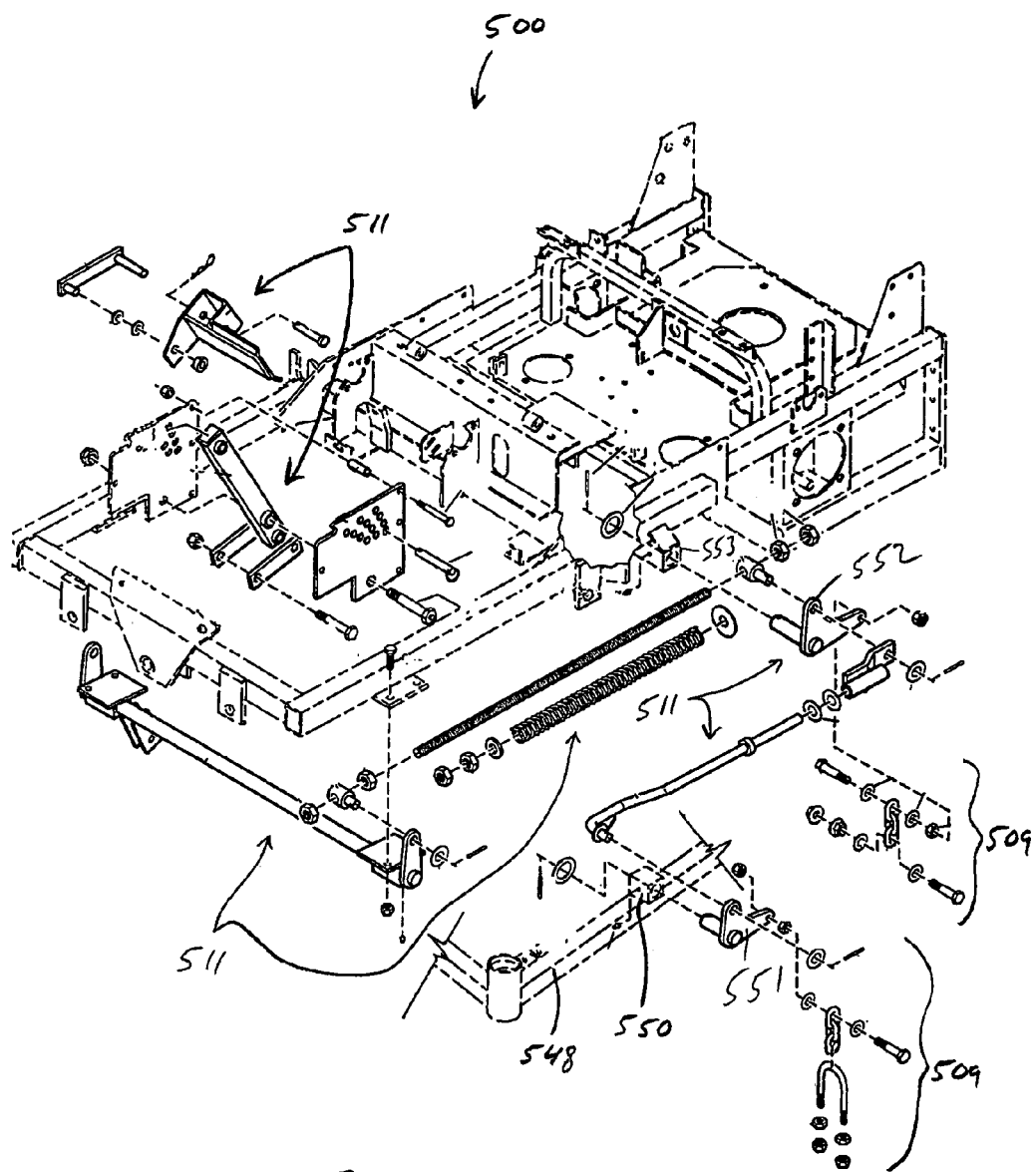
FIG. 34 is an exploded perspective view of the mower deck lift assembly shown in FIG. 31.

By way of example only, the cutter deck 408 illustrated in FIGS. 27 and 30 is suspended by chains, each of which are connected at one end to an eyebolt on the cutter deck 408 and at another end to a crank arm 451 pivotably connected to a corresponding suspension assembly 416 via a mounting block 450. The mounting blocks 450 can be integral with or welded to the second suspension arms 448, and in other embodiments can be connected in other suitable manners, such as by clamping, bolting, and the like. In still other embodiments, the crank arm 451 can be pivotably connected to the suspension arm 448 by a post of the crank arm 451 received within an aperture in the suspension arm 448 (or vice versa). It will be appreciated by one having ordinary skill in the art that the chains employed to suspend the cutter deck 408 in such embodiments can be coupled directly or indirectly to the suspension arm 448 (or any other location on the independent suspension assembly 416) in a number of other manners, each of which fall within the spirit and scope of the present invention.

As mentioned above, the rear of the cutter deck 408 in the embodiment illustrated in FIGS. 27-30 is suspended from the rear independent suspension assemblies 407. The rear of the cutter deck 408 can be connected to the rear independent suspension assemblies in any of the manners described above with reference to the same connection in the embodiment illustrated in FIGS. 21-26, and the connections described above between the front of the cutter deck 408 and the front independent suspension assemblies 416. By way of example only, and with particular reference to FIG. 30, the rear of the cutter deck 408 can be suspended by chains 410 connected to bolts 453 on the cutter deck 408 and to rear crank arms 452 pivotably connected to the rear independent suspension assemblies 407.

By virtue of the suspended connections of the cutter deck 408 from the front suspension assemblies 416, 417 (and if desired, from the rear independent suspension assemblies 407), the cutter deck 408 can follow upward and downward movement of the wheels 422, 406 in response to changing terrain elevation, thereby maintaining the cutter deck 408 in a more stable relationship with respect to the ground even as the lawn mower 400 traverses uneven terrain.

In yet another embodiment of the present invention illustrated in FIGS. 31-34, the cutter deck 508 is suspended at one end from front independent suspension assemblies 516, and at another end from the frame 514. The front of the cutter deck 508 can be suspended from the front independent suspension assemblies 516 in any of the manners described above with regard to cutter deck suspension in the earlier embodiments. By way of example only, the front end of the cutter deck 508 is coupled to suspension arms 548 of the front independent suspension assemblies 516 via front crank arms 551 pivotably coupled to the front independent suspension assemblies (such as by front mounting blocks 550 welded to the suspension arms 548 or otherwise connected thereto in any suitable manner, such as by clamping, brazing, or integrally-forming the front mounting blocks 550 with the suspension arms 548). As a result, the front end of the cutter deck 508 is responsive and follows upward and downward movement of the front wheels 522.

With continued reference to the embodiment of the present invention illustrated in FIGS. 31-34, the rear end of the cutter deck 508 can be suspended from the frame 514 in any of the manners described above with regard to cutter deck suspension in earlier embodiments. By way of example only, the rear end of the cutter deck 508 is coupled to the frame 514 via rear crank arms 552 pivotably coupled to the frame 514 (such as by rear mounting blocks 553). As a result, the rear end of the cutter deck 508 is not responsive to upward and downward movement of the rear wheels 506.

In the embodiments illustrated in FIGS. 21-34, the cutter deck 208, 408, 508 is attached to the front and/or rear independent suspension systems in any manner desired, such as by chains or cables, by links, hinges or joints, by conventional fasteners such as bolts, screws, rivets, hooks, clips, and the like. For example, in the embodiment illustrated in FIGS. 21-26, the cutter deck 208 is coupled to the front frame 214 and rear independent suspension assemblies 207 via deck hanger assemblies 209 that include conventional threaded fasteners 213 passed through brackets 219 on the cutter deck 208. As another example, in the embodiment illustrated in FIGS. 27-30, the deck hanger assemblies 409 include conventional fasteners such as, for example, eye-bolts, that are used in conjunction with chains to couple the cutter deck 408 to the front and the rear suspension assemblies 416, 407. In the exemplary embodiment illustrated in FIGS. 30-34, the deck hanger assemblies 509 include conventional fasteners such as, for example, U-bolts, that used in conjunction with chains to couple the cutter deck 508 with the front suspension assemblies 516 and the frame 514.

The deck hanger assemblies 209, 409, 509 can be attached directly to the front and/or rear independent suspension assemblies (such as to arms, flanges, or other portions of the front and/or rear independent suspension assemblies, within apertures in the front and/or rear independent suspension assemblies, and the like), or can be indirectly connected thereto by cutter deck lifting assemblies 211, 411, 511. For example, the deck hanger assemblies 209, 409, 509 in the illustrated embodiments of FIGS. 21-34 are connected to bell cranks, arms, or other elements movable by a user to lift and lower the cutter deck 208, 408, 508 with respect to the ground. Such bell cranks, arms, and other elements can be lifted and lowered by levers, pedals, cranks, motors, hydraulic or pneumatic actuators, or by any other manual or powered device. Still other devices and elements for raising and lowering a cutter deck 208, 408, 508 are well known to those skilled in the art and are not therefore described further herein.

With reference again to the embodiment of the present invention illustrated in FIGS. 22-26, the mower 200 can have a chassis 212, a front frame 214 (or front portion of a main frame 214), and a pair of front wheel independent suspension assemblies 216. The front frame 214 can be connected to the chassis 212 by a plurality of bolts or other threaded fasteners 218. Other manners of fastening the front frame 214 to the chassis 212 can instead be used. By way of example only, the front frame 214 can be connected to the chassis 212 by screws, rivets, pins, welding or brazing, inter-engaging elements, and the like, and can even be integral with the chassis 212 in some embodiments. For purposes of reference in the following description, a substantially horizontal axis 220 runs through the center of the front frame 214 and chassis 212 to divide the front frame 214 and chassis 212 into two sides. In some embodiments, the front frame 214 has opposite sides and has a front, each of which are defined by one or more beams, rods, bars, plates, or other structural members. For example, the front frame 214 in the illustrated embodiment is defined by tubular side beams 215 and a tubular front beam 217 connected together by welds (although any other manner of connecting these elements together can instead be employed, including those mentioned above with regard to connection of the chassis 212 and frame 214). The side beams 215 in the exemplary embodiment of FIGS. 21-26 are substantially parallel to the horizontal axis 220, while the front beam 217 is substantially orthogonal to the horizontal axis 220. However, any other relative orientations of these beams 215, 217 can instead be employed.

As will be appreciated by one having ordinary skill in the art, the frame 214 of the present invention can be constructed of a wide variety of structural elements. In some embodiments, these elements include tubular beams as mentioned above. Tubular beams provide a relatively strong and lightweight framework for the lawn mower 200 compared to other structural members that can be employed. In other embodiments however, the front frame 214 can be constructed partially or entirely of different structural members, including without limitation bars, rods, non-tubular beams having any cross-sectional shape (e.g., L-shapes, I-shapes, C-shapes, etc.), plates, and the like. Accordingly, as used herein and in the appended claims, the term "beam" (whether referring to the front beam 217, a side beam 215, or any other beam of the front frame 214) is intended to encompass all of these structural members.

Figure 22:
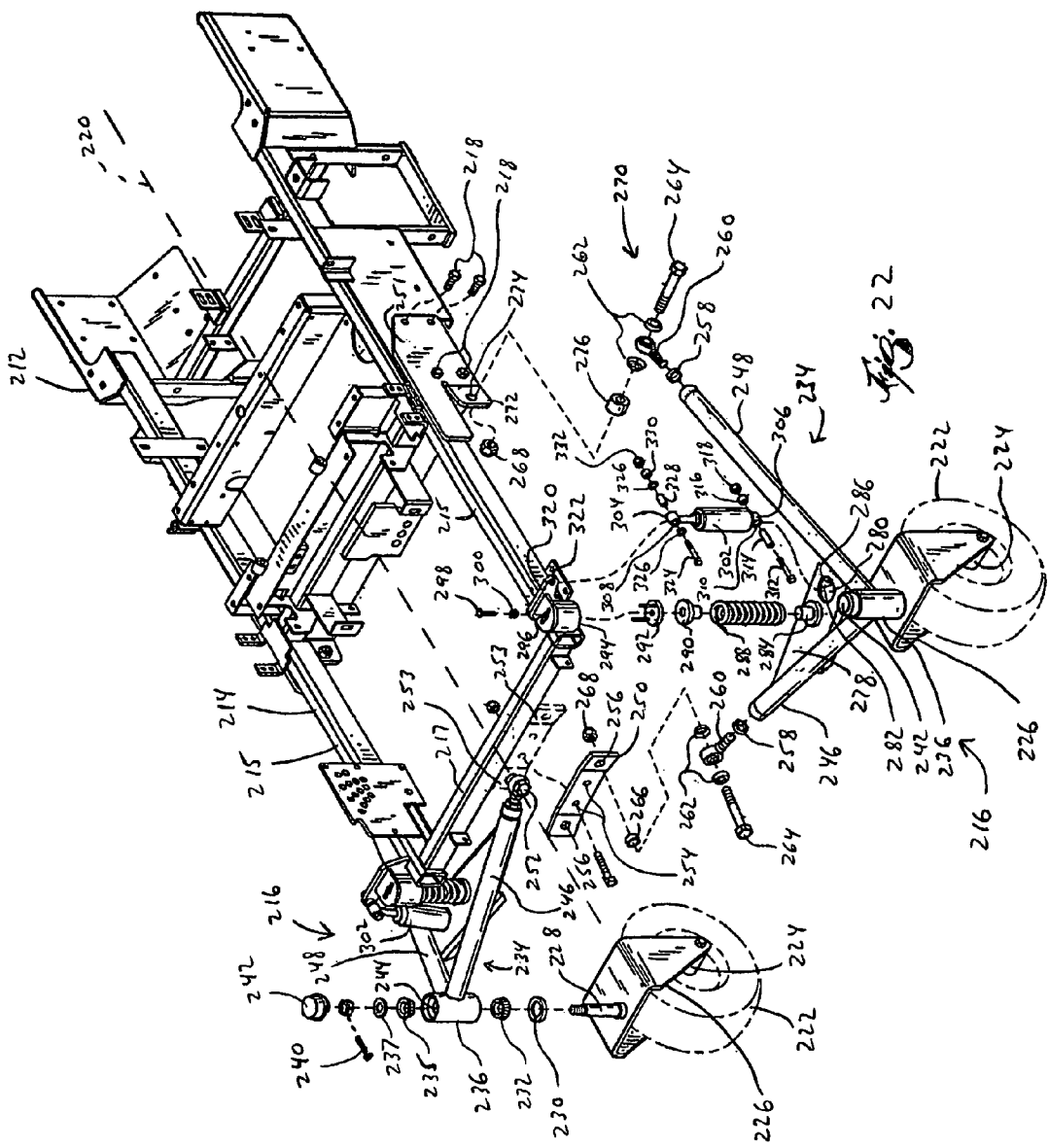
FIG. 22 is an exploded perspective view of the mower frame and front wheel independent suspension assemblies shown in FIG. 21.

With continued reference to FIG. 22, the illustrated lawn mower 200 has a pair of front wheel independent suspension assemblies 216 connected to the front frame 214. Although the independent suspension assemblies 216 can be different in structure, elements, and/or connection, both independent suspension assemblies 216 in the illustrated embodiment contain identical components and are mirror images of each other with respect to the horizontal axis 220. Each of the independent suspension assemblies 216 has a ground-contacting wheel 222. However, the independent suspension assemblies 216 can instead have other types of rolling devices, including without limitation rollers, balls, and tires connected in any conventional manner for rotation and for support of the front frame 214. For example, each of the caster wheels 222 can be supported by an axle 224 attached to an inverted yoke 226. Other types of rolling element mounting methods are possible, such as a bent axle extending outward and upward from the axis of rotation of the rolling element for connection to the rest of the independent suspension assembly 216.

In some embodiments, each front wheel 222 is capable of pivoting about a vertical or substantially vertical axis. In this regard, the front wheels 222 can be pivotably connected to the rest of the front independent suspension assemblies 216 in a number of different manners. For example, the yokes 226 of the caster wheels 222 in the illustrated embodiment are pivotably connected to the rest of the front independent suspension assemblies 216 by posts 228 extending vertically or substantially vertically from each yoke 226. These yokes 226 are pivotably connected to the rest of their respective suspension assemblies 216 in any conventional manner. By way of example only, a seal 230, washer 237, and bearings 232, 235 are received on the posts 228 in the illustrated embodiment, and enable the posts 228 and yokes 226 to pivot with respect to the front frame 214.

Each front independent suspension assembly 216 illustrated in the embodiment of FIGS. 21-26 has a first suspension arm 246 connecting the associated front wheel 222 to a front of the frame 214 and a second suspension arm 248 connecting the associated front wheel 222 to a side of the front frame 214. The posts 228 in the illustrated embodiment are pivotably connected to the suspension arms 246, 248 by being received within and connected to a joint 236 connected to the suspension arms 246, 248. Each joint 236 can take a number of different forms, and in the embodiment of FIGS. 21-26 is a cylindrical member within which the post 228 is received. Each post 228 is preferably secured within a corresponding joint 236 by a nut 238 or other threaded fastener screwed upon a threaded end of the post 228 as best shown in FIG. 22. If desired, additional hardware can help secure this connection. For example, one or more cotter pins 240 can be clipped to the nut 238 and/or post 228, can be received within an aperture or recess within the nut 238 and/or post 228, or can be connected to the post 228 in any other conventional manner to prevent disconnection of the nut 238 from the post 228. As another example, one or more washers 237 can be provided as needed to distribute force and secure the connection of the posts 228 to the joints 236.

As an alternative to the use of a cylindrical joint 236 as described above in order to connect the post 228 of each front independent suspension assembly 216 to the suspension arms 246, 248, the joint 236 can be a socket within which an end of the post 228 is received, can be defined by an aperture in either or both suspension arms 246, 248, and the like. Any conventional joint structure can be employed to establish this connection of the post 228 and wheel 222, each of which falls within the spirit and scope of the present invention.

An advantage of a cylindrical joint 236 as described above is the ability to receive bearings 232, 235 therein and to house and protect the bearings 232, 235. In this regard, other elements and structure can be used to enable the wheels 222 to pivot properly. For example, depending upon the type of joint 236 employed, ball bearings, roller bearings, sleeves or linings made of low-friction material, and other elements can be used as desired (with or without lubricating material). In the illustrated embodiment, two sets of roller bearings 232, 235 are received within the joint 236, and can be seated within lips, ledges, or other structure of the joint 236. However, any other manner of retaining these and other types of bearings can be used, depending at least partially upon the type of joint 236 employed to connect the wheels 222 with respect to the rest of the front independent suspension assemblies 216.

Although a threaded connection is employed in some embodiments to secure the post 228 with respect to the rest of the front independent suspension assembly 216, it should be noted that a number of other type of connections can be used. By way of example only, the post 228 can be snap-fit, press-fit, or screwed into the joint 236 (or within a collar, lug, socket, or other fitting within the joint 36), can be assembled on opposite ends or sides of the joint 236 using any conventional fasteners, and the like.

In some embodiments, it may be desirable to protect the joint 236 and its components from dirt, debris, and other foreign materials and to retain any lubricant material therein. To this end, the joint 236 can be capped, can be received within a boot, grommet, housing, or shroud, and the like. For example the joint in the embodiment shown in FIGS. 21-26 is covered with a cap 242.

As mentioned above, each front independent suspension assembly 216 in the embodiment of FIGS. 21-26 has a first suspension arm 246 connecting a front wheel 222 to a front of the frame 214 and a second suspension arm 248 connecting the front wheel 222 to a side of the front frame 214. The first suspension arms 246 can be connected at a common location on the front of the frame 214 (whether by a common bolt 264 or other fastener, by another common connection, or otherwise). Alternatively, the first suspension arms 246 can be connected to the front of the frame 214 at different locations along the front of the frame 214.

In some embodiments, the first and second suspension arms 246, 248 are elongated tubular elements connected to form an acute angle therebetween. However, the first and second suspension arms 246, 248 can instead be bars, beams, or other elongated elements that connected to define an angle therebetween (and in some embodiments, an acute angle therebetween). The suspension arms 246, 248 can have any relative length. In the illustrated embodiment for example, the first suspension arm 246 is shorter than the second suspension arm 248. The suspension arms 246, 248 in the embodiment of FIGS. 21-26 are welded to the joint 236. In other embodiments, the suspension arms 246, 248 can be connected to the joint 236 in any other manner, including without limitation by brazing, by one or more conventional fasteners such as screws, bolts, rivets, clamps, clips, and the like, by pin and aperture, finger and slot, hook and aperture, and other types of connections, by threaded, press-fit, or snap-fit connections, by inter-engaging elements, and the like.

As an alternative to direct connection to the joint 236, either or both suspension arms 246, 248 can be indirectly connected to the joint 236, such as by connection to a brace, strut, plate, reinforcement or other element connected to the joint 236, by connection of the first suspension arm 246 directly to the joint 236 and by connection of the second suspension arm 248 to the first suspension arm 246 (or vice versa), and the like.

The use of two suspension arms 246, 248 of each front independent suspension enables connection of each front independent suspension assembly 216 to two different locations on the front frame 214: (i) one location at the front of the frame 214 and one location at the side of the front frame 214, (ii) two locations at the front of the frame 214, or (iii) two locations at the side of the front frame 214. Although two suspension arms 246, 248 are preferred for this purpose, one having ordinary skill in the art will appreciate that the same results can be achieved by using other elements and structures.

For example, the suspension arms 246, 248 can be replaced by a single arm having a shape similar to the shape formed by two separate suspension arms 246, 248. Also, the suspension arms 246, 248 can be supplemented by additional suspension arms to form a double wishbone suspension system, including upper first and second suspension arms and lower first and second suspension arms. As an alternative to the manner of connection illustrated in FIGS. 21-23, 25, and 26, such upper and lower first suspension arms may be connected to the front of the frame 214 or the side of the front frame 214 along with the upper and lower second suspension arms. Additionally, the upper and lower first and second suspension arms can all be connected to the front of the frame 214. As yet another example, a plate can be shaped to connect to the front of the frame 214 and to extend around a front corner of the frame 214 for connection to a side of the front frame 214. Still other elements and structure can be employed to connect the joint 236 to the front and side of the front frame 214, or to connect the joint 236 to only the front or only the side of the front frame 214, each of which falls within the spirit and scope of the present invention.

Each of the suspension arms 246, 248 can be connected directly to the front frame 214 in a number of different manners. In some embodiments, the suspension arms 246, 248 are pivotably connected to the front frame 214 to enable upward and downward movement of the front independent suspension assemblies 216. Any type of pivotable connection can be employed, such a ball and socket connection, a pivot and aperture connection, a hinge connection, and the like. One having ordinary skill in the art will appreciate that still other manners of pivotal connection are possible. In the illustrated embodiment of FIGS. 21-26, both suspension arms 246, 248 are pivotably connected to the front frame 214 by bolts 264 as will be described in greater detail below.

Although direct connection to the front frame 214 is possible, the suspension arms 246, 248 in some embodiments are connected to plates, bars, rods, or other elements shaped to provide an improved interface between the suspension arms 246, 248 and the front frame 214. More specifically, the suspension arms 246, 248 in many embodiments are oriented at an angle with respect to that part of the front frame 214 to which they connect, thereby making such a connection more difficult. Therefore, the suspension arms 246, 248 of some embodiments are connected to elements shaped to better establish an angled connection to the front frame 214. In the illustrated embodiment of FIGS. 21-26 for example, the first suspension arm 246 is connected to a suspension front plate 250 on the front of the front frame 214, while the second suspension arm 248 is connected to a suspension side plate 251 of the side of the front frame 214. The suspension front and side plates 250, 251 in this exemplary embodiment are welded to the front frame 214, but can be connected thereto by fasteners or in any of the manners described above with reference to the connection between the first and second suspension arms 246, 248 and the joint 236. In some embodiments, the suspension front and side plates 250, 251 can even be integral with the front frame 214, such as by being stamped, molded, pressed, cast, or otherwise defined by a part of the front frame 214.

Each first suspension arm 246 can be pivotably connected to the front of the frame 214 (and in some cases, to a common suspension front plate 250 as shown in FIGS. 21-26 or to respective suspension front plates) by a front pivot assembly 252. As mentioned above, the front pivot assembly 252 can take a number of different forms. In the illustrated embodiment for example, the front pivot assembly 252 includes a ball joint 260 attached the first suspension arm 246 by a threaded fastener such as a nut 258 threaded onto a threaded extension of the ball joint 260, a pair of joint seals 262, and a bolt 264 passed through apertures in the ball joint 260 and joint seals 262. If desired, a spacer 266 can be located between the ball joint 260 and the front plate 250 to provide clearance between the ball joint 260 and the front plate 250. The ball joint 260 can instead be connected to the first suspension arm 246 by being threaded into a threaded aperture therein, by one or more conventional fasteners, or in any of the manners described above with reference to the connection between the first and second suspension arms 246, 248 and the joint 236. Although not required, the joint seals 262 can be employed for purposes of keeping the ball joint 260 free of dirt, debris, and foreign matter.

A bolt 264 can be employed for pivotable connection to the ball joint 260 as described above. However, the bolt 264 can be replaced by any other element received within the ball joint 260, including without limitation a pin or rod, a headed post, extension, or any other element extending into the ball joint 260 from the front plate 250 or frame 214. In other embodiments, a ball joint socket 260 be attached to the front plate 250 or frame 214 and can pivotably receive a pin, rod, headed post, extension, or other element attached to the first suspension arm 246. The bolt 264 of the front pivot assembly 252 can extend into an aperture in the suspension front plate 250 and can be secured therein by a nut 268 or other conventional fastener.

As discussed above, the suspension front plate 250 can be shaped to connect the first suspension arm 246 at an angle with respect to the front of the frame 214. One having ordinary skill in the art will appreciate that a number of different front plate shapes can be employed to establish this angled connection. By way of example only, the suspension front plate 250 can have a wing, flange, arm, tab, or other portion 253 that provides a mounting location disposed at an angle with respect to the front of the frame 214. In embodiments in which both front independent suspension systems are connected to a common suspension front plate 250 (see FIGS. 21-26), the suspension front plate 250 can have two such portions 253 providing two mounting locations disposed at respective angles with respect to the front of the frame 214. For different suspension and handling characteristics of the lawn mower 200, the first suspension arm 246 in some embodiments can be connected to the suspension front plate 250 in one of two or more provided locations. By way of example only, the bolt 264 in the illustrated embodiment can be passed through one of a series of apertures in the suspension front plate 250 (e.g., arranged in a horizontal, vertical, or diagonal line, in a curved line, and the like). Connection to each different aperture can thereby provide a different resting position of the front independent suspension assembly 216 to provide different handling characteristics of the lawn mower 200.

Figure 23:
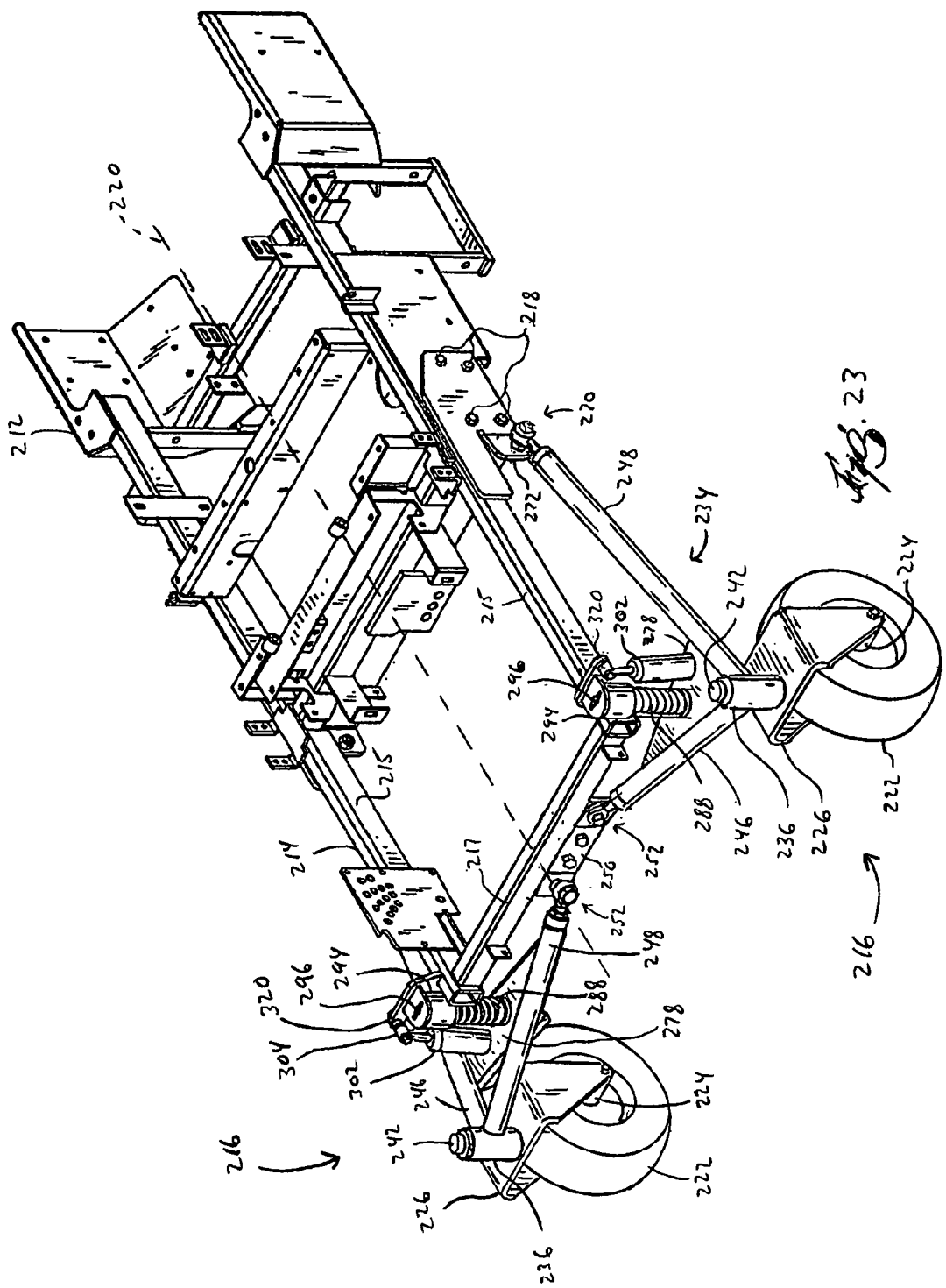
FIG. 23 is an assembled perspective view of the mower frame and front wheel independent suspension assemblies shown in FIGS. 21 and 22.

With continued reference to FIGS. 22 and 23, the second suspension arm 248 in the illustrated embodiment is mounted to the front frame 214 by a side pivot assembly 270. The side pivot assembly 270 in the illustrated embodiment has the same or similar elements as the front pivot assembly 252. The second suspension arm 248 can be connected to the front frame 214 via a suspension side plate 251. In some embodiments, the second suspension arm 248 is connected to a wing, flange, extension, tab, or other portion 272 of the suspension side plate 251 disposed at an angle with respect to the side of the front frame 214 for the same reasons discussed above. A bolt 264 can be received within a ball joint 260, joint seals 262, a spacer 276, and an aperture 274 in the suspension side plate 251, and can be retained therein by a nut 268.

The alternative assemblies and elements described above with reference to the connection between the first suspension arm 246 and the suspension front plate 250 (or directly to the front frame 214 in other embodiments) apply equally to the connection between the second suspension arm 248 and the suspension side plate 251 or front frame 214.

The front and side pivot assemblies 252 and 270 allow the suspension arms 246, 248 to move in a substantially upward and downward vertical direction relative to the front frame 214. Depending at least partially upon the lengths of the first and second suspension arms 246, 248 and the location of their direct or indirect connection to the front frame 214, other movement such as curved or horizontal movement is possible.

In some embodiments of the present invention, it is desirable to strengthen the front independent suspension assemblies 216 and/or to provide additional structure to which other elements, structure, and devices of the front independent suspension assemblies 216 can be connected. Such additional structure can include one or more plates, rods, bars, tabs, wings, extensions, bosses, platforms, struts, and other framework connected to the first suspension arm 246, the second suspension arm 248, and/or the joint 236. These elements and structure can be connected to the suspension arms 246, 248 and joint 236 in any conventional manner, including those manners described above with reference to the connection between the first and second suspension arms 246, 248 and the joint 236. In the illustrated embodiment for example, a support plate 278 is positioned between the first suspension arm 246 and the second suspension arm 248 (either below the arms 246, 248 as illustrated in FIGS. 21-26, above the arms 246, 248, or on substantially the same level as the arms 246, 248) and can be welded to both arms 246, 248.

Some embodiments of each front independent suspension assembly 216 according to the present invention have a shock absorber 302 and/or a suspension spring 288. The shock absorber 302 and the suspension spring 288 can be connected between the front frame 214 and the front independent suspension assembly 216 to absorb shock transmitted from the wheels 222 and to bias the front independent suspension assembly 216 in a downward direction.

The shock absorber 302 can be a conventional hydraulic shock absorber. However, the shock absorber 302 can take a number of other forms, including without limitation an air shock, an airbag, a coil, torsion, or other spring, and the like. Although the shock absorber 302 can be connected in any conventional manner to the front frame 214 and to any part of the front independent suspension assembly 216, the shock absorber 302 in the embodiment illustrated in FIGS. 21-26 is located between and connected to the support plate 278 and the front frame 214 (or a fixture on the front frame 214). In this regard, the shock absorber 302 can be welded or brazed to the support plate 278 and front frame 214, can be connected thereto with bolts, screws, rivets, pins, clips, clamps, or other conventional fasteners, or can be connected thereto in any other manner desired. In some embodiments, the shock absorber 302 can be received through an aperture 280 in the support plate 278 for connection to a bottom or underside portion thereof.

In the embodiment illustrated in FIGS. 21-26, the shock absorber 302 has a top mount 304 and a bottom mount 306, each mount 304 and 306 having an aperture 308 and 310, respectively, to receive fasteners 312 and 324 therethrough. The fasteners 312, 324 (which can be bolts as shown in the figures or can be any other conventional fastener desired) can be received through one or more apertures 286, 322 in the support plate 278 and a bracket 320 extending from the front frame 214 and through the apertures 308, 310 in the top and bottom mounts 304, 306 of the shock absorber 302. In some embodiments such as that shown in the figures, the support plate 278 can be shaped to define a bracket 282 for connection to the bottom mount 306 of the shock absorber 302. Nuts 318, 332 or other fasteners can be employed to secure the fasteners 312, 324 once installed. Additional hardware such as spacers 314, 316, 328, 330 and washers 326 can be employed as needed to connect the shock absorber 302 to the front frame 214 and to the rest of the front independent suspension assembly 216.

The suspension spring 288 in the embodiment of FIGS. 21-26 is a coil spring that can be retained in position in a number of manners in order to bias the rest of the front independent suspension assembly 216 in a downward direction. In some embodiments for example, the suspension spring 288 is received upon a spring retainer 284 on the support plate 278 and upon a spring retainer 290 connected to the front frame 214. The spring retainers 284, 290 can be clips, clamps, or other elements employed to hold the spring 288 in place. In the embodiment illustrated in FIGS. 21-26, the spring retainers 284, 290 are inserts that are received within the ends of each spring 288 and are connected to the support plate 278 and the front frame 214 in any conventional manner. In other embodiments, the spring retainers 284, 290 can be sockets within which the ends of the springs 288 are received, recesses in the support plate 278 and front frame 214 (or structure attached thereto), clamps, brazing, or welds holding either or both ends of the spring 288 in place, and the like. Any other manner of holding the springs 288 in place can instead be employed as desired.

As an alternative to connection of a spring retainers 284, 290 directly to the support plate 278 and front frame 214, either or both of these retainers 284, 290 can be connected to an adjusting element or device for changing the amount of compression of the spring 288. For example, the upper end of the springs 288 in the illustrated embodiments each seat against an adjusting plate 292 received within a spring seat 294 defined by the front frame 214 or connected to the front frame 214 in any conventional manner. The spring seat 294 can be provided with an aperture 296 within which is received an adjustment screw 298 or other threaded fastener. The screw 298 can be received through the spring seat aperture 296 and into an aperture in the adjusting plate 292 so that turning the screw 298 causes the adjusting plate 292 to compress or reduce the compression upon the spring 288. If desired, one or more guides 299 can extend from the adjusting plate 292 to be received within extensions of the spring seat aperture 296 or dedicated apertures in order to prevent the adjusting plate 292 from turning with the screw 298. Once the screw 298 has been turned to move the adjusting plate 292 to a desired position, a nut 300 can be tightened on the screw 298 to hold the screw 298 and adjusting plate 292 in place.

Although the spring seat 294, adjusting plate 292, adjustment screw 298, and nut 300 are described above as being associated with an upper end of the spring 288, this type of adjustment mechanism can also or instead be provided on the bottom end of the spring 288. In addition, it should be noted that a number of other spring adjustment mechanisms exist and can be used to adjust compression of the springs 288 in the present invention. Each of these alternative spring adjustment mechanisms falls within the spirit and scope of the present invention.

As the front independent suspension assemblies 216 of the lawn mower 200 travel in generally upward and downward vertical directions due to the front and side pivot assemblies 252 and 270 traversing uneven terrain, the shock absorbers 302 (if used) dampen the shock delivered to the mower front frame 214, chassis 212, and operator. This creates a more comfortable ride for the operator, thereby allowing the operator to run the mower 200 at more efficient speeds. The front independent suspension assemblies 216 can also absorb a significant amount of vertical movement caused by the uneven terrain, thereby preventing much of the vertical movement of the front frame 214 and chassis 212. As a result, vertical movement of the cutter deck 208 can be reduced to improve the cutting performance of the lawn mower 200. In addition, when one of the front wheels 222 runs over a large rock, bump, dip, hole, or otherwise experiences a change in elevation causing the wheel 222 to move vertically upward or downward, the improved front independent suspension assembly 216 of the present invention dampen the effect on the other wheels. Thus, the wheels maintain better contact with the ground, giving the lawn mower 200 better traction.

In many respects, the front suspension systems 416, 516 employed in the exemplary embodiments of the present invention illustrated in FIGS. 27-30 and 31-34 are similar in construction and operation to those described above with reference to the embodiment illustrated in FIGS. 21-26. Accordingly, with the exceptions described below and those discussed earlier, reference is hereby made to the description of the embodiment illustrated in FIGS. 21-26 for details regarding the suspension systems 416, 516 illustrated in FIGS. 27-30 and 31-34.

In the embodiment of the present invention illustrated in FIGS. 27-30, the shock absorber 402 of each front suspension system 416 is located within the spring 488 of the same system 416. This shock absorber and spring assembly 454 is connected to the front suspension arm 446, and can be secured thereto with flanges, bosses, plates, or other structure as desired. In addition, this shock absorber and spring assembly 454 is connected to the frame 414 via a bracket 456 extending from the frame 414, and is connected to the first suspension arm 446 via a bracket 455. Although the connection locations of the shock absorber and spring assembly 454 can be located to position the shock absorber and spring assembly 454 in a substantially vertical orientation, in some embodiments (such as that shown in FIGS. 27-30), the shock absorber and spring assembly 454 is instead oriented at acute angle toward the frame 414.

In the embodiment illustrated in FIGS. 31-34, the shock absorber 502 of each front independent suspension system 516 is located within the spring 588 of the same system 516. The shock absorber and spring assembly 554 is connected to the second suspension arm 548, and can be secured thereto with flanges, bosses, plates, or other structure as desired. In addition, this shock absorber and spring assembly 554 is connected to a pivotable mount 560, such as by using similar hardware and methods of attachment as the shock absorber 302 of FIGS. 21-26 or in any other suitable manner.

The pivotable mount 560 can take a number of different forms, each having a point about which the pivotable mount 560 pivots responsive to force exerted by the shock and spring assemblies 554 in upward and downward movement of the front independent suspension systems 516. By way of example only, the pivotable mount 560 can be a beam, bar, rod, tube, plate, plate structure (see FIGS. 31-34), frame, or other element capable of pivoting about a pivot point and to which the front independent suspension systems 516 are connected. In some embodiments such as that shown in FIGS. 31-34, the pivotable mount 560 is pivotable about an axis near or at a central longitudinal axis of the mower 500 (although other pivot locations are possible). Also, in some embodiments of the present invention such as that shown in FIGS. 31-34, the shock absorber and spring assemblies 554 are connected at opposite ends of the pivotable mount 560 (although the shock absorber and spring assemblies 554 need not necessarily be connected at ends of the pivotable mount 560 to function as desired).

In some embodiments, the pivotable mount 560 is pivotably coupled to the frame 514 via conventional fasteners, and is responsive to upward and downward movement of both front wheels 522. One or more spacers and other fastening elements can be employed to pivotably connect the pivotable mount 560 to the frame 514.

By connecting the front suspension systems 516 to the frame 514 via a pivotable mount 560 as just described, the motion of each front suspension system 516 can be at least partially dependent upon the motion of the other front suspension system 516 (e.g., upward movement of one front wheel 522 generating downward force upon the other front wheel 522). In some embodiments, the shock absorber and spring assemblies 554 are replaced by one or more bars, tubes, beams, or other structure absorbing little or no motion of either front wheel 522, thereby transmitting motion of one front wheel 522 to the other front wheel 522. However, a higher degree of independent movement of the front wheels 522 is enabled by connecting the front wheel suspension systems 516 to the pivotable mount 560 via shock absorbers 502 and/or springs 588, both of which can dampen the transmission of one wheel's motion to the pivotable mount 560 and to the other front wheel 522.

In some embodiments, the connection of the front independent suspension systems 516 to a pivotable mount 560 as described above provides improved traction for the rear wheels 506 of the mower 500.

One having ordinary skill in the art will also recognize that a number of the elements and structure in the embodiments described can be replaced by other elements and structure performing the same functions and still falling within the spirit and scope of the present invention. For example, while a number of lawn mower embodiments used in connection with the present invention have the cutter deck positioned between the front and rear wheels, the present invention is also applicable to mowers having a cutter deck cantilevered from the chassis so that it is located forward or rearward of the front or rear wheels, respectively. Also, the springs 288, 488, 588 described above and illustrated in the figures are helical compression springs. One having ordinary skill in the art will appreciate that other types of springs can instead be employed with the front independent suspension assemblies 216, 416, 516 of the present invention, such as torsion bars and other torsion springs, leaf springs, and the like. Each of these alternative springs can be positioned between the frame 214, 414, 514 and the front independent suspension assemblies 216, 416, 516 in order to provide the desired downward force upon the front wheels 222, 422, 522.

Furthermore, the various embodiments of the present invention shown in FIGS. 21-34 can include alternate elements and alternate structure that are different in appearance and/or form than those illustrated, but that still perform the same or similar functions. Such alternate elements and structure fall within the spirit and scope of the present invention.

Figure 35:
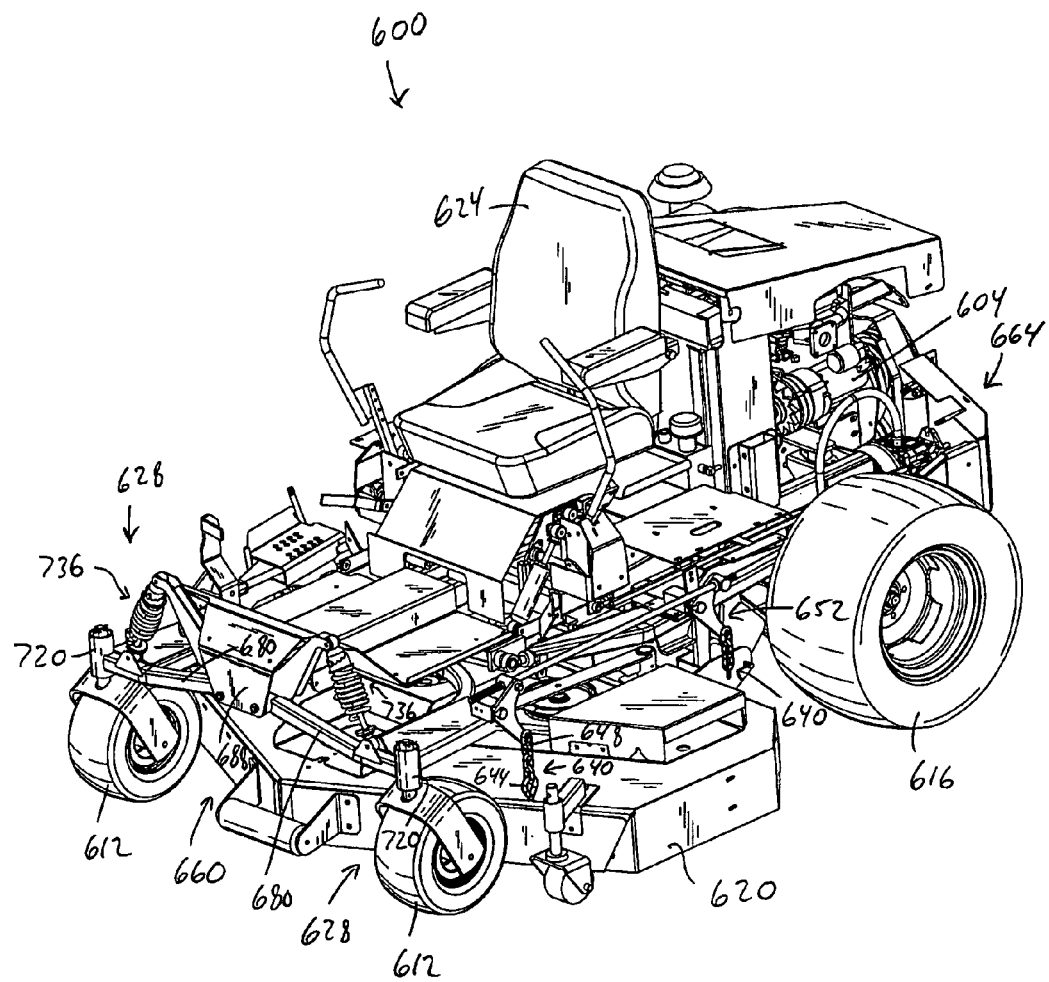
FIG. 35 is a front perspective view of a mower having front wheel independent suspension assemblies and a rear wheel suspension assembly according to another embodiment of the present invention.
Figure 36:
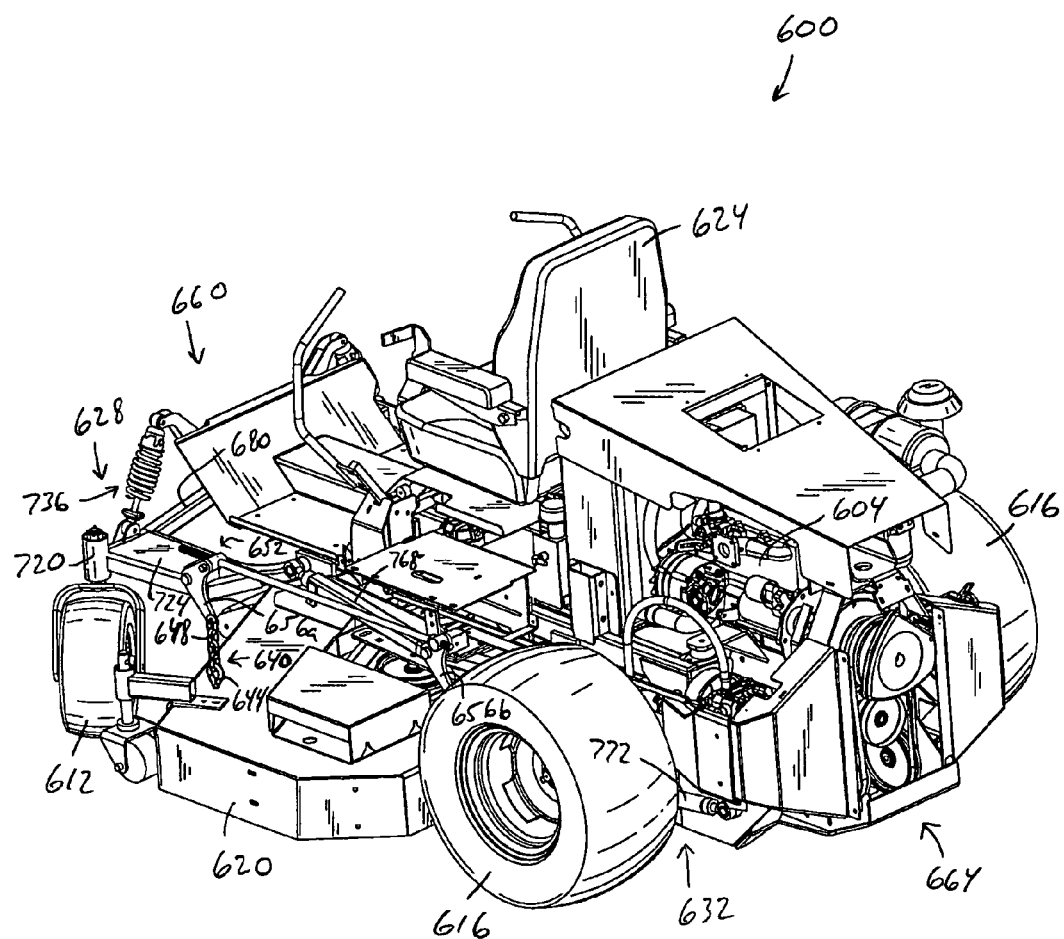
FIG. 36 is a rear perspective view of the mower of FIG. 35.

FIGS. 35-48 illustrate another embodiment of the present invention. As shown in FIGS. 35 and 36, the lawn mower 600 includes a motor 604, a main frame 608, a pair of front wheels 612, a pair of rear wheels 616, a cutter deck 620, a seat 624, a pair of front wheel independent suspension assemblies 628, and a rear wheel suspension assembly 632. The particular type of lawn mower 600 illustrated in FIGS. 35 and 36 is presented by way of example only. In this regard, the suspension systems 628, 632 of the present invention can be employed on any type of riding or non-riding lawn mower.

The cutter deck 620 of the lawn mower 600 can be in any location with respect to the front and rear wheels 612, 616 and with respect to the frame 608. However, in the embodiment illustrated in FIGS. 35 and 36, the cutter deck 620 is positioned between the front and rear wheels 612, 616. The cutter deck 620 contains at least one cutter (not shown) for cutting grass or other vegetation on a surface, and in some embodiments can be raised and lowered with respect to the ground. The cutter deck 620 is substantially similar to the cutter deck 208 described above in connection with the mower 200 of FIGS. 21-26, and will not be described again in detail.

As shown in FIGS. 35 and 36, the cutter deck 620 is connected to and suspended from the front wheel independent suspension assemblies 628 and the rear wheel suspension assembly 632. Connection to the front wheel independent suspension assemblies 628 and the rear wheel suspension assembly 632 permits the cutter deck 620 to follow upward and downward movement of the front wheels 612 and the rear wheels 616, respectively, in response to changing terrain elevation, thereby maintaining the cutter deck 620 in a more stable relationship with respect to the ground even as the lawn mower 600 traverses uneven terrain.

Figure 46:
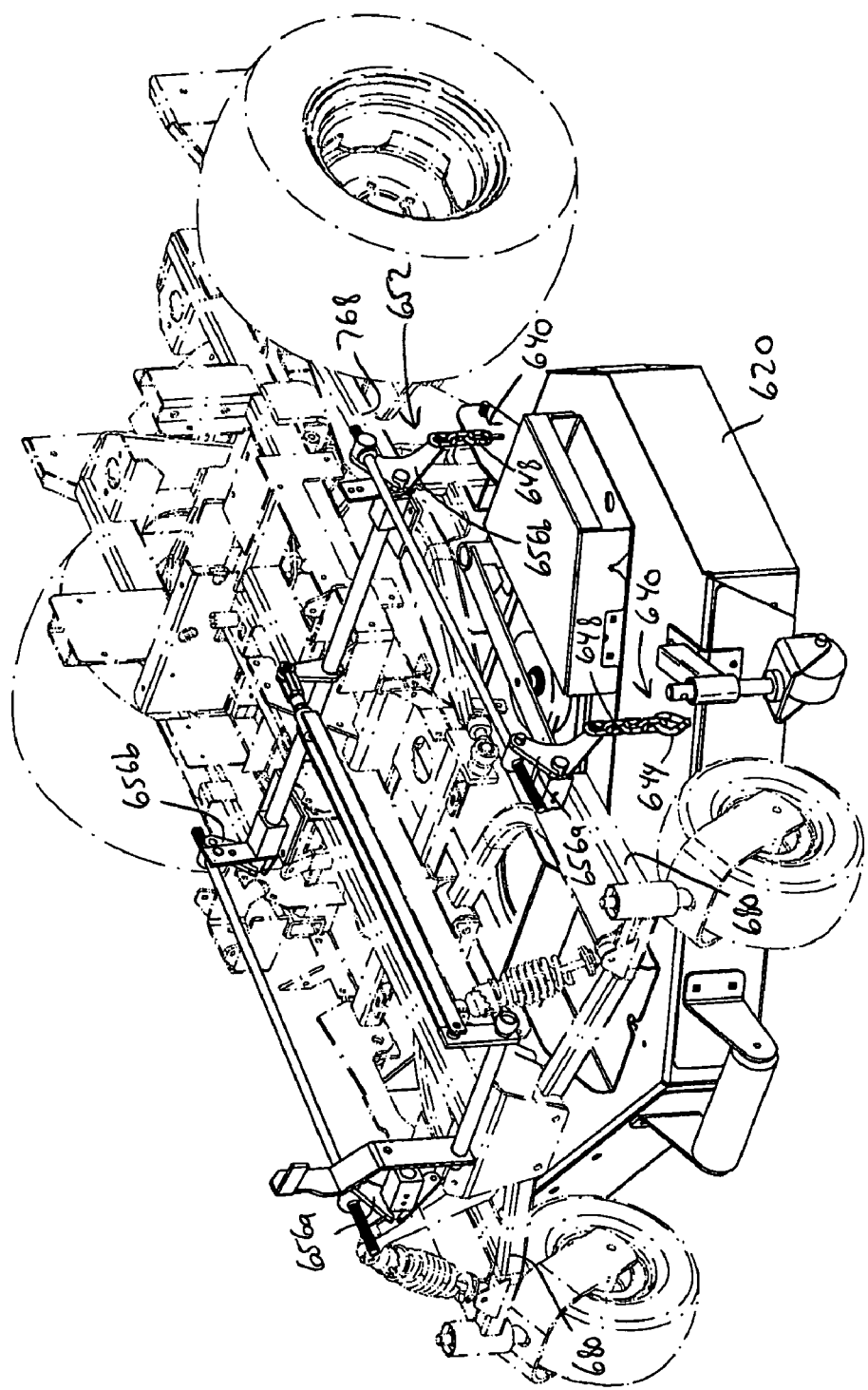
FIG. 46 is a front perspective view of a mower deck and a mower deck lift assembly shown in the mower of FIG. 35.

As shown in FIG. 46, the cutter deck 620 can be attached to the respective suspension assemblies 628, 632 in any manner desired, such as by chains or cables, by links, hinges or joints, by conventional fasteners such as bolts, screws, rivets, hooks, clips, and the like. For example, in the embodiment illustrated in FIG. 46, the cutter deck 620 is coupled to the front wheel independent suspension assemblies 628 and the rear wheel suspension assembly 632 via deck hanger assemblies 640 that include conventional fasteners such as, for example, eyebolts 644, that are used in conjunction with chains 648 to couple the cutter deck 620 to the front and the rear suspension assemblies 628, 632.

The deck hanger assemblies 640 can be attached directly to the front and/or rear suspension assemblies 628, 632 (such as to arms, flanges, or other portions of the front and/or rear suspension assemblies 628, 632, within apertures in the front and/or rear suspension assemblies 628, 632, and the like), or can be indirectly connected thereto by a cutter deck lifting assembly 652. For example, the deck hanger assemblies 640 are connected to forward and rear cranks 656*a*, 656*b*, arms, or other elements movable by a user to lift and lower the cutter deck 620 with respect to the ground. Such cranks 656*a*, 656*b*, arms, and other elements can be lifted and lowered by levers, pedals, cranks, motors, hydraulic or pneumatic actuators, or by any other manual or powered device. Still other devices and elements for raising and lowering a cutter deck 620 are well known to those skilled in the art and are not therefore described further herein.

Figure 37:
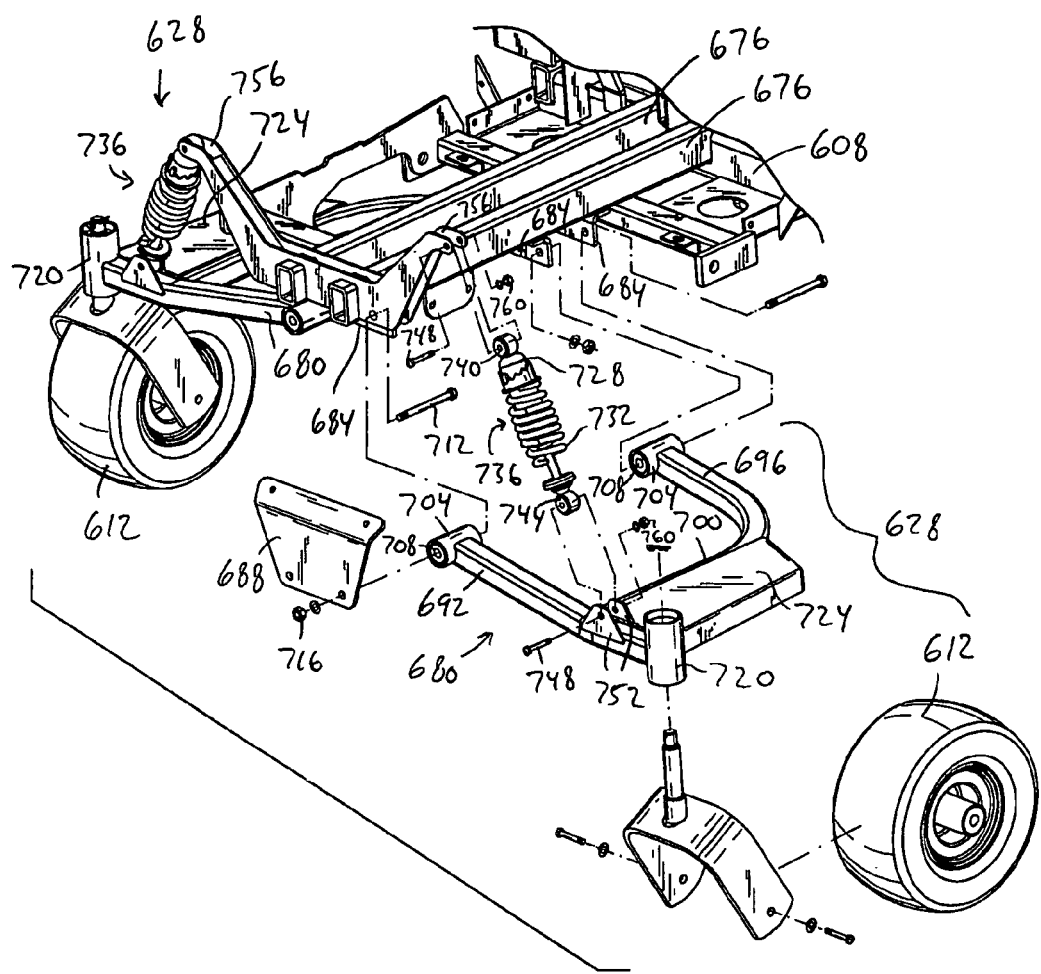
FIG. 37 is an exploded front perspective view of the mower frame and front wheel independent suspension assemblies shown in FIG. 35.
Figure 38:
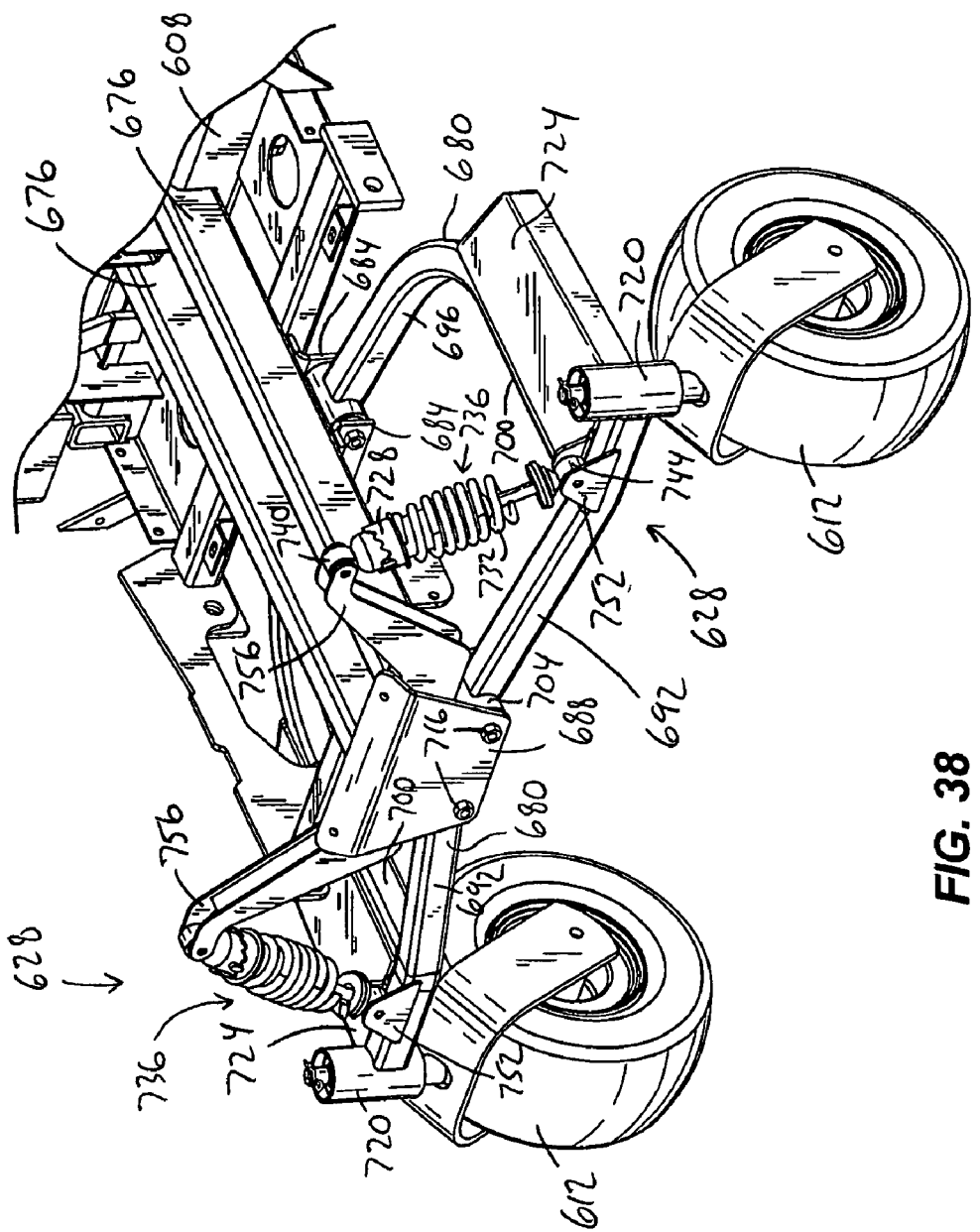
FIG. 38 is an assembled front perspective view of the mower frame and front wheel independent suspension assemblies shown in FIG. 35.

With reference again to the embodiment of the present invention illustrated in FIGS. 35 and 36, the mower 600 has a front end 660, a rear end 664, and opposite sides. For purposes of reference in the following description, a substantially longitudinal axis 668 runs through the center of the frame 608 from the front end 660 to the rear end 664 to divide the frame 608 into two sides. In addition, a substantially lateral axis 672 runs through the frame 608 from side to side to divide the frame 608 into a front portion and a rear portion. In some embodiments, the front portion of the frame 608 is defined by one or more beams, rods, bars, plates, or other structural members. For example, with reference to FIGS. 37 and 38, the front portion of the frame 608 includes two tubular longitudinal beams 676. The longitudinal beams 676 as shown in the exemplary embodiment of FIGS. 37 and 38 are substantially parallel to the longitudinal axis 668 and are closely spaced to the longitudinal axis 668. However, any other relative orientations of these longitudinal beams 676 can instead be employed. Alternatively, other embodiments of the present invention can employ only a single longitudinal beam 676.

As will be appreciated by one having ordinary skill in the art, the frame 608 of the present invention can be constructed of a wide variety of structural elements. In some embodiments, these elements include tubular beams as mentioned above. Tubular beams provide a relatively strong and lightweight framework for the mower 600 compared to other structural members that can be employed. In other embodiments however, the frame 608 can be constructed partially or entirely of different structural members, including without limitation bars, rods, non-tubular beams having any cross-sectional shape (e.g., L-shapes, I-shapes, C-shapes, etc.), plates, and the like. Accordingly, as used herein and in the appended claims, the term "beam" (whether referring to the longitudinal beams or any other beam of the frame 608) is intended to encompass all of these structural members.

With continued reference to FIGS. 37 and 38, the illustrated mower 600 has a pair of front wheel independent suspension assemblies 628 connected to opposite sides of the frame 608. Although the independent suspension assemblies 628 can be different in structure, elements, and/or connection, both independent suspension assemblies 628 in the illustrated embodiment contain identical components and are mirror images of each other with respect to the longitudinal axis 668. Each of the independent suspension assemblies 628 has a ground-contacting wheel 612 that is substantially similar to the caster wheels 222 described above in connection with the mower 200 of FIGS. 21-26, and thus will not be described again in detail. However, the independent suspension assemblies 628 can instead have other types of rolling devices, including without limitation rollers, balls, and tires connected in any conventional manner for rotation and for support of the frame 608.

Each front wheel independent suspension assembly 628 illustrated in the embodiment of FIGS. 35-48 has a suspension arm 680 coupling the associated front wheel 612 to the longitudinal beams 676. Each of the suspension arms 680 can be coupled to the frame 608 in any number of different manners. In some embodiments, the suspension arms 680 are pivotably coupled to the frame 608 to enable upward and downward movement of the front wheel independent suspension assemblies 628. Any type of pivotable connection can be employed, such a ball and socket connection, a pivot and aperture connection, a hinge connection, and the like. One having ordinary skill in the art will appreciate that still other manners of pivotal connection are possible.

In the illustrated embodiment, the suspension arms 680 are pivotably coupled to the longitudinal beams 676 by a plurality of L-shaped brackets 684. The brackets 684 can be coupled to the longitudinal beams 676 using any of a number of different methods including welding, for example. Alternatively, other embodiments of the present invention can directly connect the suspension arms 680 to the longitudinal beams 676. In the illustrated embodiment, the forward-most mounts of the suspension arms 680 are coupled to the longitudinal beams 676 by a forward plate 688 and an L-shaped bracket 684. Like the L-shaped brackets 684, the forward plate 688 can be coupled to the longitudinal beams 676 or other portions of the frame 608 using any of a number of different methods including welding, for example.

As shown in FIGS. 37 and 38, each suspension arm 680 is generally U-shaped and includes a first transverse portion 692, a second transverse portion 696, and a longitudinal portion 700 coupling the first and second transverse portions 692, 696. Respective cylindrical joints 704 are coupled to the free ends of the first and second transverse portions 692, 696. The joints 704 can be configured to receive one or more bushings 708 and/or spacers as understood by those of ordinary skill in the art. The cylindrical joints 704 can be positioned between opposing brackets 684 or the bracket 684 and the forward plate 688, and fasteners 712 (e.g., bolts, pins, etc.) can be passed through apertures in the brackets 684 and the forward plate 688, and through the bushings 708 and/or spacers in the cylindrical joints 704 to pivotably couple the suspension arm 680 to the brackets 684 and the plate 688. A retainer 716 (e.g., a nut, a cotter pin, etc.) can be coupled to the fastener 712 to secure the fastener 712 to the brackets 684 and the plate 688.

With continued reference to FIGS. 37 and 38, joints 720 are coupled to the respective suspension arms 680 to receive the front wheels 612. The joints 720 and the components received in the joints 720 to rotatably support the front wheels 612 are substantially similar to those described above in connection with the mower 200 of FIGS. 21-26, and will not be described again in detail. The mower 600 can employ alternative structure to the joints 720, as described above in connection with the mower 200 of FIGS. 21-26, to couple the front wheels 612 to the suspension arms 680.

In some embodiments of the present invention, it is desirable to strengthen the front wheel independent suspension assemblies 628 and/or to provide additional structure to which other elements, structure, and devices of the front wheel independent suspension assemblies 628 can be connected. Such additional structure can include one or more plates, rods, bars, tabs, wings, extensions, bosses, platforms, struts, and other framework connected to the suspension arms 680, and/or the joint 720. These elements and structure can be connected to the suspension arms 680 and joint 720 in any conventional manner, including those manners described above with reference to the connection between the first and second suspension arms 246, 248 and the joint 236. In the illustrated embodiment for example, support plates 724 are coupled to the respective suspension arms 680 to support respective forward cranks 656a (see FIG. 46) of the cutter deck lift assembly 652. The forward cranks 656a are thereby mounted to the suspension arms 680 to pivot with the suspension arms 680 relative to the frame 608.

Some embodiments of each front wheel independent suspension assembly 628 according to the present invention have shock absorbers 728 and/or suspension springs 732. The shock absorbers 728 and the suspension springs 732 can be connected between the frame 608 and the front wheel independent suspension assemblies 628 to absorb shock transmitted from the wheels 612 and to bias the front wheel independent suspension assemblies 628 in a downward direction.

In the illustrated embodiment, the shock absorber 728 and the spring 732 are constructed as a single unit, or as a shock absorber and spring assembly 736. Such a shock absorber assembly 736 positions the spring 732 over the shock absorber 728 and captures the spring 732 between opposite ends of the shock absorber 728. The shock absorber 728 can be a conventional hydraulic shock absorber. However, the shock absorber 728 can take a number of other forms, including without limitation an air shock, an airbag, a coil, torsion, or other spring, and the like. Although the shock absorber 728 can be connected in any conventional manner to the frame 608 and to any part of the front wheel independent suspension assembly 628, the shock absorber 728 as shown in FIGS. 37 and 38 is located between and connected to the suspension arm 680 and the frame 608 (or a fixture or an extension on the frame 608). In this regard, the shock absorber 728 can be welded or brazed to the support plate 724 and frame 608, can be connected thereto with bolts, screws, rivets, pins, clips, clamps, or other conventional fasteners, or can be connected thereto in any other manner desired.

In the illustrated embodiment, the shock absorber 728 has a top mount 740 and a bottom mount 744, each mount 740, 744 having an aperture, respectively, to receive fasteners 748 therethrough. The fasteners 748 (which can be bolts as shown in the figures or can be any other conventional fastener desired) can be received through one or more apertures in one or more tabs 752 coupled to the suspension arm 680, through one or more apertures in a bracket 756 extending from the frame 608, and through the apertures in the top and bottom mounts 740, 744 of the shock absorber 728. In some embodiments, the support plate 724 can be shaped to define a bracket for connection to the bottom mount 744 of the shock absorber 728. Nuts or other retainers 760 can be employed to secure the fasteners 748 once installed. Additional hardware such as spacers and washers can be employed as needed to connect the shock absorber 728 to the frame 608 and to the rest of the front wheel independent suspension assembly 628.

Figure 39:
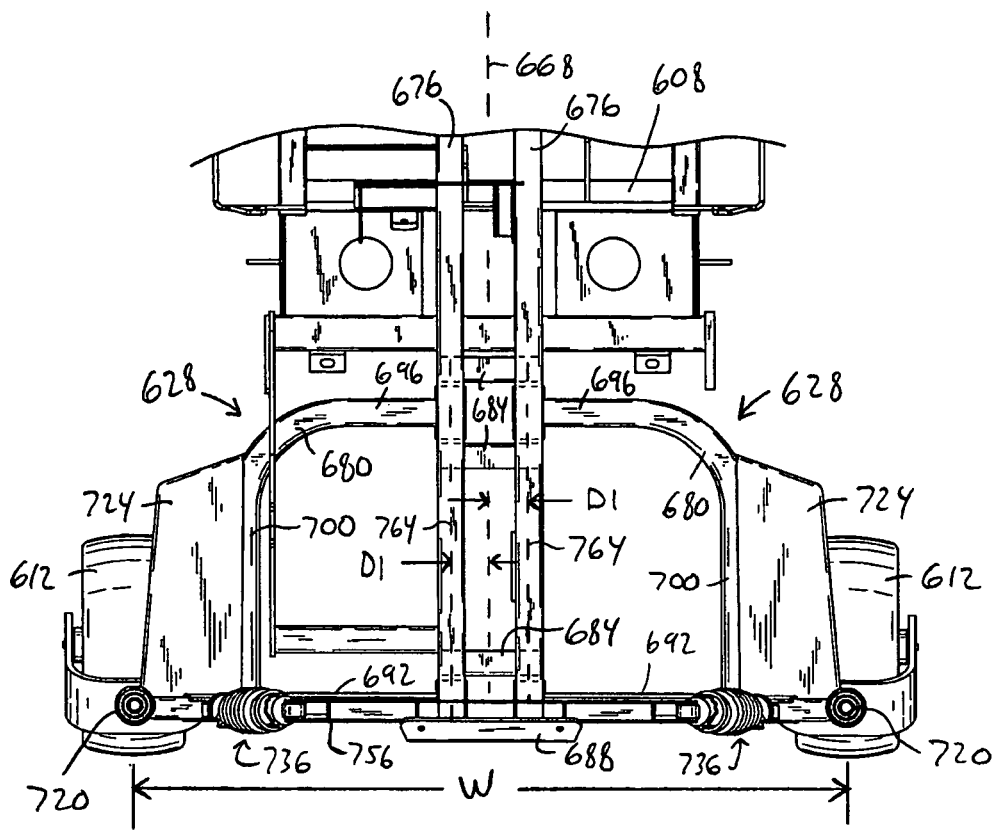
FIG. 39 is a top plan view of the mower frame and front wheel independent suspension assemblies shown in FIG. 35.

With reference to FIG. 39, the cylindrical joints 704 on each suspension arm 680 are substantially aligned to yield a common longitudinal pivot axis 764 for each suspension arm 680. Alternatively, the first and second transverse portions 692, 696 can have different lengths such that the cylindrical joints 704 on the suspension arm 680 define different longitudinal pivot axes. In the illustrated embodiment, the longitudinal pivot axes 764 located in close proximity to the longitudinal axis 668 of the frame 608. As shown in FIG. 39, the lateral spacing between the front wheels 612 defines a track width W of the mower 600. In the illustrated embodiment, the respective longitudinal pivot axes 764 of the suspension arms 680 are laterally spaced from the longitudinal axis 668 a dimension D1 between about 0% and about 20% of the track width W of the mower 600.

In such an embodiment where the respective longitudinal pivot axes 764 of the suspension arms 680 are laterally spaced from the longitudinal axis 668 a dimension D1 of about 0% of the track width W, the pivot axes 764 of the respective suspension arms 680 are coaxial with the longitudinal axis 668. In some embodiments, the suspension arms 680 can be longitudinally offset to allow the cylindrical joints 704 of the respective suspension arms 680 to align with the longitudinal axis 668 so that the suspension arms 680 can pivot about respective pivot axes 764 common or coaxial to the longitudinal axis 668.

Figure 40:
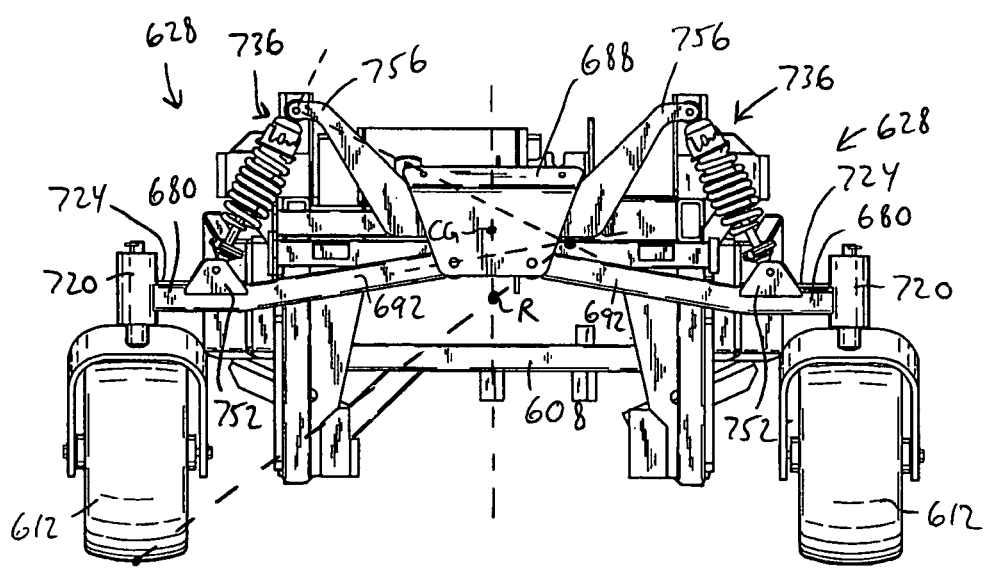
FIG. 40 is a front view of the mower frame and front wheel independent suspension assemblies shown in FIG. 35.

This provides several advantages over a mower configuration having the respective pivot axes 764 laterally spaced from the longitudinal axis 668 greater than 20% of the track width W. With reference to FIG. 40, the orientation of the suspension arms 680 and the shock absorber and spring assemblies 736 relative to the frame 608 provide a roll center R in close proximity to the center of gravity CG of the mower 600. This configuration decreases the roll tendency of the mower 600 during turning. As the respective pivot axes 764 are moved farther from the longitudinal axis 668, the separation of the roll center R and the center of gravity CG of the mower 600 increases, resulting in less desirable handling characteristics of the mower 600.

In addition, by locating the pivot axes 764 of the respective suspension arms 680 between about 0% and about 20% of the track width W of the mower 600 from the longitudinal axis 668, relatively long transverse portions 692, 696 of the suspension arms 680 result. By laterally spacing the front wheels 612 a greater distance from the respective pivot axes 764, the front wheels 612 follow an arc having a larger radius of curvature during upward and downward movement relative to the frame 608. As a result, the front wheels 612 experience less lateral movement during upward and downward movement of the front wheel independent suspension assemblies 628. In the illustrated embodiment of the mower 600, less lateral movement of the front wheels 612 can result in less tilting of the front wheels 612 relative to the ground as the suspension arms 680 move upward and downward.

Figure 47:
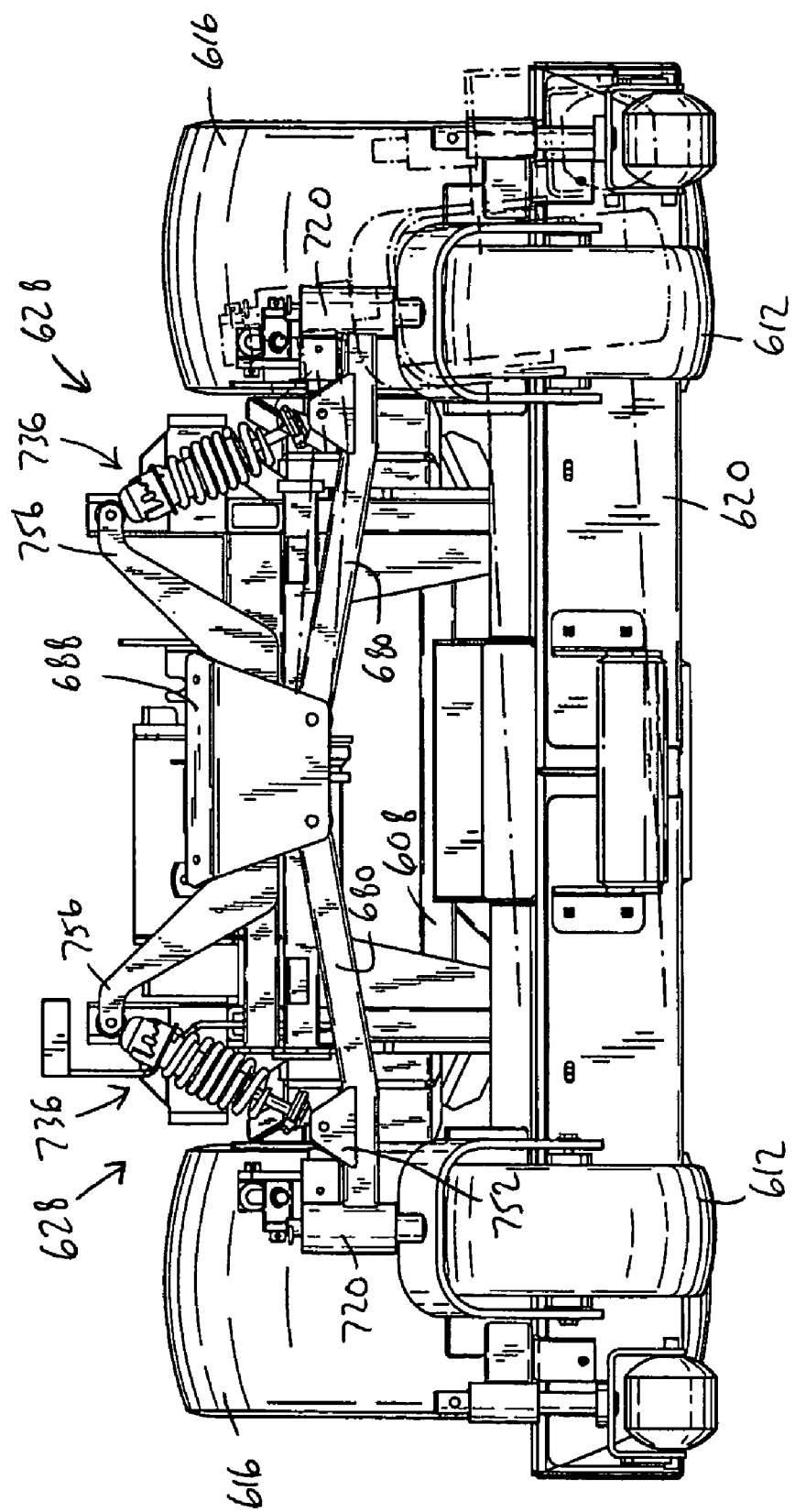
FIG. 47 is a front view of the mower frame and front wheel independent suspension assemblies shown in FIG. 35, illustrating one of the front wheel independent suspension assemblies in a jounced position.

With reference to FIG. 47, opposite sides of the cutter deck 620 are shown coupled to respective suspension arms 680 via deck hanger assemblies 640 and the cutter deck lifting assembly 652. Specifically, the forward cranks 656a of the cutter deck lifting assembly 652 are mounted to the respective suspension arms 680 to pivot with the suspension arms 680. For the same reasons discussed above with reference to the front wheels 612, the forward cranks 656a and the cutter deck 620 will experience less lateral or side-to-side movement during upward and downward movement of the front wheels 612 and the front wheel independent suspension assemblies 628. As a result, deviation in the cutting path of the cutter deck 620 can be decreased.

Figure 41:
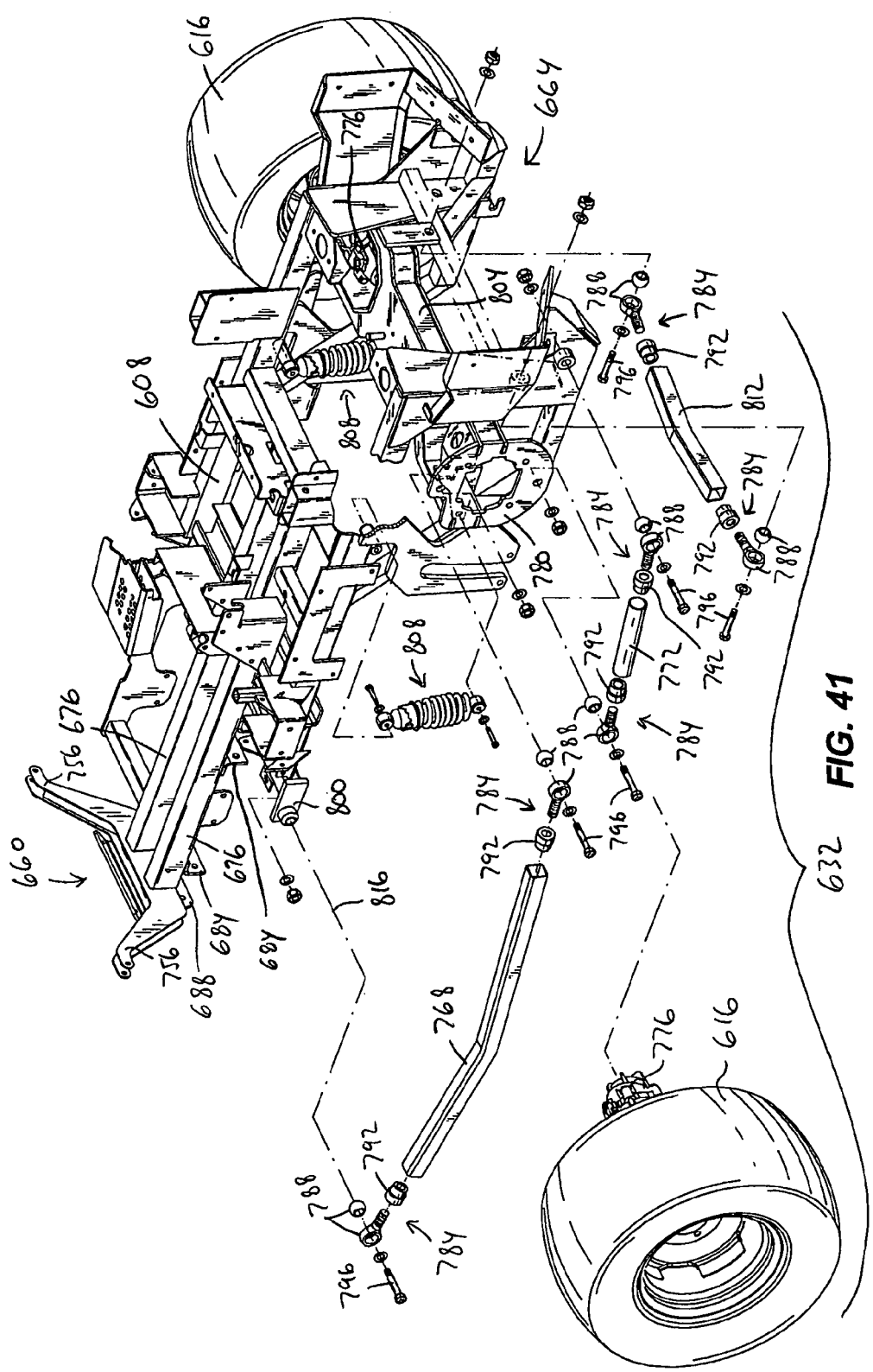
FIG. 41 is an exploded rear perspective view of the mower frame and rear wheel suspension assembly shown in FIG. 36.
Figure 42:
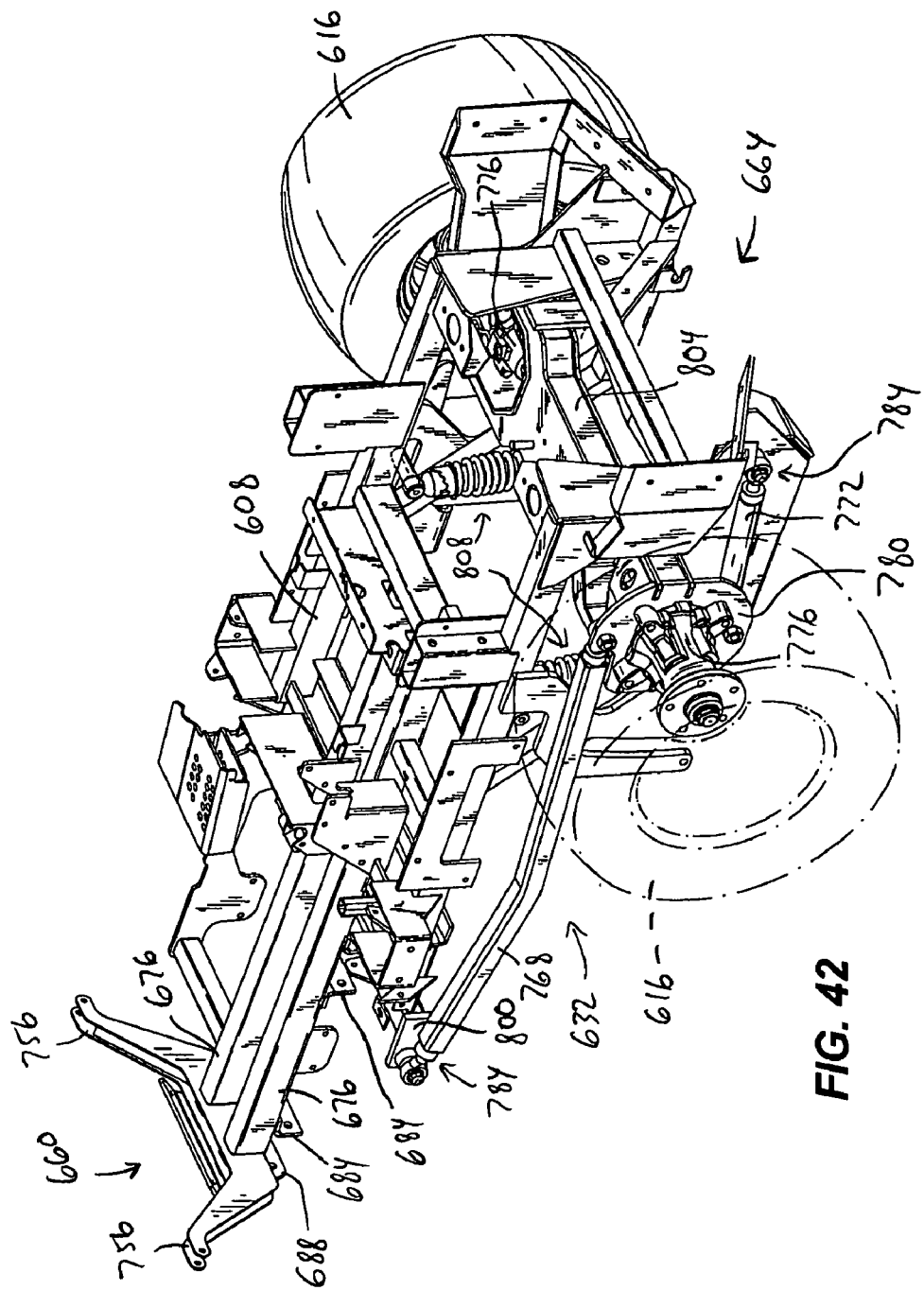
FIG. 42 is an assembled rear perspective view of the mower frame and rear wheel suspension assembly shown in FIG. 36.

With reference to FIGS. 41 and 42, the rear wheel suspension assembly 632 of the mower 600 is shown. Generally, the rear wheel suspension assembly 632 allows upward and downward movement of the rear wheels 616 relative to the frame 608. As shown in FIG. 41, the rear wheel suspension assembly 632 includes on the opposite sides of the frame 608 a first link 768 and a second link 772 controlling upward and downward movement of the respective rear wheels 616. In addition, the first and second links 768, 772 transmit longitudinal forces generated during acceleration or braking to the frame 608 when the rear wheels 716 are configured as drive wheels 716. In the illustrated embodiment, the rear wheels 716 are configured as drive wheels 716, and each drive wheel 716 is rotatably coupled to a hydraulic motor 776 coupled to a flange 780. The hydraulic motors 776 are powered by one or more hydraulic pumps (not shown) driven by the motor 604, as understood by those skilled in the art. Alternatively, the drive wheels 716 can receive torque from common or separate axles or shafts rotatably coupled to a transmission driven by the motor 604.

With continued reference to FIGS. 41 and 42, the first link 768 pivotably couples the drive wheel 716 to the front portion of the frame 608. More particularly, the first link 768 is pivotably coupled to the front portion of the frame 608 at one end and to an upper portion of the flange 780 at an opposite end. The first link 768, like the suspension arms 680 in the front wheel independent suspension assemblies 628, can be made from a tubular beam. Alternatively, other embodiments of the mower 600 can utilize links or beams made of different structural members, including without limitation bars, rods, non-tubular beams having any cross-sectional shape (e.g., L-shapes, I-shapes, C-shapes, etc.), plates, and the like.

The first link 768 can be pivotably coupled to the front portion of the frame 608, or to a location on the frame 608 disposed closer to the front end 660 of the frame 608 than the rear end 664, by a pivot assembly 784. The pivot assembly 784 can take a number of different forms. In the illustrated embodiment for example, the pivot assembly 784 includes a ball joint 788 coupled to the first link 768 by a threaded fastener 792 fixed to the first link 768. The ball joint 788 includes a threaded extension to engage the threaded fastener 792 to secure the ball joint 788 to the first link 768. A bolt 796 is passed through apertures in the ball joint 788 to couple the first link 768 to the frame 608. If desired, a spacer can be located between the ball joint 788 and the frame 608 to provide clearance between the ball joint 788 and the frame 608. The bolt 796 can be employed for pivotable connection to the ball joint 788 as described above. However, the bolt 796 can be replaced by any other element received within the ball joint 788, including without limitation a pin or rod, a headed post, extension, or any other element extending into the ball joint 788 from the frame 608. The first link 768 can use a similar pivot assembly 784 to pivotably couple the opposite end of the link 768 with the flange 780.

As discussed above with reference to the mounting of the suspension arms 680 to the frame 608, the first link 768 can either directly connect to the front portion of the frame 608, or the first link 768 can pivotably couple to a plate, tab, bracket, or other structure coupled to a side of the front portion of the frame. In the illustrated embodiment, a bracket 800 is fixed to the frame 608 by a welding process, for example, to mount the pivot assembly 784 and the front end of the first link 768.

With continued reference to FIGS. 41 and 42, the second link 772 pivotably couples the drive wheel 616 to the rear portion of the frame 608. More particularly, the second link 772 is pivotably coupled to the rear portion of the frame 608 at one end and to a lower portion of the flange 780 at an opposite end. Like the first link 768, the second link 772 can be made from a tubular beam or any other structure described above in connection with the first link 768. The second link 772 can be pivotably coupled to the rear portion of the frame 608, or to a location on the frame 608 disposed closer to the rear end 664 of the frame 608 than the front end 660, by a pivot assembly 784 substantially similar to the pivot assemblies 784 utilized on the first link 768. As such, like reference numerals will be used to describe like parts.

In the illustrated embodiment, the two drive wheels 616 are coupled to each other by a beam or a solid axle 804. Specifically, the flanges 780 of the respective drive wheels 616 are coupled to each other by the solid axle 804. In the illustrated embodiment, the solid axle 804 is constructed from several pieces to form a boxed structure. Alternatively, the solid axle 804 can be constructed in any of a number of different ways to couple together the drive wheels 616. In alternative embodiments of the mower 600, the solid axle 804 can be separated into two distinct halves, such that the drive wheels 616 are allowed to move relative to the frame 608 independently of each other.

Shock absorber and spring assemblies 808 can be used with the rear wheel suspension assembly 632 to control upward and downward movement of the solid axle 804 and the drive wheels 616. The shock absorber and spring assemblies 808 are substantially similar to those used in the front wheel independent suspension assemblies 628 and will not be described again in detail. In the illustrated embodiment, the shock absorber and spring assemblies 808 are coupled between the solid axle 804 and the frame 608. As described above, brackets can be coupled to the solid axle 804 to provide a mounting for the shock absorber and spring assemblies 808. Alternatively, the shock absorber and spring assemblies 808 can be coupled to the solid axle 804 and the frame 608 using any of the structure and methods disclosed above in connection with the shock absorber and spring assemblies 736 in the front wheel independent suspension assemblies 628.

With continued reference to FIGS. 41 and 42, a third link 812 is coupled at one end to the solid axle 804 and at an opposite end to the frame 608. The third link 812 is oriented substantially transversely to the longitudinal axis 668, such that the third link 812 can control or limit lateral movement of the solid axle 804 and the drive wheels 616. Both ends of the third link 812 utilize pivot assemblies 784 like those described above in connection with the first and second links 768, 772 to pivotably couple to the solid axle 804 and the frame 608.

Figure 43:
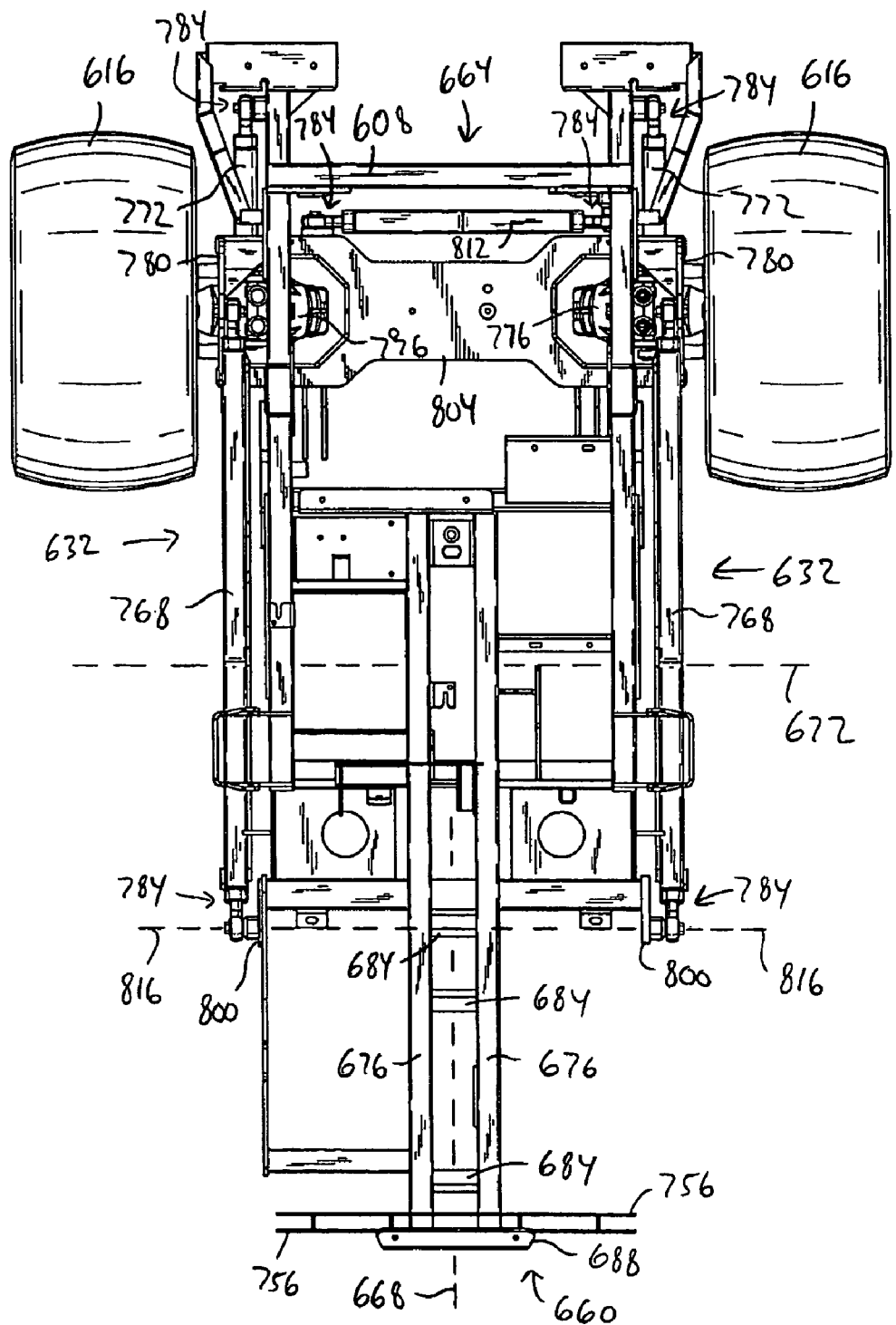
FIG. 43 is a top plan view of the mower frame and rear wheel suspension assembly shown in FIG. 36.
Figure 44:
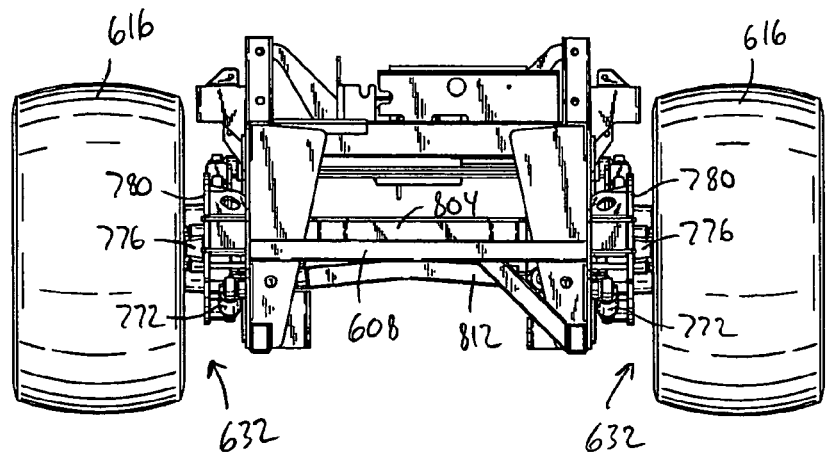
FIG. 44 is a rear view of the mower frame and rear wheel suspension assembly shown in FIG. 36.
Figure 45:
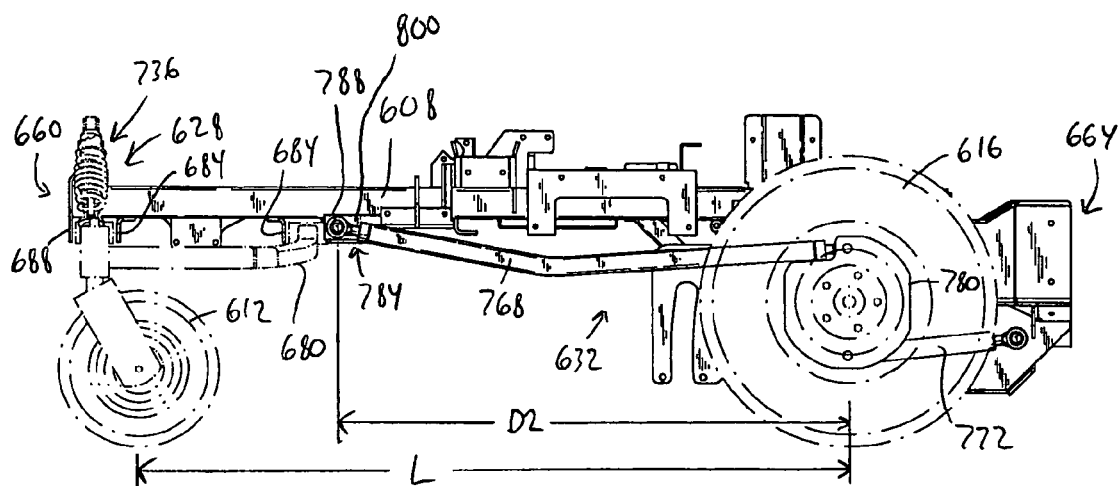
FIG. 45 is a side view of the mower frame and rear wheel suspension assembly shown in FIG. 36.

With reference to FIG. 43, the ball joints 788 coupling the first links 768 to the front portion of the frame 608 are substantially aligned to yield a common lateral pivot axis 816 for each first link 768. Alternatively, the first links 768 on the respective opposite sides of the frame 608 can have different lengths such that the ball joints 788 coupled to the frame 608 define different longitudinal pivot axes. As shown in FIG. 45, the longitudinal spacing between the front wheels 612 and the rear wheels 616 defines a wheelbase length L of the mower 600. In the illustrated embodiment, the respective lateral pivot axes 816 of the first links 768 are longitudinally spaced from the rear wheels 616 a dimension D2 between about 50% and about 90% of the wheelbase length L of the mower 600.

This provides several advantages over a mower configuration having the respective pivot axes 816 longitudinally spaced from the rear wheels 616 less than about 50% of the wheelbase length L. For example, relatively long first links 768 are the result of locating the pivot axes 816 at least 50% of the wheelbase length L from the rear wheels 616. The relatively long first links 768 cause the rear wheels 616 to follow an arc having a larger radius of curvature during upward and downward movement of the rear wheels 616 relative to the frame 608. As a result, the rear wheels 616 experience less longitudinal movement during upward and downward movement of the rear wheel suspension assembly 632, which can have undesirable effects on the handling characteristics of the mower 600.

Figure 48:
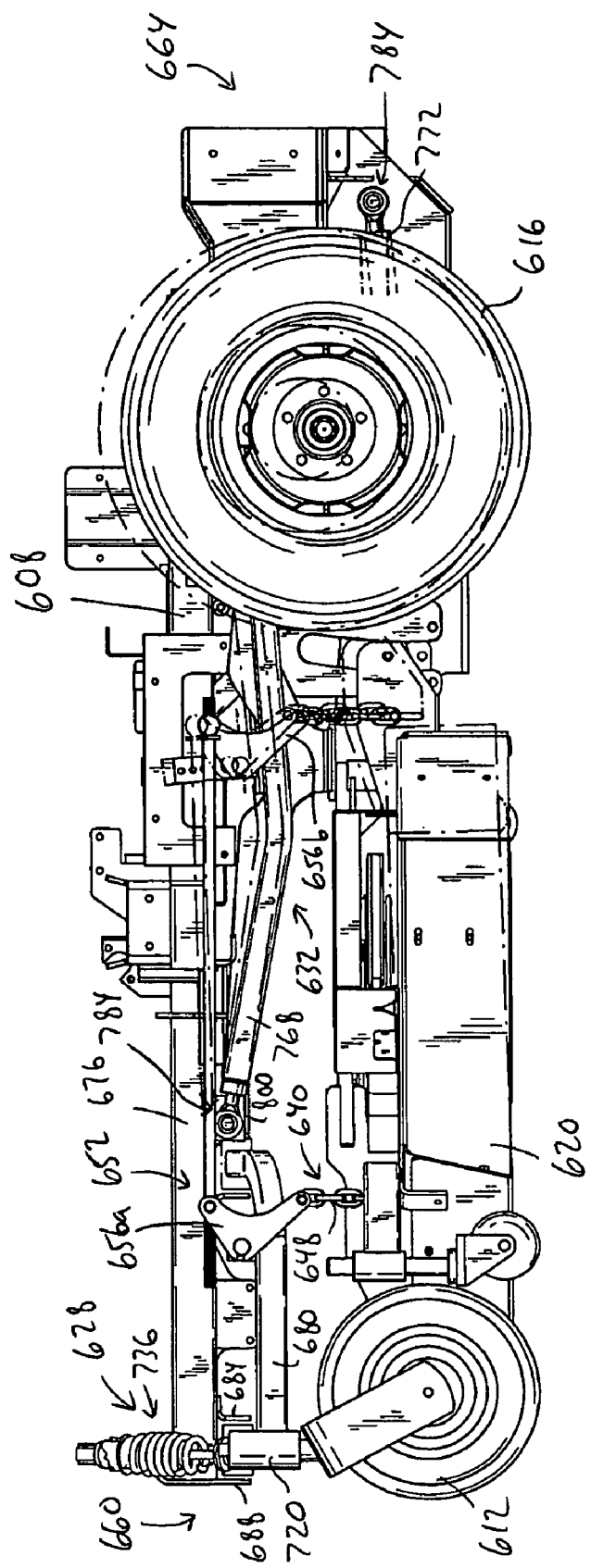
FIG. 48 is a side view of the mower frame and rear wheel suspension assembly shown in FIG. 35, illustrating the rear wheel suspension assembly in a jounced position.

In addition, as shown in FIG. 48, opposite sides of the cutter deck 620 are shown coupled to respective first links 768 via deck hanger assemblies 640 and the cutter deck lifting assembly 652. Specifically, rear cranks 656b of the cutter deck lifting assembly 652 are mounted to the respective first links 768 to pivot with the first links 768. For the same reasons discussed above with reference to the rear wheels 616, the rear cranks 656b and the cutter deck 620 will experience less longitudinal or front-to-rear movement during upward and downward movement of the rear wheels 616 and the rear wheel suspension assembly 632. As a result, uneven cutting or deviation in the cutting path of the cutter deck 620 can be decreased.

As the front wheel independent suspension assemblies 628 and the rear wheel suspension assembly 632 of the lawn mower 600 travel in generally upward and downward vertical directions, the shock absorbers 728 (if used) dampen the shock delivered to the frame 608 and operator. This creates a more comfortable ride for the operator, thereby allowing the operator to run the mower 600 at higher speeds. The front wheel independent suspension assemblies 628 and the rear suspension assembly 632 can also absorb a significant amount of vertical movement caused by the uneven terrain, thereby preventing much of the vertical movement of the frame 608. As a result, vertical movement of the cutter deck 620 can be reduced to improve the cutting performance of the lawn mower 600. In addition, when one of the front wheels 612 or the rear wheels 616 runs over a large rock, bump, dip, hole, or otherwise experiences a change in elevation causing the wheel 612 or 616 to move vertically upward or downward, the improved front wheel independent suspension assemblies 628 or rear wheel suspension assembly 632 of the present invention dampen the effect on the other wheels 612, 616. Thus, the wheels 612, 616 maintain better contact with the ground, giving the lawn mower 600 better traction.

Although the illustrated mower 600 includes an independent front suspension and a solid-axle rear suspension, alternate embodiments of the mower can utilize rear wheel independent suspension assemblies configured substantially similar to the illustrated front wheel independent suspension assemblies 628. Likewise, other embodiments of the mower can utilize a front solid-axle suspension assembly like the illustrated rear wheel suspension assembly 632. Further, in yet other embodiments, the mower can utilize the independent suspension assemblies in the rear end of the mower and the solid-axle suspension assembly in the front end of the mower.

Figure 49:
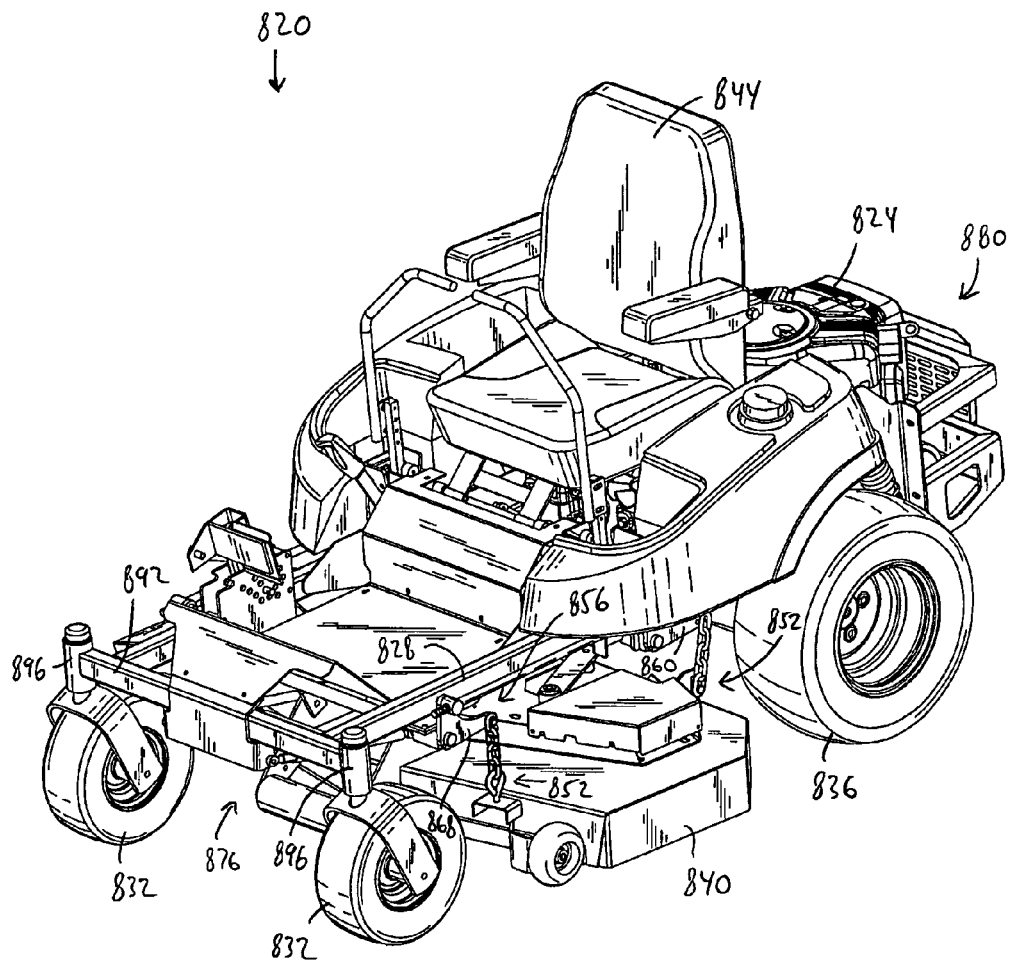
FIG. 49 is a front perspective view of a mower having a rear wheel suspension assembly according to yet another embodiment of the present invention.
Figure 50:
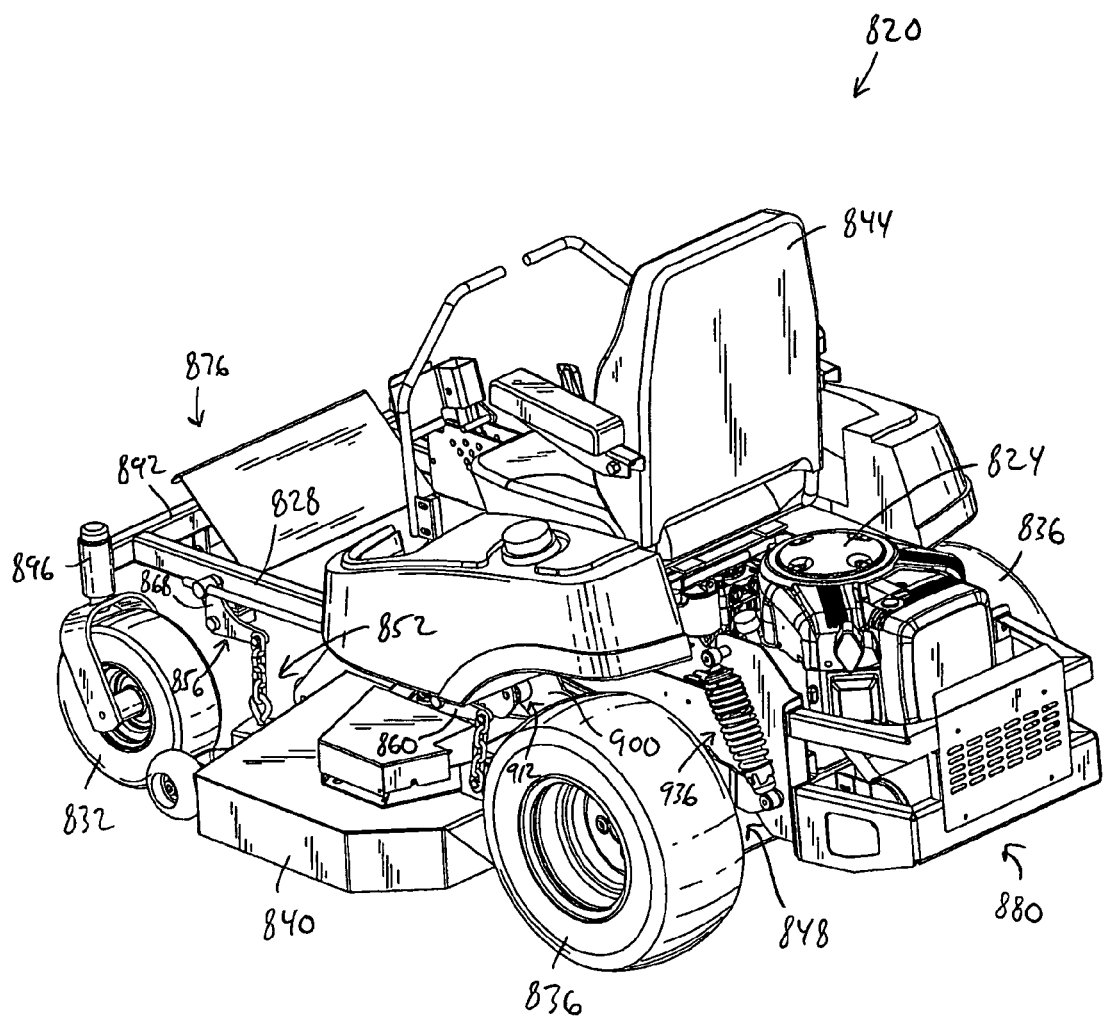
FIG. 50 is a rear perspective view of the mower of FIG. 49.

FIGS. 49-57 illustrate yet another embodiment of the present invention. As shown in FIGS. 49 and 50, the lawn mower 820 includes a motor 824, a main frame 828, a pair of front wheels 832, a pair of rear wheels 836, a cutter deck 840, a seat 844, and a rear wheel suspension assembly 848. The particular type of lawn mower 820 illustrated in FIGS. 49-57 is presented by way of example only. In this regard, the rear wheel suspension assembly 848 of the present invention can be employed on any type of riding or non-riding lawn mower.

The cutter deck 840 is positioned between the front and rear wheels 832, 836. The cutter deck 840 is substantially similar to the cutter deck 208 described above in connection with the mower 200 of FIGS. 21-26 and with the cutter deck 620 of the mower 600 of FIGS. 35-48, and will not be described again in detail.

Figure 56:
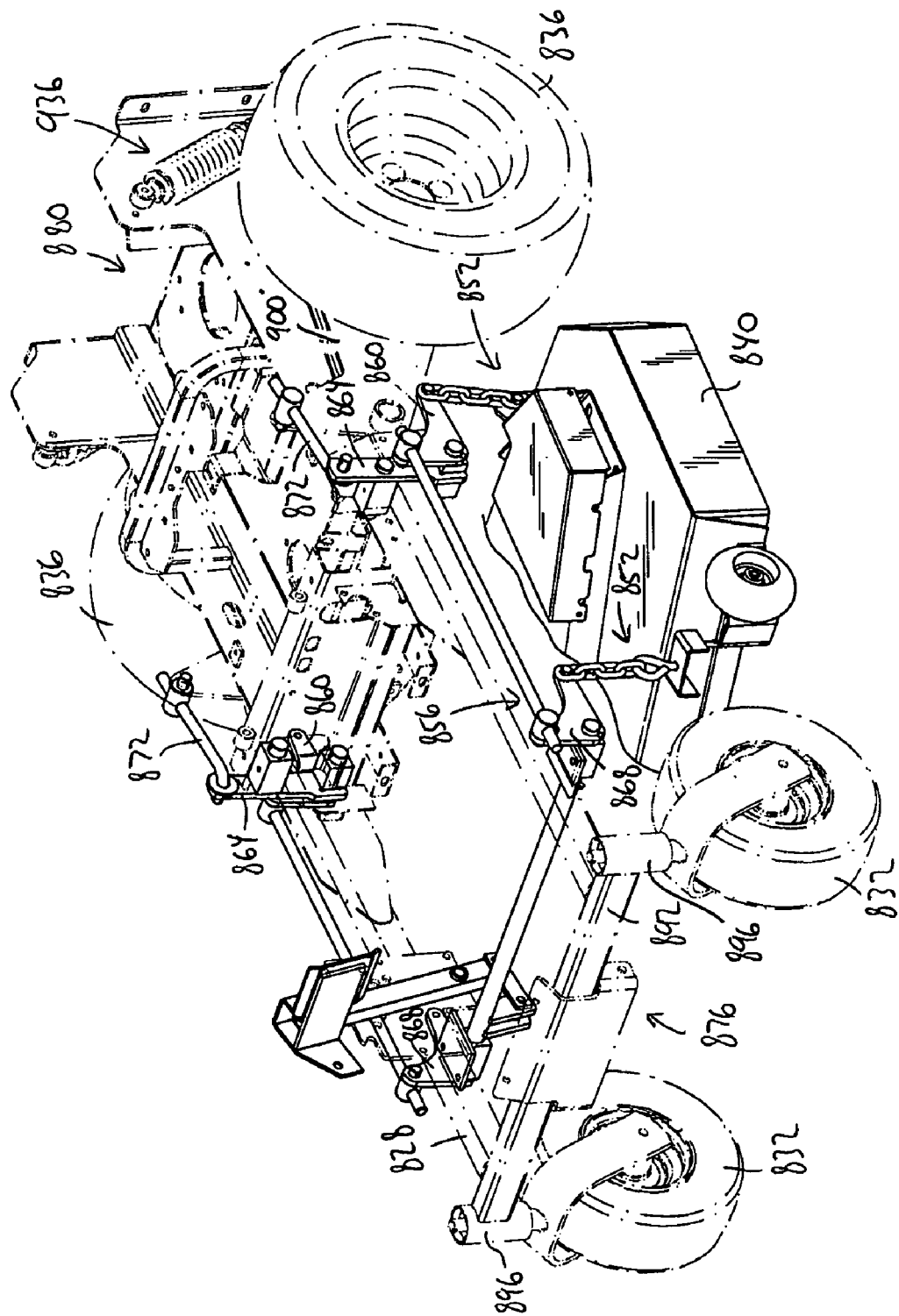
FIG. 56 is a front perspective view of a mower deck and a mower deck lift assembly shown in the mower of FIG. 49.

As shown in FIGS. 49, 50, and 56, the cutter deck 840 can be attached to the frame 828 in any manner desired, such as by chains or cables, by links, hinges or joints, by conventional fasteners such as bolts, screws, rivets, hooks, clips, and the like. For example, the cutter deck 840 is coupled to the frame 828 via deck hanger assemblies 852 like those described above in connection with the mower 200 of FIGS. 21-26 and the mower 600 of FIGS. 35-48.

The deck hanger assemblies 852 can be attached directly to the frame 828 (such as to arms, flanges, or other portions of the frame 828, or can be indirectly connected thereto by a cutter deck lifting assembly 856. The cutter deck lifting assembly 856 is substantially similar to the cutter deck lifting assemblies 211, 652 described above in connection with the mower 200 of FIGS. 21-26 and the mower 600 of FIGS. 35-48, and will not be described again in detail.

As shown in FIGS. 49, 50, 56, and 57, the front of the cutter deck 840 is connected to and suspended from the frame 828. However, in the illustrated embodiment, the rear of the cutter deck 840 is connected to the rear wheel suspension assembly 848 to permit the cutter deck 840 to follow upward and downward movement of the rear wheels 836 in response to changing terrain elevation, thereby maintaining the cutter deck 840 in a more stable relationship with respect to the ground even as the lawn mower 820 traverses uneven terrain. Specifically, rear cranks 860 of the cutter deck lifting assembly 856 are coupled to the frame 828 via respective levers 864. The levers 864 are pivotably coupled to the frame 828 in a similar fashion as front cranks 868 of the cutter deck lifting assembly 856. The rear cranks 860 are pivotably coupled to the lower portions of the levers 864, while the upper portions of the levers 864 are connected to the rear wheel suspension assembly 848 via links 872.

Figure 57:
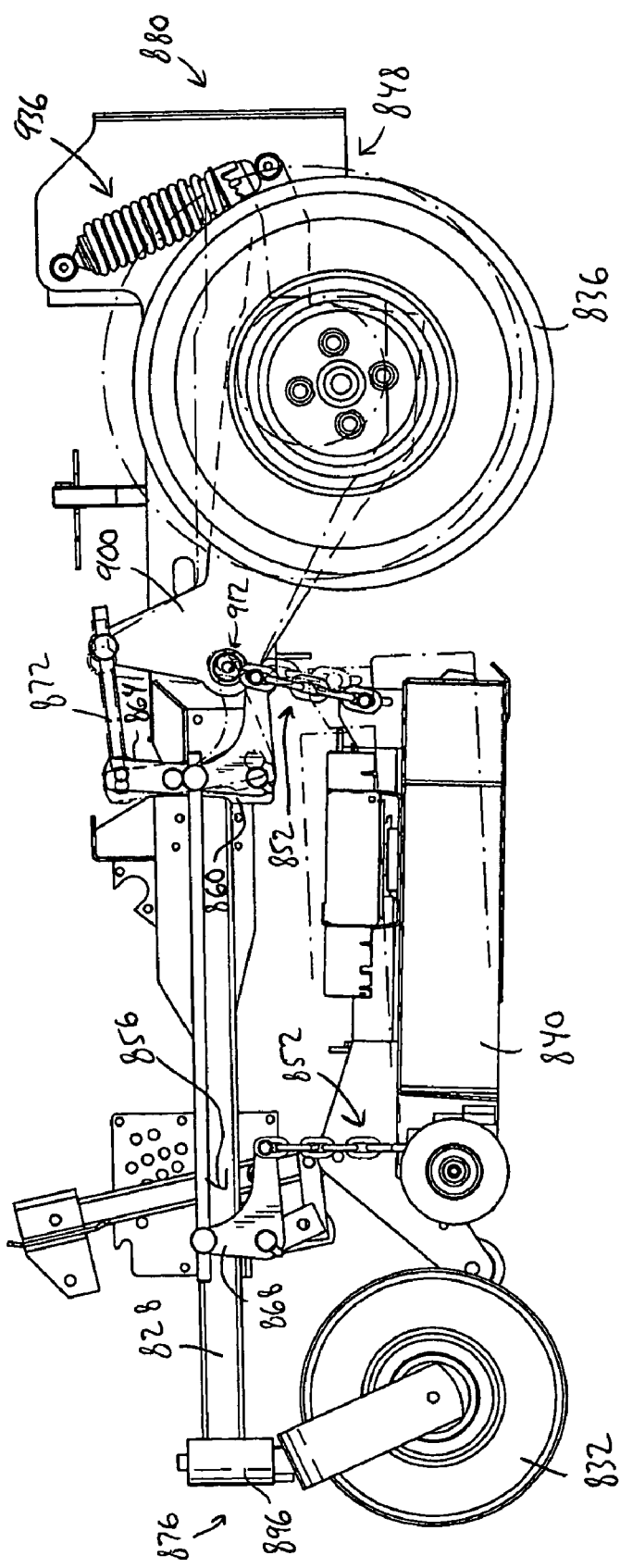
FIG. 57 is a side view of the mower frame and rear wheel suspension assembly shown in FIG. 49, illustrating the rear wheel suspension assembly in a jounced position.

With reference to FIG. 57, one of the rear wheels 836 and rear wheel suspension assembly 848 are shown in a jounced position. When the rear wheel 836 jounces, the lever 864 is pivoted in a counter-clockwise direction, thereby causing the rear of the cutter deck 840 to move upwardly with the rear wheel 836 and rear wheel suspension assembly 848. Likewise, when the rear wheel 836 rebounds, the lever 864 is pivoted in a clockwise direction, thereby allowing the rear of the cutter deck 840 to move downwardly with the rear wheel 836 and rear wheel suspension assembly 848.

With reference again to the embodiment of the present invention illustrated in FIGS. 49 and 50, the mower 820 has a front end 876, a rear end 880, and opposite sides. For purposes of reference in the following description, a substantially longitudinal axis 884 (see FIG. 52) runs through the center of the frame 828 from the front end 876 to the rear end 880 to divide the frame 828 into two sides. In addition, a substantially lateral axis 888 runs through the frame 828 from side to side to divide the frame 828 into a front portion and a rear portion. As will be appreciated by one having ordinary skill in the art, the frame 828 of the present invention can be constructed of a wide variety of structural elements. In some embodiments, these elements include tubular beams as mentioned above.

In the illustrated embodiment of FIGS. 49-57 includes front wheels 832 coupled to the frame 828 without utilizing a suspension of any kind. Specifically, the frame 828 includes a transverse beam 892 in the front end 876, and joints 896 are coupled to the free ends of the transverse beam 892 to rotatably support the front wheels 832. The joints 896 are substantially similar to those described above in connection with the mower 200 of FIGS. 21-26 and the mower 600 of FIGS. 35-48, and will not be described again in detail. Alternatively, any of the front or rear wheel suspension assemblies 628, 632 described above in connection with the mower 600, or any of the front or rear wheel suspension assemblies described above in connection with any of the other mowers 10, 200, 400, 500 can be utilized to couple the front wheels 832 to the frame 828.

Figure 51:
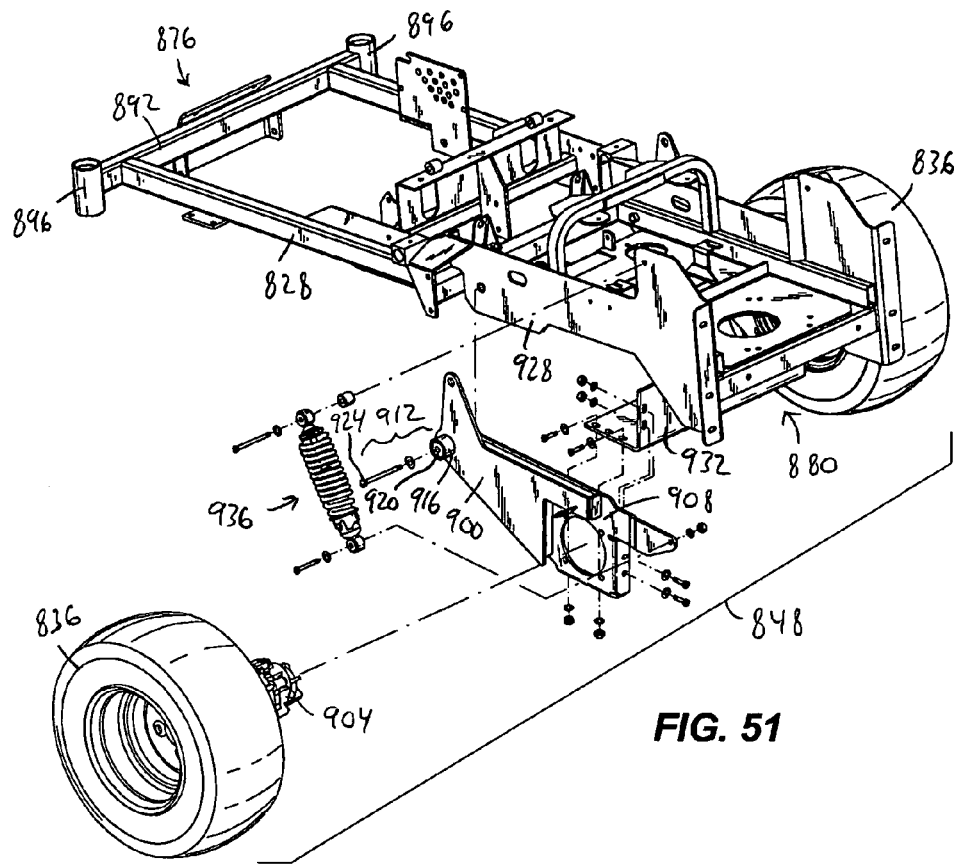
FIG. 51 is an exploded rear perspective view of the mower frame and rear wheel suspension assembly shown in FIG. 49.
Figure 52:
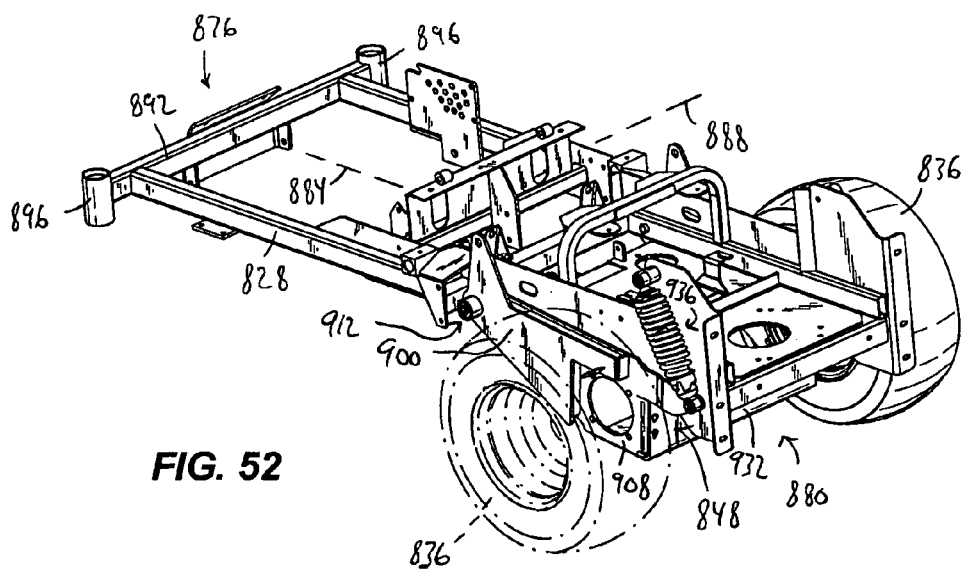
FIG. 52 is an assembled rear perspective view of the mower frame and rear wheel suspension assembly shown in FIG. 49.
Figure 53:
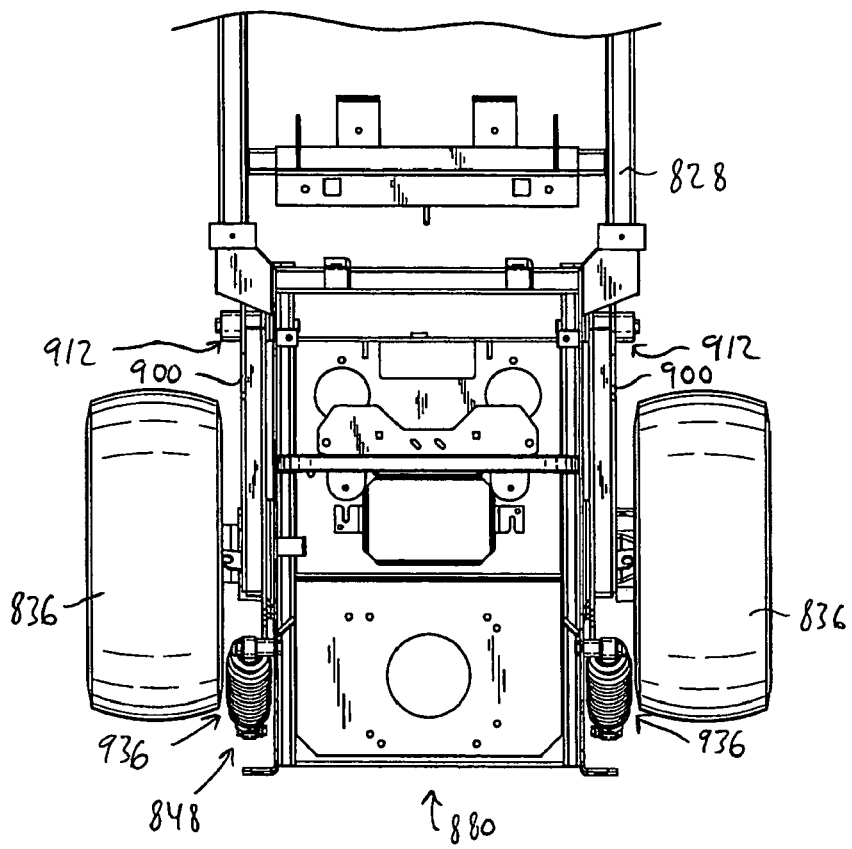
FIG. 53 is a top plan view of the mower frame and rear wheel suspension assembly shown in FIG. 49.
Figure 54:
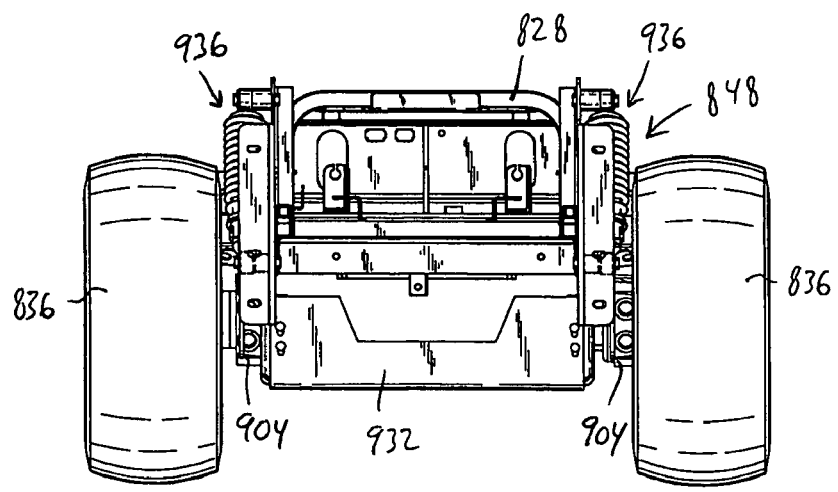
FIG. 54 is a rear view of the mower frame and rear wheel suspension assembly shown in FIG. 49.
Figure 55:
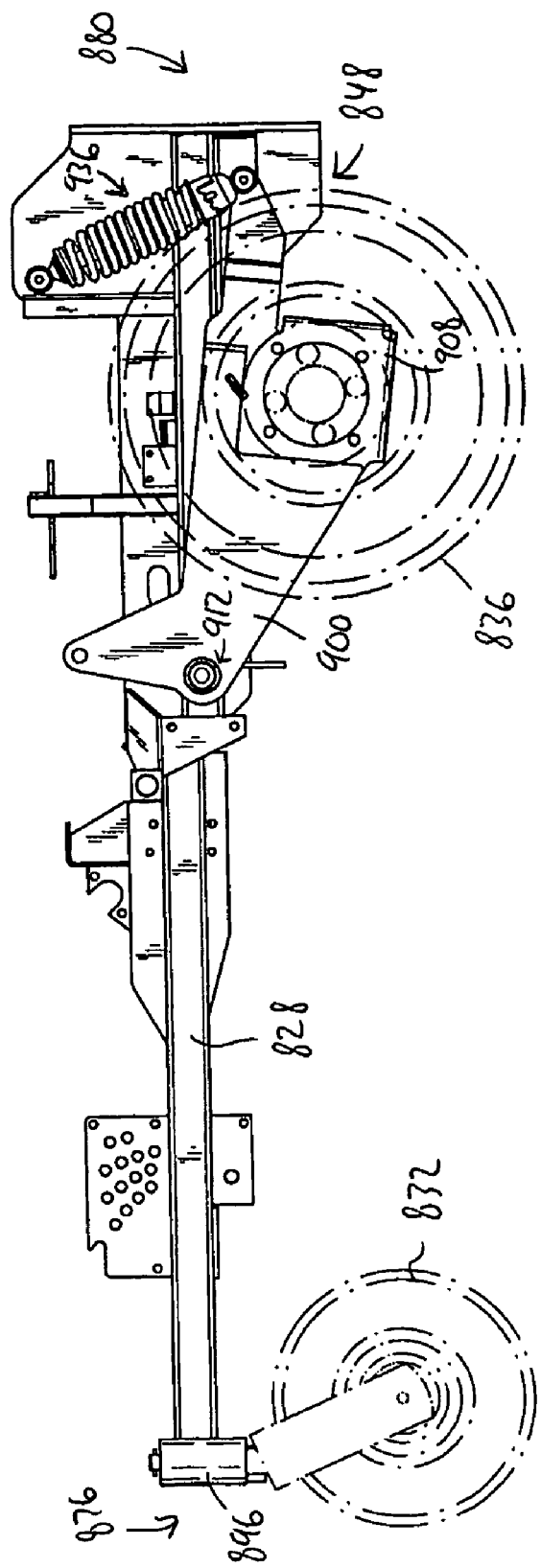
FIG. 55 is a side view of the mower frame and rear wheel suspension assembly shown in FIG. 49.

With reference to FIGS. 51 and 52, the rear wheel suspension assembly 848 of the mower 820 is shown. Generally, the rear wheel suspension assembly 848 allows upward and downward movement of the rear wheels 836 relative to the frame 828. As shown in FIG. 51, the rear wheel suspension assembly 848 includes on the opposite sides of the frame 828 respective links or control arms 900 controlling upward and downward movement of the rear wheels 836. In addition, the control arms 900 transmit longitudinal forces generated during acceleration or braking to the frame 828 when the rear wheels 836 are configured as drive wheels 836. In the illustrated embodiment, the rear wheels 836 are configured as drive wheels 836, and each drive wheel 836 is rotatably coupled to a hydraulic motor 904 coupled to a flange 908. The hydraulic motors 904 are powered by one or more hydraulic pumps (not shown) driven by the motor 824, as understood by those skilled in the art. Alternatively, the drive wheels 836 can receive torque from common or separate axles or shafts rotatably coupled to a transmission driven by the motor 824.

The control arms 900 pivotably couple the drive wheels 836 to the frame 828. In the illustrated embodiment, the control arms 900 are made from one or more pieces of substantially flat plates. Alternatively, the control arms 900 can be made from tubular beams. The control arms 900 are pivotably coupled the frame 828 by respective pivot assemblies 912. The pivot assemblies 912 can take a number of different forms. In the illustrated embodiment for example, each pivot assembly 912 includes a joint 916 having one or more bushings 920 and/or spacers for receiving a fastener 924 (e.g., a bolt, a pin, etc.).

The control arms 900 can either directly connect to the frame 828, or the control arms 900 can pivotably couple to a plate, tab, bracket, or other structure coupled to a side of the frame 828. In the illustrated embodiment, brackets 928 are fixed to the side of the frame 828 by a welding process, for example, to mount the pivot assemblies 912 and the control arms 900. Alternatively, pivot assemblies like those described above with reference to the first and second links 768, 772 of the mower 600 of FIGS. 35-48 can be used in place of the pivot assemblies 912.

As shown in FIGS. 51 and 52, the two drive wheels 836 are coupled to each other by a solid axle 932. In the illustrated embodiment, the solid axle 932 is in the form of an L-shaped bracket. Alternatively, the solid axle 932 can be in the form of a tubular beam, for example. Alternatively, the solid axle 932 can be constructed in any of a number of different ways to couple together the drive wheels 836. The flanges 908 of the respective drive wheels 836 are coupled to each other by the solid axle 932. In alternative embodiments of the mower, the solid axle 932 can be separated into two distinct halves, or the solid axle 932 can be omitted entirely such that the drive wheels 836 are allowed to move relative to the frame 828 independently of each other.

Although not shown, the mower 820 can include a third link, like that described above in connection with the mower 600 of FIGS. 35-48, to locate the solid axle 932 and substantially prevent lateral movement of the solid axle 932 and the drive wheels 836.

Shock absorber and spring assemblies 936 can be used with the rear wheel suspension assembly 848 to control upward and downward movement of the solid axle 932 and the drive wheels 836. The shock absorber and spring assemblies 936 are substantially similar to those described above in connection with the front wheel independent suspension assemblies 628 and the rear wheel suspension assembly 632 of the mower 600 of FIGS. 35-48, and will not be described again in detail.

In the illustrated embodiment, the shock absorber and spring assemblies 936 are coupled between the respective control arms 900 and the frame 828. As described above, brackets can be coupled to either of the frame 828 or the control arms 900 to provide a mounting for the shock absorber and spring assemblies 936. Alternatively, the shock absorber and spring assemblies 936 can be coupled to the solid axle 932 and the frame 828 using any of the structure and methods disclosed above in connection with the shock absorber and spring assemblies 736, 808 in the front wheel independent suspension assemblies 628 and the rear wheel suspension assembly 632 of the mower 600 of FIGS. 35-48.

Although the illustrated mower 820 includes a solid-axle rear suspension, alternate embodiments of the mower can utilize rear wheel independent suspension assemblies configured substantially similar to any of the front wheel independent suspension assemblies described herein. Likewise, other embodiments of the mower can utilize a front solid-axle suspension assembly like any of the solid-axle rear wheel suspension assemblies described herein.

The present invention is also applicable to lawn mowers having more or fewer than four wheels and to lawn mowers designed for the operator to walk or ride behind or in front of the mower. By way of example only, the present invention finds applicability to walk-behind mowers, push mowers, and mowers with seats cantilevered forward or rearward of the front or rear wheels, respectively.

Accordingly, the embodiments described above and illustrated in the figures are presented by way of example only and not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

We claim:

1. A mower, comprising:
    a frame having a front portion and a rear portion;
    at least one front wheel coupled to the front portion of the frame;
    two drive wheels on substantially opposite sides of the rear portion of the frame, each drive wheel coupled to the frame by
    a first link having one end pivotably coupled to the front portion of the frame, the first link further having an opposite end coupled to the drive wheel; and
    a second link having one end pivotably coupled to the rear portion of the frame, the second link further having an opposite end coupled to the drive wheel; and
    at least one spring positioned to bias the drive wheels in a downward direction, each of the drive wheels movable upward and downward relative to the frame.

2. The mower of claim 1, wherein the two drive wheels are coupled to each other by a beam.

3. The mower of claim 2, further comprising a third link coupling the rear portion of the frame and the beam, wherein the third link is oriented substantially transversely to a longitudinal axis passing from the front portion to the rear portion of the frame.

4. The mower of claim 2, wherein the at least one spring is coupled to the beam and the rear portion of the frame to bias the drive wheels in a downward direction.

5. The mower of claim 1, further comprising a flange coupled to each of the drive wheels, wherein the first link is coupled to an upper portion of the flange, and wherein the second link is coupled to a lower portion of the flange.

6. The mower of claim 1, wherein the first link is at least as long as the second link.

7. The mower of claim 1, wherein the first link is located entirely above a rotational axis of each drive wheel, and wherein the second link is located entirely below the rotational axis of each drive wheel.

8. The mower of claim 1, further comprising a cutter deck coupled to the frame.

9. The mower of claim 8, wherein the cutter deck is coupled to at least one of the first and second links for upward and downward movement with the first and second links.

10. The mower of claim 1, further comprising at least one longitudinal beam located in the front portion of the frame, the beam being substantially parallel with a longitudinal axis passing from the front portion to the rear portion of the frame, wherein the at least one front wheel includes first and second front wheels positioned on opposite sides of the front portion of the frame and spaced to define a track width of the mower, the first and second wheels being pivotably coupled to the at least one longitudinal beam about a first longitudinal pivot axis and a second longitudinal pivot axis, respectively, for upward and downward movement independent of each other, at least one of the first and second longitudinal pivot axes being laterally spaced from the longitudinal axis between about 0% and about 20% of the track width.

11. A mower, comprising:
    a frame having a front portion and a rear portion;
    at least one front wheel coupled to the front portion of the frame;
    two drive wheels on substantially opposite sides of the rear portion of the frame, longitudinally spaced from the at least one front wheel to define a wheelbase length of the mower, each drive wheel coupled to the frame by
    a first link having one end pivotably coupled to the front portion of the frame at a location longitudinally spaced from the drive wheels between about 50% and about 90% of the wheelbase length, the first link further having an opposite end coupled to the drive wheel; and
    a second link having one end pivotably coupled to the rear portion of the frame, the second link further having an opposite end coupled to the drive wheel; and
    at least one spring positioned to bias the drive wheels in a downward direction, each of the drive wheels movable upward and downward relative to the frame.

12. The mower of claim 11, wherein the two drive wheels are coupled to each other by a beam.

13. The mower of claim 12, further comprising a third link coupling the rear portion of the frame and the beam, wherein the third link is oriented substantially transversely to a longitudinal axis passing from the front portion to the rear portion of the frame.

14. The mower of claim 12, wherein the at least one spring is coupled to the beam and the rear portion of the frame to bias the drive wheels in a downward direction.

15. The mower of claim 11, further comprising a flange coupled to each of the drive wheels, wherein the first link is coupled to an upper portion of the flange, and wherein the second link is coupled to a lower portion of the flange.

16. The mower of claim 11, wherein the first link is at least as long as the second link.

17. The mower of claim 11, wherein the first link is located entirely above a rotational axis of each drive wheel, and wherein the second link is located entirely below the rotational axis of each drive wheel.

18. The mower of claim 11, further comprising a cutter deck coupled to the frame.

19. The mower of claim 18, wherein the cutter deck is coupled to at least one of the first and second links for upward and downward movement with the first and second links.

20. The mower of claim 11, further comprising at least one longitudinal beam located in the front portion of the frame, the beam being substantially parallel with a longitudinal axis passing from the front portion to the rear portion of the frame, wherein the at least one front wheel includes first and second front wheels positioned on opposite sides of the front portion of the frame and spaced to define a track width of the mower, the first and second wheels being pivotably coupled to the at least one longitudinal beam about a first longitudinal pivot axis and a second longitudinal pivot axis, respectively, for upward and downward movement independent of each other, at least one of the first and second longitudinal pivot axes being laterally spaced from the longitudinal axis between about 0% and about 20% of the track width.

* * * * *